United States Patent
Li et al.

(10) Patent No.: US 9,119,163 B2
(45) Date of Patent: Aug. 25, 2015

(54) METHODS AND APPARATUS RELATED TO POWER CONTROL AND/OR INTERFERENCE MANAGEMENT IN A MIXED WIRELESS COMMUNICATIONS SYSTEM

(71) Applicant: QUALCOMM Incorporated, San Diego, CA (US)

(72) Inventors: Junyi Li, Chester, NJ (US); Rajiv Laroia, Far Hills, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 2 days.

(21) Appl. No.: 13/733,762

(22) Filed: Jan. 3, 2013

(65) Prior Publication Data

US 2013/0122947 A1    May 16, 2013

Related U.S. Application Data

(62) Division of application No. 11/764,366, filed on Jun. 18, 2007, now Pat. No. 8,369,800.

(60) Provisional application No. 60/845,053, filed on Sep. 15, 2006.

(51) Int. Cl.
*H04W 52/24* (2009.01)
*H04W 52/26* (2009.01)
(Continued)

(52) U.S. Cl.
CPC .......... *H04W 52/243* (2013.01); *H04W 52/265* (2013.01); *H04W 52/30* (2013.01);
(Continued)

(58) Field of Classification Search
CPC ........ H04B 1/1026; H04B 3/20; H04L 27/10; H04W 84/12
USPC ......................................................... 455/501
See application file for complete search history.

(56) References Cited

U.S. PATENT DOCUMENTS 5,488,631 A * 1/1996 Gold et al. ..................... 375/145
5,491,837 A   2/1996 Haartsen
(Continued)

FOREIGN PATENT DOCUMENTS

CN   1386024 A   12/2002
EP   1257140     11/2002
(Continued)

OTHER PUBLICATIONS

International Search Report—PCT/US07/078435, International Search Authority, European Patent Office—Feb. 7, 2008.
(Continued)

*Primary Examiner* — Hai V Nguyen
(74) *Attorney, Agent, or Firm* — James K. O'Hare

(57) ABSTRACT

Methods and apparatus related to the sharing of wide area network (WAN) uplink bandwidth with peer to peer communication signaling usage are described. A base station transmits a signal to be used by a peer to peer wireless terminal in controlling its peer to peer transmit power level. The peer to peer wireless terminal receives and measures the strength of the base station signal. The measurement information is used in determining whether or not peer to peer signal transmission is permitted and/or in determining a peer to peer transmission power level. Current service level information and/or encoded information, e.g., an interference level indicator value, conveyed by the received base station signal are, in various embodiments, also utilized in determining a peer to peer transmission power level.

32 Claims, 29 Drawing Sheets

(51) Int. Cl.
*H04W 52/30* (2009.01)
*H04W 52/38* (2009.01)
H04W 52/28 (2009.01)
H04W 52/36 (2009.01)
H04W 76/02 (2009.01)

(52) U.S. Cl.
CPC .......... *H04W52/383* (2013.01); *H04W 52/281* (2013.01); *H04W 52/367* (2013.01); *H04W 76/025* (2013.01)

(56) References Cited

U.S. PATENT DOCUMENTS

| | | | |
|---|---|---|---|
| 5,542,097 A | 7/1996 | Ward et al. | |
| 5,754,537 A * | 5/1998 | Jamal | 370/330 |
| 5,903,618 A | 5/1999 | Miyake et al. | |
| 6,167,270 A | 12/2000 | Rezaiifar et al. | |
| 6,175,745 B1 | 1/2001 | Bringby et al. | |
| 6,198,441 B1 | 3/2001 | Okabe et al. | |
| 6,252,865 B1 | 6/2001 | Walton et al. | |
| 6,259,726 B1 * | 7/2001 | Saadeh et al. | 375/222 |
| 6,272,340 B1 * | 8/2001 | Wright et al. | 455/427 |
| 6,377,608 B1 | 4/2002 | Zyren | |
| 6,415,146 B1 | 7/2002 | Capece | |
| 6,442,397 B1 | 8/2002 | Benveniste | |
| 6,577,670 B1 | 6/2003 | Roberts | |
| 6,580,704 B1 | 6/2003 | Wellig et al. | |
| 6,594,251 B1 | 7/2003 | Raissinia et al. | |
| 6,621,454 B1 * | 9/2003 | Reudink et al. | 342/367 |
| 6,658,262 B1 | 12/2003 | Lundborg | |
| 6,675,012 B2 | 1/2004 | Gray | |
| 6,748,246 B1 | 6/2004 | Khullar | |
| 6,754,484 B1 | 6/2004 | Hiltunen et al. | |
| 6,757,522 B1 * | 6/2004 | Naegeli et al. | 455/67.11 |
| 6,763,013 B2 | 7/2004 | Kennedy | |
| 6,775,548 B1 | 8/2004 | Rong et al. | |
| 6,807,165 B2 | 10/2004 | Belcea | |
| 6,823,003 B2 | 11/2004 | Laureanti | |
| 6,823,195 B1 | 11/2004 | Boesen | |
| 6,834,045 B1 | 12/2004 | Lappetelainen et al. | |
| 6,836,663 B1 | 12/2004 | Kotzin | |
| 6,836,666 B2 * | 12/2004 | Gopalakrishnan et al. | 455/452.2 |
| 6,842,433 B2 | 1/2005 | West et al. | |
| 6,843,597 B1 | 1/2005 | Li et al. | |
| 6,859,488 B2 * | 2/2005 | Azenkot et al. | 375/147 |
| 6,882,851 B2 | 4/2005 | Sugar et al. | |
| 6,898,437 B1 * | 5/2005 | Larsen et al. | 455/522 |
| 6,909,706 B2 | 6/2005 | Wilmer et al. | |
| 6,914,894 B2 | 7/2005 | Wilmer et al. | |
| 6,920,311 B2 | 7/2005 | Rofougaran et al. | |
| 6,937,641 B2 | 8/2005 | Li et al. | |
| 6,983,166 B2 * | 1/2006 | Shiu et al. | 455/522 |
| 6,987,966 B1 | 1/2006 | Wu et al. | |
| 7,003,283 B2 | 2/2006 | Hiltunen et al. | |
| 7,006,799 B2 | 2/2006 | Wiemeyer et al. | |
| 7,013,143 B2 * | 3/2006 | Love et al. | 455/450 |
| 7,016,673 B2 | 3/2006 | Reddy et al. | |
| 7,020,442 B2 | 3/2006 | Najafi et al. | |
| 7,050,405 B2 * | 5/2006 | Attar et al. | 370/282 |
| 7,099,296 B2 | 8/2006 | Belcea | |
| 7,133,391 B2 | 11/2006 | Belcea | |
| 7,151,795 B1 | 12/2006 | Goldburg | |
| 7,155,161 B2 | 12/2006 | Regulinski et al. | |
| 7,158,484 B1 | 1/2007 | Ahmed et al. | |
| 7,173,923 B2 * | 2/2007 | Beach | 370/338 |
| 7,181,178 B2 | 2/2007 | Chow | |
| 7,190,700 B2 * | 3/2007 | Choi | 370/468 |
| 7,203,472 B2 | 4/2007 | Seppinen et al. | |
| 7,212,504 B2 | 5/2007 | Belcea | |
| 7,248,570 B2 | 7/2007 | Bahl et al. | |
| 7,248,841 B2 * | 7/2007 | Agee et al. | 455/101 |
| 7,286,841 B2 * | 10/2007 | Sun et al. | 455/502 |
| 7,313,124 B2 * | 12/2007 | Lim et al. | 370/342 |
| 7,333,813 B2 * | 2/2008 | Ganti et al. | 455/452.1 |
| 7,359,733 B2 * | 4/2008 | Liang et al. | 455/562.1 |
| 7,366,135 B2 * | 4/2008 | Konishi et al. | 370/329 |
| 7,376,438 B2 * | 5/2008 | Shiu et al. | 455/522 |
| 7,386,043 B2 | 6/2008 | Goldburg | |
| 7,388,845 B2 * | 6/2008 | Laroia et al. | 370/311 |
| 7,389,088 B2 * | 6/2008 | Kim | 455/41.1 |
| 7,447,174 B2 | 11/2008 | Joshi | |
| 7,450,950 B2 * | 11/2008 | Kim et al. | 455/453 |
| 7,463,644 B2 * | 12/2008 | Zhu et al. | 370/445 |
| 7,489,905 B2 | 2/2009 | Qi et al. | |
| 7,492,743 B2 | 2/2009 | Uhlik | |
| 7,508,778 B2 | 3/2009 | Yafuso | |
| 7,522,919 B2 * | 4/2009 | Yoon et al. | 455/428 |
| 7,539,507 B2 | 5/2009 | Grob et al. | |
| 7,548,758 B2 | 6/2009 | Periyalwar et al. | |
| 7,567,791 B2 | 7/2009 | Laroia et al. | |
| 7,573,865 B2 | 8/2009 | Shvodian | |
| 7,620,415 B2 | 11/2009 | Ashkenazi et al. | |
| 7,634,234 B2 | 12/2009 | Karabinis | |
| 7,684,813 B2 * | 3/2010 | Benson et al. | 455/517 |
| 7,706,824 B2 | 4/2010 | Schulist et al. | |
| 7,734,292 B2 * | 6/2010 | Cho et al. | 455/436 |
| 7,751,827 B2 | 7/2010 | Poykko et al. | |
| 7,761,106 B2 * | 7/2010 | Konchitsky | 455/501 |
| 7,787,408 B2 | 8/2010 | Proctor, Jr. et al. | |
| 7,953,417 B2 | 5/2011 | Laroia et al. | |
| 7,974,633 B2 | 7/2011 | Kennedy et al. | |
| 8,000,379 B2 * | 8/2011 | Kishigami et al. | 375/148 |
| 8,014,359 B2 | 9/2011 | Cave et al. | |
| 8,060,129 B2 | 11/2011 | Grob et al. | |
| 8,140,012 B1 | 3/2012 | Causey et al. | |
| 8,140,066 B2 * | 3/2012 | Kneckt | 455/422.1 |
| 8,249,638 B2 * | 8/2012 | Lor | 455/518 |
| 8,260,197 B2 * | 9/2012 | Okada | 455/18 |
| 8,265,620 B2 * | 9/2012 | Hong et al. | 455/424 |
| 8,325,836 B2 * | 12/2012 | Tong et al. | 375/260 |
| 8,369,800 B2 * | 2/2013 | Li et al. | 455/91 |
| 8,374,259 B2 * | 2/2013 | Yamasuge | 375/260 |
| 8,385,320 B2 * | 2/2013 | Cai et al. | 370/350 |
| 8,391,272 B2 * | 3/2013 | Cai et al. | 370/350 |
| 8,417,205 B2 * | 4/2013 | Tang et al. | 455/272 |
| RE44,237 E * | 5/2013 | McHenry | 455/454 |
| 8,452,317 B2 * | 5/2013 | Li et al. | 455/522 |
| 8,521,158 B2 * | 8/2013 | Karpoor et al. | 455/432.1 |
| 8,521,194 B2 * | 8/2013 | Laroia et al. | 455/458 |
| 8,543,065 B2 * | 9/2013 | Karpoor et al. | 455/67.11 |
| 8,588,836 B2 * | 11/2013 | Periyalwar et al. | 455/517 |
| 8,630,243 B2 * | 1/2014 | Matsuzawa | 370/329 |
| 8,634,869 B2 * | 1/2014 | Li et al. | 455/552.1 |
| 8,699,474 B2 * | 4/2014 | Beach | 370/338 |
| 8,929,281 B2 * | 1/2015 | Li et al. | 370/328 |
| 2001/0016499 A1 | 8/2001 | Hamabe | |
| 2002/0061768 A1 * | 5/2002 | Liang et al. | 455/561 |
| 2002/0065094 A1 | 5/2002 | Schmutz et al. | |
| 2002/0173277 A1 | 11/2002 | Takao et al. | |
| 2002/0193130 A1 * | 12/2002 | Yang et al. | 455/501 |
| 2003/0053437 A1 | 3/2003 | Bahl et al. | |
| 2003/0076168 A1 | 4/2003 | Forrester | |
| 2003/0103470 A1 | 6/2003 | Yafuso | |
| 2003/0144003 A1 | 7/2003 | Ranta et al. | |
| 2003/0176193 A1 * | 9/2003 | Konishi et al. | 455/454 |
| 2003/0185285 A1 * | 10/2003 | Talwar | 375/148 |
| 2004/0023627 A1 | 2/2004 | Osaki et al. | |
| 2004/0095902 A1 | 5/2004 | Laroia et al. | |
| 2004/0125965 A1 * | 7/2004 | Alberth et al. | 381/77 |
| 2004/0127214 A1 | 7/2004 | Reddy et al. | |
| 2004/0242258 A1 * | 12/2004 | Kim | 455/522 |
| 2005/0013283 A1 * | 1/2005 | Yoon et al. | 370/350 |
| 2005/0025315 A1 | 2/2005 | Kreitzer | |
| 2005/0093624 A1 | 5/2005 | Forrester et al. | |
| 2005/0111383 A1 | 5/2005 | Grob et al. | |
| 2005/0129051 A1 * | 6/2005 | Zhu et al. | 370/445 |
| 2005/0143119 A1 | 6/2005 | Chandra et al. | |
| 2005/0215196 A1 | 9/2005 | Krishnan et al. | |
| 2005/0239451 A1 | 10/2005 | Periyalwar et al. | |
| 2006/0023629 A1 | 2/2006 | Kim et al. | |
| 2006/0063484 A1 | 3/2006 | Proctor, Jr. et al. | |
| 2006/0135070 A1 | 6/2006 | Karabinis | |

(56) References Cited

U.S. PATENT DOCUMENTS

| | | | |
|---|---|---|---|
| 2006/0148516 A1 | 7/2006 | Reddy et al. | |
| 2006/0153105 A1* | 7/2006 | Jia et al. | 370/278 |
| 2006/0168343 A1 | 7/2006 | Ma et al. | |
| 2006/0176815 A1* | 8/2006 | Picot et al. | 370/235 |
| 2006/0178148 A1 | 8/2006 | Du et al. | |
| 2006/0229092 A1* | 10/2006 | Jia et al. | 455/517 |
| 2006/0245398 A1* | 11/2006 | Li et al. | 370/335 |
| 2006/0258382 A1* | 11/2006 | Zhang et al. | 455/501 |
| 2006/0258383 A1* | 11/2006 | Jiang et al. | 455/502 |
| 2006/0274667 A1* | 12/2006 | Mir et al. | 370/252 |
| 2007/0004374 A1* | 1/2007 | Kneckt | 455/343.1 |
| 2007/0011171 A1 | 1/2007 | Nurminen et al. | |
| 2007/0053418 A1 | 3/2007 | Goldburg | |
| 2007/0077884 A1 | 4/2007 | Regulinski et al. | |
| 2007/0104128 A1 | 5/2007 | Laroia et al. | |
| 2007/0109993 A1* | 5/2007 | Beach | 370/328 |
| 2007/0177561 A1* | 8/2007 | Beach | 370/338 |
| 2007/0195731 A1* | 8/2007 | Camp, Jr. | 370/329 |
| 2007/0213087 A1 | 9/2007 | Laroia et al. | |
| 2007/0233832 A1 | 10/2007 | Narayanan et al. | |
| 2007/0237217 A1* | 10/2007 | Shen et al. | 375/227 |
| 2007/0275696 A1 | 11/2007 | Cheng et al. | |
| 2007/0286171 A1 | 12/2007 | Guan | |
| 2008/0002658 A1 | 1/2008 | Soliman | |
| 2008/0013497 A1 | 1/2008 | Belcea | |
| 2008/0013500 A1* | 1/2008 | Laroia et al. | 370/338 |
| 2008/0019333 A1 | 1/2008 | Kharia et al. | |
| 2008/0045235 A1 | 2/2008 | Kennedy et al. | |
| 2008/0055068 A1 | 3/2008 | Van Wageningen et al. | |
| 2008/0069033 A1* | 3/2008 | Li et al. | 370/328 |
| 2008/0069039 A1* | 3/2008 | Li et al. | 370/329 |
| 2008/0069062 A1* | 3/2008 | Li et al. | 370/338 |
| 2008/0069063 A1* | 3/2008 | Li et al. | 370/338 |
| 2008/0181058 A1* | 7/2008 | Hayakawa | 367/125 |
| 2008/0318612 A1 | 12/2008 | Axnas et al. | |
| 2009/0046573 A1* | 2/2009 | Damnjanovic | 370/216 |
| 2009/0052566 A1* | 2/2009 | Maltsev et al. | 375/260 |
| 2009/0147834 A1* | 6/2009 | Kishigami et al. | 375/148 |
| 2009/0221325 A1 | 9/2009 | Periyalwar et al. | |
| 2009/0296856 A1* | 12/2009 | Smith et al. | 375/320 |
| 2010/0067471 A1* | 3/2010 | Matsuzawa | 370/329 |
| 2010/0150079 A1* | 6/2010 | Maltsev et al. | 370/329 |
| 2010/0202327 A1* | 8/2010 | Mushkin et al. | 370/280 |
| 2010/0234071 A1* | 9/2010 | Shabtay et al. | 455/562.1 |
| 2011/0045864 A1 | 2/2011 | Chen et al. | |
| 2011/0201374 A1 | 8/2011 | Periyalwar et al. | |
| 2011/0230206 A1 | 9/2011 | Kennedy, Jr. et al. | |
| 2012/0135728 A1* | 5/2012 | Karpoor et al. | 455/432.1 |
| 2012/0135777 A1* | 5/2012 | Karpoor et al. | 455/522 |
| 2012/0238268 A1* | 9/2012 | Radulescu et al. | 455/435.1 |
| 2013/0010808 A1* | 1/2013 | Ma et al. | 370/474 |
| 2013/0122947 A1* | 5/2013 | Li et al. | 455/501 |
| 2013/0178221 A1* | 7/2013 | Jung et al. | 455/450 |

FOREIGN PATENT DOCUMENTS

| | | |
|---|---|---|
| EP | 1689207 A2 | 8/2006 |
| JP | 9107583 | 4/1997 |
| JP | 2001238251 A | 8/2001 |
| JP | 2001358651 A | 12/2001 |
| JP | 2002112347 A | 4/2002 |
| JP | 2002290328 A | 10/2002 |
| JP | 2002325281 A | 11/2002 |
| JP | 2003087171 A | 3/2003 |
| JP | 2004023613 A | 1/2004 |
| JP | 2005236696 A | 9/2005 |
| JP | 2005260427 A | 9/2005 |
| JP | 2005341297 A | 12/2005 |
| JP | 2006501777 A | 1/2006 |
| JP | 2006191315 A | 7/2006 |
| JP | 2007512779 A | 5/2007 |
| JP | 2007527673 A | 9/2007 |
| JP | 2007531347 A | 11/2007 |
| JP | 2008517546 A | 5/2008 |
| KR | 1020094101 A | 8/2006 |
| WO | 2004030392 | 4/2004 |
| WO | 2005011163 A1 | 2/2005 |
| WO | 2005038606 | 4/2005 |
| WO | 2005053253 | 6/2005 |
| WO | 2005088863 | 9/2005 |
| WO | 2006016331 A1 | 2/2006 |
| WO | 2006043136 A1 | 4/2006 |
| WO | 2006064411 A2 | 6/2006 |
| WO | 2007055623 A1 | 5/2007 |
| WO | 2007082281 | 7/2007 |
| WO | 2008005922 | 1/2008 |
| WO | 2008034044 | 3/2008 |

OTHER PUBLICATIONS

International Search Report—PCT/US07/078448, International Search Authority, European Patent Office—Mar. 20, 2008.

International Search Report—PCT/US07/078463, International Search Authority, European Patent Office—Feb. 7, 2008.

International Search Report—PCT/US07/078470, International Search Authority, European Patent Office—Mar. 26, 2008.

Stoica, I. et al.: "Chord: A Scalable Peer-to-peer Lookup Service for Internet Applications", SIGCOMM' 01, Aug. 27-31, 2001, San Diego, CA, USA, pp. 1- 12.

Taiwan Search Report—TW096134622—TIPO—Mar. 4, 2012.

Taiwan Search Report—TW096134644—TIPO—May 6, 2011.

Taiwan Search Report—TW096134620—TIPO—Jul. 22, 2011.

Written Opinion—PCT/US07/078435, International Search Authority, European Patent Office—Feb. 7, 2008.

Written Opinion—PCT/US07/078448, International Search Authority, European Patent Office—Mar. 20, 2008.

Written Opinion—PCT/US07/078463, International Search Authority, European Patent Office—Feb. 7, 2008.

Written Opinion—PCT/US07/078470, International Search Authority, European Patent Office—Mar. 26, 2008.

Ozeki, T., "Realization of Public Network and AD-HOC Network Hybrid System based on TDD-CDMA," IEICE Technical Report, The Institute of Electronics, Information and Communication Engineers, vol. 103, No. 415, pp. 59-64.

\* cited by examiner

| FIGURE 7A |
|---|
| FIGURE 7B |

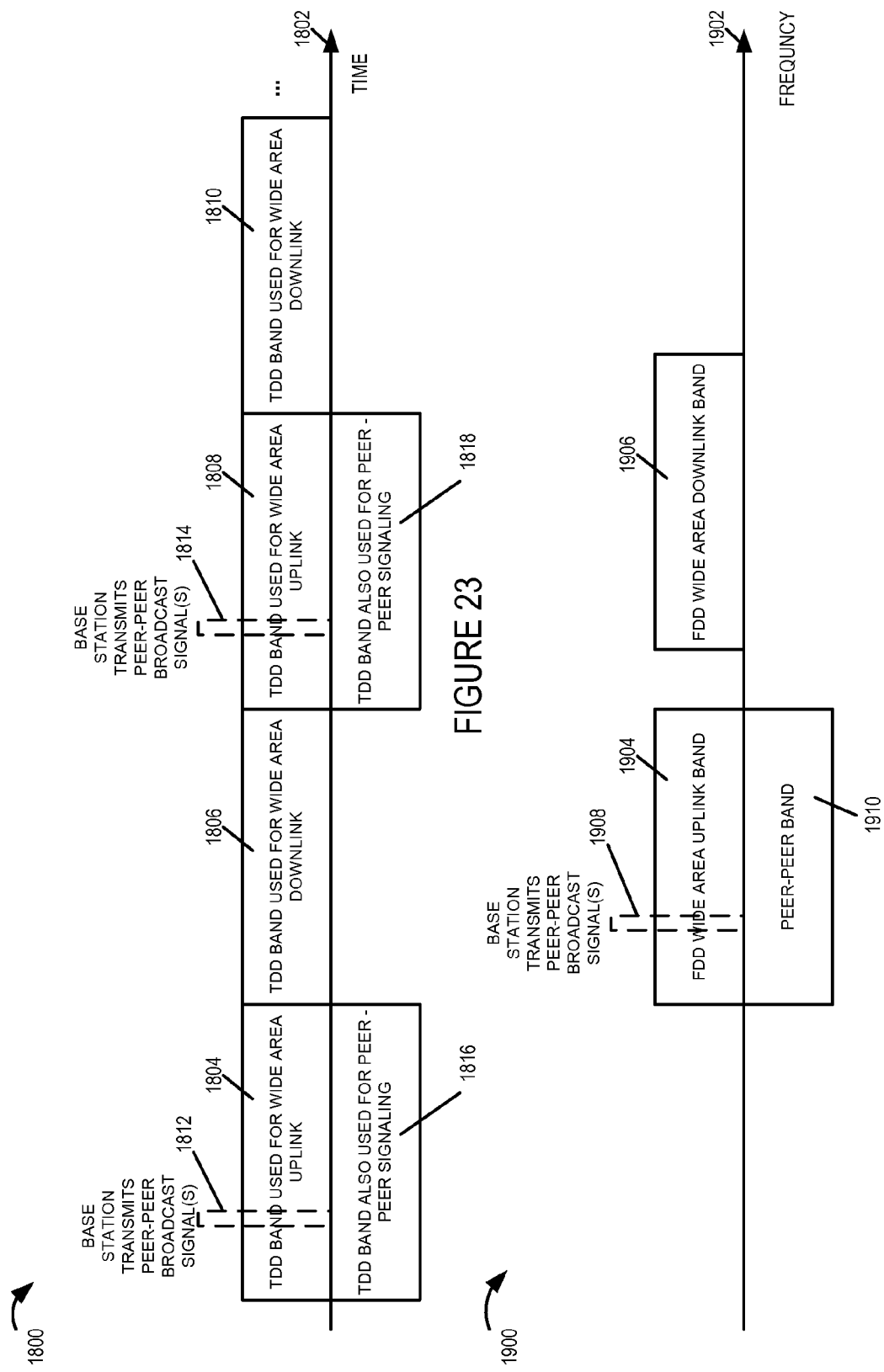

METHODS AND APPARATUS RELATED TO POWER CONTROL AND/OR INTERFERENCE MANAGEMENT IN A MIXED WIRELESS COMMUNICATIONS SYSTEM

RELATED APPLICATIONS

The present application is a division of U.S. application Ser. No. 11/764,366 filed on Jun. 18, 2007 titled "METHODS AND APPARATUS RELATED TO POWER CONTROL AND/OR INTERFERENCE MANAGEMENT IN A MIXED WIRELESS COMMUNICATIONS SYSTEM" that claims the benefit of U.S. Provisional Patent Application Ser. No. 60/845,053 filed on Sep. 15, 2006, titled "BEACONS IN A MIXED WIRELESS COMMUNICATION SYSTEM" which are hereby expressly incorporated by reference.

FIELD

The present invention is directed to methods and apparatus for wireless communications, and more particularly to methods and apparatus related to peer to peer communications.

BACKGROUND

Wireless spectrum is an expensive and valuable resource. In wide area network systems, e.g., cellular systems, wireless spectrum allocated to the WAN is, at times, less than fully utilized. It would be advantageous if methods and apparatus were developed which recognized and/or utilized such underutilized air link resources. It would be beneficial if such methods and apparatus were adaptive such that interference to the WAN communications generated from the additional usage of the air link resource could be managed.

SUMMARY

Methods and apparatus related to the sharing of wide area network (WAN) uplink bandwidth with peer to peer communication signaling usage are described. A base station transmits a signal to be used by a peer to peer wireless terminal in controlling its peer to peer transmit power level. The peer to peer wireless terminal receives and measures the strength of the base station signal. The measurement information is used by the peer to peer wireless terminal in determining whether or not peer to peer signal transmission is permitted and/or in determining a peer to peer transmission power level. Current service level information and/or encoded information, e.g., an interference level indicator value, conveyed by the received base station signal are, in various embodiments, also utilized by the peer to peer wireless terminal in determining a peer to peer transmission power level.

In various embodiments, the base station varies the transmission power level of a signal being transmitted and/or varies the information being communicated by the signal. In this way, the base station can dynamically regulate interference being generated by the peer to peer wireless terminals which is impacting its reception of WAN uplink signals.

An exemplary method of operating a wireless communications device supporting peer to peer communications comprises: receiving a first signal from a base station; performing a measurement on the received signal; and controlling peer to peer transmission power for at least some peer to peer signal transmissions as a function of the result of the measurement of said first received signal. An exemplary wireless communications device supporting peer to peer communications, in accordance with various embodiments, comprises: a wireless receiver module for receiving a signal from a base station; a measurement module for performing a measurement on the received signal; and a peer to peer transmission power control module for controlling peer to peer transmission power for at least some peer to peer signal transmissions as a function of the result of the measurement of said received signal.

An exemplary method of operating a base station, in accordance with various embodiments comprises: measuring during an uplink null time period uplink background interference; and transmitting a first uplink transmission power control value. An exemplary base station, in accordance with various embodiments includes: an interference measurement module for measuring during an uplink null time period uplink background interference; and a transmitter module for transmitting a first uplink transmission power control value. In some embodiments, an indication of interference from peer to peer signaling is derived from the measurement during the uplink null time period. The transmitted uplink transmission power control value is intended to be received and utilized by peer to peer wireless terminals to control their transmission power level and thus impact the interference being experienced by the base station receiver attempting to recover cellular uplink signals.

Various embodiments are directed to communications systems including a mixture of wide area network wireless terminals and peer to peer wireless terminals in which both types are responsive to the same base station received signal, e.g. a wireless terminal transmission power control signal, but apply different interpretations to the same received signal. An exemplary communications system comprises: a first wireless communications device including a received signal power measurement module for measuring the power of a signal received from a base station and a peer to peer signal transmission power control module for controlling a peer to peer signal transmission power level as a function of the measured power of the signal from the base station in accordance with a first function; and a second wireless communications device including a received signal power measurement module for measuring the power level of signals received from said base station and a wide area network signal transmission power control module for controlling wide area signal transmission power level as a function of the measured power of a signal from the base station in accordance with a second function, said second function being different from said first function.

While various embodiments have been discussed in the summary above, it should be appreciated that not necessarily all embodiments include the same features and some of the features described above are not necessary but can be desirable in some embodiments. Numerous additional features, embodiments and benefits are discussed in the detailed description which follows.

BRIEF DESCRIPTION OF THE FIGURES

FIG. 23 is a drawing illustrating exemplary bandwidth usage in some embodiments utilizing a time division duplex (TDD) for the wide area network, e.g., for the cellular communications.

FIG. 24 is a drawing illustrating exemplary bandwidth usage in some embodiments utilizing a frequency division duplex (FDD) for the wide area network, e.g., for the cellular communications.

DETAILED DESCRIPTION

Figure 1:
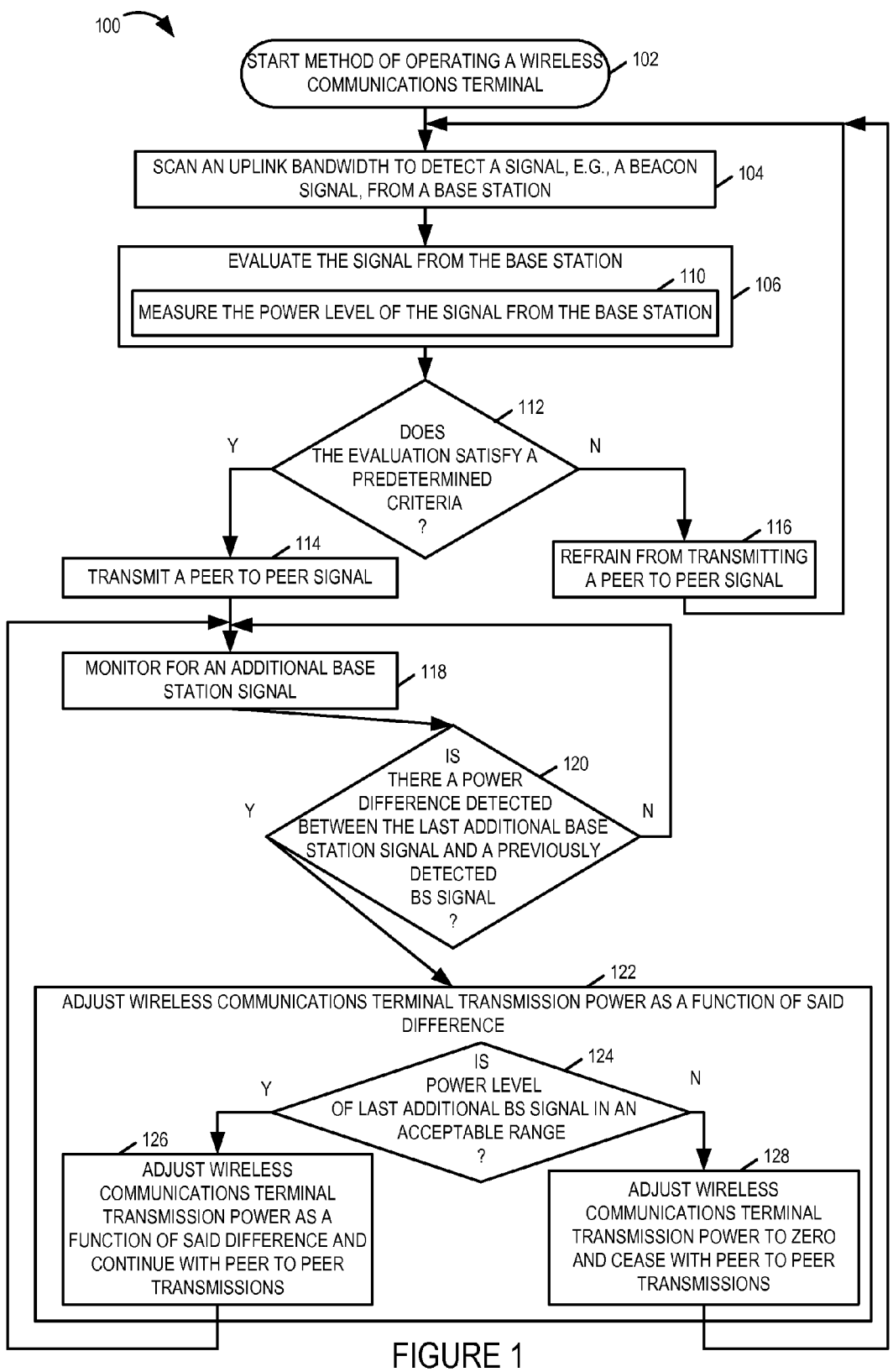
FIG. 1 is a flowchart of an exemplary method of operating a wireless communications terminal, e.g., a wireless communications terminal supporting peer to peer communications, in accordance with various embodiments.

FIG. 1 is a flowchart 100 of an exemplary method of operating a wireless communications terminal, e.g., a wireless communications terminal supporting peer to peer communications, in accordance with various embodiments. The exemplary method starts in step 102, where the wireless communications terminal is powered on and initialized. Operation proceeds from start step 102 to step 104. In step 104, the wireless communications terminal scans an uplink bandwidth to detect a signal from a base station, e.g., a beacon signal from a base station. In various embodiments, the uplink bandwidth includes a set of frequencies used for devices to transmit signals to the base station, e.g., a set of OFDM tones comprising an uplink tone block. In some embodiments, the signal being scanned for from the base station has a predetermined format. In some embodiments, the signal from the base station being scanned for is transmitted at a predetermined time, e.g., with respect to a recurring timing structure being used by the base station, or with respect to a predetermined time with respect to a peer to peer timing structure. In some embodiments, wherein the base station signal is a beacon signal, the beacon signal is a signal including less than three tones in an OFDM symbol.

Operation proceeds from step 104 to step 106, in which the wireless communications terminal evaluates the signal from the base station that it has detected. In some embodiments, evaluating the signal from the base station includes evaluating a transmission pattern of the base station signal. Step 106 includes sub-step 110. In sub-step 110, the wireless communications terminal measures the power level of the signal from the base station. Then, in step 112, the wireless communications terminal determines if the evaluation of step 106 satisfies a predetermined criteria. The predetermined criteria is, e.g., that the measured level of the signal received from the base station is below a predetermined threshold. The predetermined threshold is, in some embodiments, selected to correspond to an expected level of tolerable interference from the wireless communications device at the base station when the wireless communications device transmits peer to peer signals. If the criteria is satisfied, operation proceeds from step 112 to step 114; otherwise, operation proceeds from step 112 to step 116. In step 114, the wireless communications terminal transmits a peer to peer signal, while in step 116, the wireless communications terminal refrains from transmitting a peer to peer signal.

Operation proceeds from step 114 to step 118, in which the wireless communications terminal monitors for an additional base station signal, and then in step 120, the base station checks if there is a power difference detected between the last additional base station signal and a previously detected base station signal, e.g., the signal detected in step 104. If there is no power difference detected, the wireless communications terminal is allowed to continue with peer to peer transmissions and operation proceeds from step 120 back to step 118 to monitor for additional base station signals; however if a power difference was detected, then operation proceeds from step 120 to step 122.

In step 122, the wireless communications terminal adjusts wireless terminal transmission power as a function of said difference. Step 122 includes sub-steps 124, 126 and 128. In sub-step 124, the wireless communications terminal checks as to whether or not the power level of the last additional base station signal is in an acceptable range. If the power level of the last additional base station signal is too high, that may indicate that the wireless communications terminal is too close to the base station and that peer to peer transmission from the wireless communications terminal will cause too much interference from the perspective of the base station receiver, and thus such transmissions are not allowed. Alternatively, if the power level of the last additional base station signal is too low, that may indicate that the wireless communications device has moved outside the range of peer to peer service corresponding to the base station signal, and that the wireless communications terminal may be in a region corresponding to a different type of spectrum use, e.g., corresponding to a different service provider and/or different technology, and therefore wireless communications terminal transmission is not allowed. If it is determined in sub-step 124 that the power level of the last additional base station signal is not in an acceptable range then operation proceeds from sub-step 124 to sub-step 126; otherwise operation proceeds from sub-step 124 to sub-step 128.

In sub-step 126, the wireless communications terminal adjusts its transmission power as a function of said power difference and continues with peer to peer transmissions. During some times, adjusting the transmission power includes reducing transmission power as a function of said difference, while at other times, adjusting the transmission power as a function of said difference includes increasing the transmission power as a function of said difference. For example, if the wireless communications terminal detects an increase in the measured power level of the signal from the base station, the wireless communications reduces its peer to peer transmission signaling power level. Alternatively, if the wireless communications terminal detects a decrease in the measured power level of the signal from the base station, the wireless communications increases its peer to peer transmission signaling power level. While at still other times, adjusting wireless communications terminal transmission power as a function of said difference includes maintaining transmission power level at an upper limit cap level. Operation proceeds from sub-step 126 to step 118, where the wireless communications terminal monitors for an additional base station signal.

Returning to sub-step 128, in sub-step 128, the wireless communications terminal adjusts its transmission power to zero and ceases with peer to peer transmissions. Operation proceeds from sub-step 128 to step 104, where the wireless communications terminal scans for a base station signal.

Figure 2:
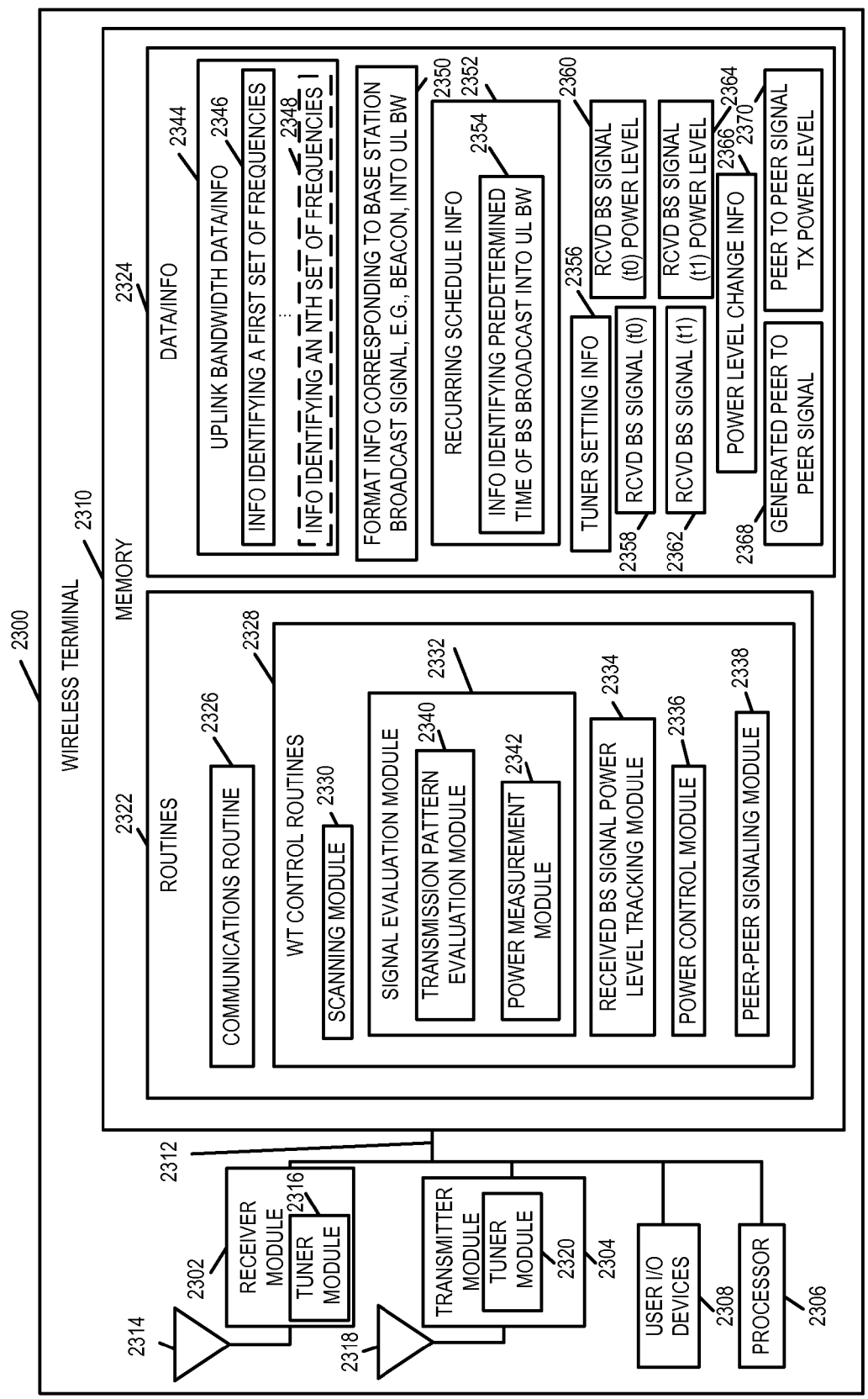
FIG. 2 is a drawing of an exemplary wireless terminal, e.g., mobile node supporting peer to peer communications, in accordance with various embodiments.

FIG. 2 is a drawing of an exemplary wireless terminal 2300, e.g., mobile node supporting peer to peer communications, in accordance with various embodiments. Exemplary wireless terminal 2300 includes a receiver module 2302, a transmitter module 2304, a processor 2306, user I/O devise 2308, and a memory 2310 coupled together via a bus 2312 over which the various elements may interchange data and information. Memory 2310 includes routines 2322 and data/information 2324. The processor 2306, e.g., a CPU, executes the routines 2322 and uses the data/information 2324 in memory 2310 to control the operation of the wireless terminal 2300 and implement methods, e.g., the method of flowchart 100 of FIG. 1.

Receiver module 2302, e.g., an OFDM receiver, is coupled to receive antenna 2314 via which the wireless terminal receives signals. Received signals include broadcast signals such as beacon signals transmitted by a base station into a frequency band being utilized for uplink cellular communications by the base station, e.g., during predetermined intervals of time in which the uplink cellular signaling is suspended. Received signals also include peer to peer signals from other wireless terminals operating in a peer to peer mode of operation, said peer to peer signals being communicated using the base station uplink frequency band, at least some of the peer to peer signals being communicated during intervals where uplink cellular communications are active. Receiver module 2302 also includes a tuner module 2316 for selecting the frequency band to be received.

Transmitter module 2304, e.g., an OFDM transmitter, is coupled to transmit antenna 2318 via which the wireless terminal 2300 transmits peer to peer signals. Wireless transmitter module's 2304 transmission of peer to peer signals is responsive to evaluation of detected signals from the base station. For example, the presence of a detected predetermined base station signal, e.g., a beacon signal which matches a predetermined format, e.g., a specific high power OFDM tone or set of tones in an OFDM symbol, in a potential cellular uplink bandwidth being scanned, in some embodiments, indicates that the uplink band is also available for peer to peer communications usage. Continuing with the example, the received power level of the base station broadcast signal in the uplink bandwidth, in some embodiments, is used by the wireless terminal 2300 to determine maximum allowable peer to peer transmission power. Transmitter module 2304 includes a tuner module 2320 which, in some embodiments, is set to an uplink frequency band being used by a base station. In some embodiments, the tuner module 2320 is set to tune the transmitter 2304 to use some, but not necessarily all of the set of the frequencies being used in an uplink cellular band. For example, the peer to peer communications band, in some embodiments, is a subset of an uplink cellular communications band to which it corresponds. At least some of the transmitted peer to peer signals are transmitted using the same air link resource as is being used for cellular uplink signaling. In some embodiments, the same antenna is used for both receiver module 2302 and transmitter module 2304. In some embodiments, both tuner modules (2316, 2320) are set to the same band for peer to peer communications, e.g., the same uplink cellular communications band.

User I/O devices 2308 include, e.g., microphones, keyboard, keypad, camera, switches, speaker, display, etc. User I/O devices 2308 allow a user of wireless terminal 2300 to input data/information, access output data/information, and control at least some functions of the wireless terminal 2300, e.g., initiate a peer to peer communications session.

Routines 2322 include a communications routine 2326 and wireless terminal control routines 2328. Communications routine 2326 implements the various communications protocols used by the wireless terminal 2300. Wireless terminal control routines 2328 control the operation of the wireless terminal 2300 and implement methods. The wireless terminal control routines 2328 include a scanning module 2330, a signal evaluation module 2332, a received base station signal power level tracking module 2334, a power control module 2336 and a peer to peer signaling module 2338.

Data/information 2324 includes uplink bandwidth data/information 2344, format information corresponding to a base station broadcast signal which is broadcast into an uplink bandwidth 2350, recurring schedule information 2352, tuner setting information 2356, received base station signal at time t0 2358, received base station signal (t0) power level information 2360, received base station signal at time t1 2362, received base station signal (t1) power level information 2364, power level change information 2366, generated peer to peer signal 2368, and peer to peer signal transmission power level information 2370.

Uplink bandwidth data/information 2344 includes one or more sets of information identifying a set of frequencies (information identifying a first set of frequencies 2346, ..., information identifying an Nth set of frequencies 2348). For example, in different parts of a WAN cellular communication system using FDD a different uplink FDD band is utilized, and information 2346 identifies a first uplink band and a first corresponding tuner setting while information 2348 identifies a different uplink band and a different corresponding tuner setting. For example, information identifying a first set of frequencies 2346 includes information identifying a set of contiguous OFDM tones used as an uplink FDD cellular communications band and which are also utilized for peer to peer communications.

Format information corresponding to a base station broadcast signal which is broadcast into an uplink bandwidth 2350 includes information used to characterize and identify such base station broadcast signals. For example, a particular beacon signal transmitted by a base station into an uplink bandwidth, in some embodiments, places equal amounts of energy on a small set, e.g., 1 to 3, OFDM tones of an OFDM symbol, and transmits the signal at a relatively high power level. Format information 2350 includes, e.g., information identifying sets of tones which correspond to a beacon signal.

Recurring schedule information 2352 includes recurring cellular uplink and downlink schedule information and peer to peer recurring schedule information. Recurring schedule information 2352 includes information identifying predetermined times of base station broadcasts into the uplink bandwidth 2354. For example, information 2354 includes information identifying when the scanning module 2330 should expect to receive broadcast signals from base stations.

Tuner setting information 2356 includes information identifying the setting of tuner modules 2316 and 2320. In some embodiments, in responses to a base station broadcast signal being detected in an uplink band being scanned, the wireless terminal 2300 identifies an uplink cellular band also available for peer to peer communications usage, and tuner module 2320 is set to the same setting as to which tuner module 2316 is currently set.

Received base station signal at time t0 2358 and received base station signal at time t1 2362 correspond to broadcast signals detected by scanning module 2330 at different times. The received base station broadcast signals 2358, 2362 are evaluated by signal evaluation module 2332 with power measurement module 2342 obtaining received base station signal t(0) power level 2360, received base station signal t(1) power level 2364, respectively. Power level change information 2366 is an output of received base station signal power level tracking module 2334, and is used as an input by power control module 2336 to control the transmission power level of peer to peer signals.

Scanning module 2330 scans an uplink bandwidth to detect a signal from a base station. For example, scanning module 2330 scans a base station uplink bandwidth, e.g., a base station uplink bandwidth which is a FDD band for cellular communications, to search to detect for the presence of a broadcast signal, e.g., a beacon signal, transmitted by a base station into the uplink bandwidth. In some embodiments, if the scanning module 2330 fails to detect the presence of a base station broadcast signal in an uplink bandwidth being scanned the scanning module 2330 switches to an alternative potential uplink band to scan. In various embodiments, the scanning module continues to monitor for additional base station signals after detecting the presence of a first broadcast signal from the base station and after transmitting a peer to peer signal.

Signal evaluation module 2332 evaluates the detected signal from the base station. Signal evaluation module 2332 includes a transmission pattern evaluation module 2340 and a power measurement module 2342. Transmission pattern evaluation module 2340 evaluates a transmission pattern of the base station signal. For example, transmission pattern evaluation module 2340 attempts to match a detected pattern such as a set of detected tones in a received OFDM symbol having a high relative power level with stored information characterizing an anticipated signal. In some embodiments, the pattern includes a sequence of tone sets which change, e.g., hop over time in accordance with a predetermined pattern. Power measurement module 2342 measures the power level of the signal from the base station, e.g., the power level of the beacon signal from the base station which has been transmitted in the uplink band. In some embodiments, the beacon signal is a signal including less than 3 tones in an OFDM symbol. In various embodiments, the wireless terminal continues to evaluate additional detected signals from the base station, e.g., measuring the power level of the additional received broadcast signals.

Received base station signal power level tracking module 2334 calculates changes in the received power level of detected broadcast signals from the base station. Power control module 2336 controls the transmission power level of peer to peer signals transmitted by wireless terminal 2300 as a function of received base station broadcast signal power measurement information and/or changes in received base station broadcast signal power level information. For example, the power control module 2336 adjusts peer to peer transmission power in response to detecting a difference between the received power of successive received base station broadcast signals. At times, power control module 2336 reduces peer to peer transmission power, said reduction being responsive to continued monitoring of the base station signaling.

Peer to peer signaling module 2338 generates peer to peer signals 2368 and controls transmitter module 2304 to transmit such signals at a power level in accordance with the peer to peer signal transmission power level 2370. The peer to peer transmission power level is an output of power control module 2336.

Figure 3:
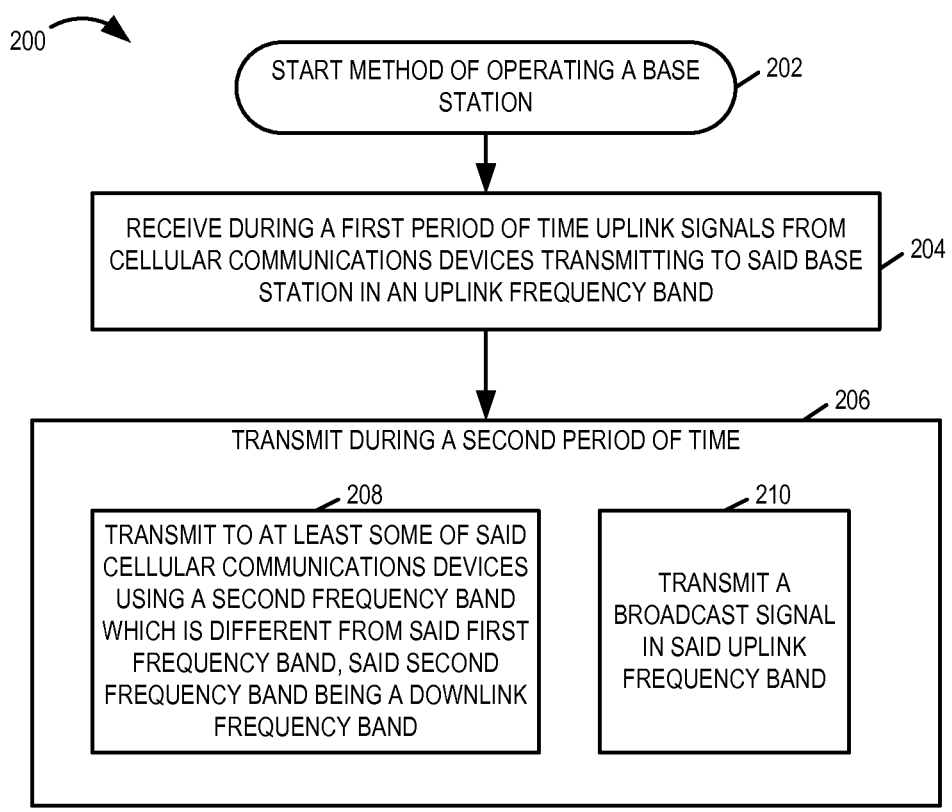
FIG. 3 is a flowchart of an exemplary method of operating a base station, in accordance with various embodiments.

FIG. 3 is a flowchart 200 of an exemplary method of operating a base station, in accordance with various embodiments. Operation starts in step 202, where the base station is powered on and initialized and proceeds to step 204.

In step 204, the base station receives, during a first period of time uplink signals from cellular communications devices transmitting to said base station in an uplink frequency band. Operation proceeds from step 204 to step 206.

In step 206, the base station transmits during a second period of time. Step 206 includes sub-steps 208 and 210, which may be, and sometimes are, performed in parallel. In sub-step 208, the base station transmits to at least some of said cellular communications devices using a second frequency band which is different from said first frequency band, said second frequency band being a downlink frequency band. In sub-step 210, the base station transmits a broadcast signal in said uplink frequency band. In some embodiments, the broadcast signal transmitted into said uplink frequency band is a beacon signal, e.g., an OFDM beacon signal including less than 3 OFDM tones in an OFDM symbol. In some embodiments, the broadcast signal transmitted into said uplink frequency band is a power transmission level control signal.

In some embodiments, the uplink signals from cellular communications devices are received during the first period of time in the presence of peer to peer communications signals transmitted into said uplink frequency band which interfere with said uplink signals. Thus the uplink frequency band is also concurrently utilized for peer to peer signaling.

Figure 4:
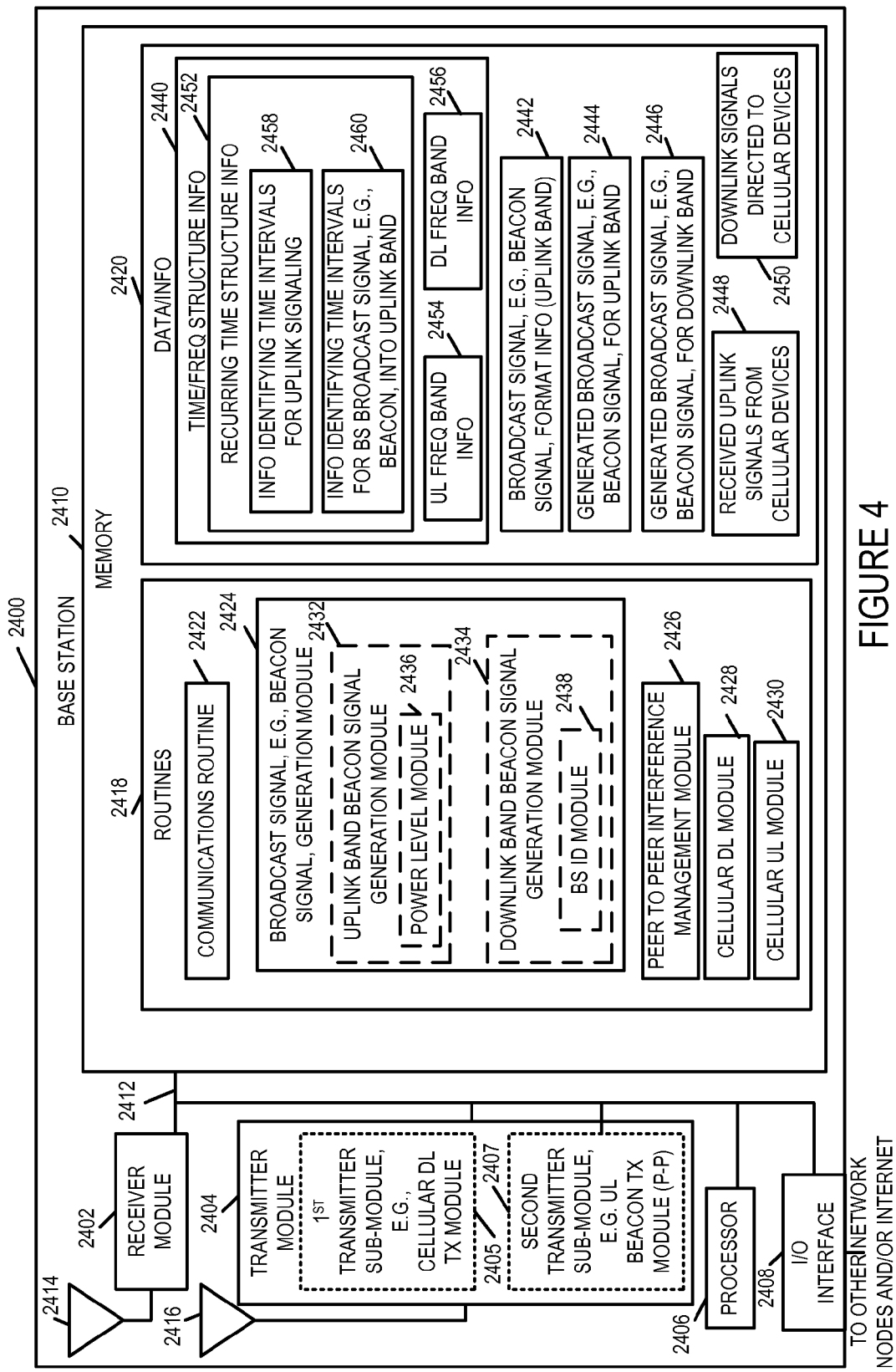
FIG. 4 is a drawing of an exemplary base station in accordance with various embodiments.

FIG. 4 is a drawing of an exemplary base station 2400 in accordance with various embodiments. Exemplary base station 2400 is, e.g., part of a WAN cellular communications system and uses an FDD uplink band and a FDD downlink frequency band. Continuing with the example, the base station 2400 also transmits a broadcast signal, e.g., a beacon signal, into the uplink communications band to support peer to peer communications. In some embodiments, the base station's implemented recurring timing structure intentionally suspends uplink signaling from cellular communications devices during predetermined intervals in which the base station 2400 transmits broadcast signals into the uplink communications band. In some such embodiments, the relative time allocated to the base station 2400 broadcast signals into the uplink band with respect to time allocated to uplink wireless terminal cellular signaling directed to the base station into the uplink band is less than or equal to 2%. In various embodiments, the uplink communications band is allowed to be utilized for peer to peer signaling concurrently with cellular uplink communications. In some such embodiments, the base station 2400 manages the interference from the peer to peer devices, and the interference management includes varying the transmission power level of the broadcast signal transmitted into the uplink communications band. Peer to peer devices receiving the broadcast signal control their transmission power levels as a function of the received power level of the base station broadcast signal into the uplink communications band.

Base station 2400 includes a receiver module 2402, a transmitter module 2404, a processor 2406, an I/O interface 2408, and memory 2410 coupled together via a bus 2412 over which the various elements may exchange data and information. Memory 2410 includes routines 2418 and data/information 2420. The processor 2406, e.g., a CPU, executes the routines 2418 and uses the data/information 2420 in memory 2410 to control the operation of the base station and implement methods, e.g., the method of flowchart 200 of FIG. 3.

Receiver module 2402, e.g., an OFDM receiver, is coupled to receive antenna 2414 via which the base station 2400 receives during a first period of time uplink signals from cellular communications devices transmitting to the base station 2400 in an uplink frequency band. Uplink signals from cellular communications devices are received during the first period of time in the presence of peer to peer communications signals transmitted in the uplink frequency band which interfere with the uplink signals.

Transmitter module 2404, e.g., an OFDM transmitter, is coupled to transmit antenna 2416, via which the base station 2400 transmits to at least some of the cellular communications devices using a downlink frequency band and for transmitting a broadcast signal during a second period of time in said uplink frequency band, wherein said downlink frequency band is different from said uplink frequency band and wherein said first period of time and said second period of time are non-overlapping. Downlink signals intended for cellular communications devices include, e.g., downlink band beacon signals, assignment signals, paging signals and traffic signals. In some embodiments, the transmitter module 2404 includes a first transmitter sub-module 2405 and a second transmitter sub-module 2407. For example, first transmitter sub-module 2405 is used for downlink cellular signaling, and the second transmitter sub-module 2407 is used for transmitting a broadcast signal such as beacon signal into an uplink frequency band.

One advantage of an implementation using individual first and second transmitter sub-module 2405, 2507 is that first transmitter sub-module 2405 can be set to transmit on a downlink FDD band and need not have to accommodate the UL TDD band into which the broadcast signal used for peer to peer support is communicated. For example, receiver module 2402 and second transmitter sub-module 2407 can be tuned to the same UL FDD band, while first transmitter module 2405 can be tuned to a DL FDD band, and downlink cellular communications can continue in an uninterrupted manner. Another advantage of this approach is that an existing base station supporting cellular communications can be adapted to support peer to peer communications utilizing the same uplink FDD band by insertion of second transmitter sub-module 2407 into the base station along with some software modifications, e.g., to alter the uplink timing structure to suspend uplink cellular communications during the brief intervals of base station signaling into the uplink frequency band.

I/O interface 2408 couples the base station 2400 to other network nodes, e.g., other base stations, AAA nodes, home agent nodes, and/or the Internet. I/O interface 2408, by coupling base station 2400 to a backhaul network, allows a cellular communications device using base station 2400 as its point of network attachment to participate in a communications session with another cellular communications device using a different base station as its point of network attachment.

Routines 2418 include a communications routine 2422, a broadcast signal, e.g., beacon signal, generation module 2424, a peer to peer interference management module 2426, a cellular downlink module 2428 and a cellular uplink module 2430. Communications routine 2422 implements the various communications protocols used by the base station 2400. Broadcast signal generation module 2424 generates broadcast signals used by cellular communications devices and peer to peer communications devices. In some embodiments, at least some of the downlink band broadcast signals, e.g., downlink band beacon signals, generated by module 2424 convey base station identification information, e.g., cell, sector, and/or attachment point information. In some embodiments, at least some of the uplink band broadcast signals, e.g., uplink band beacon signals, generated by module 2424 are transmission power level control signals, e.g., a signal used to control a peer to peer device's maximum transmission power level.

In some embodiments, the broadcast signal generation module 2424 includes an uplink band beacon signal generation module 2432 for generating a beacon signal to be transmitted into an uplink frequency band and a downlink band beacon signal generation module 2434 for generating a beacon signal to be transmitted into a downlink frequency band. In various embodiments, the uplink band beacon signal generation module 2432 includes a power level module 2436 for setting the transmission power level of the beacon signal into the uplink band as a function of information received from the peer to peer interference management module 2426. In some embodiments, the downlink band beacon signal generation module 2434 includes a base station identification module 2438 for incorporating base station identification information into the downlink band beacon signal. In some embodiments, a generated downlink band beacon signal corresponding to a base station attachment point is transmitted at the same transmission power level, while the transmission power level of a generated uplink band beacon signal is transmitted at different power levels at different times, e.g., as part of the management of peer to peer signaling which is causing interference with regard to base station receiver 2402 reception of cellular communication uplink signals.

Peer to peer interference management module 2426 manages peer to peer signaling interference levels being experienced at receiver module 2402 by operations including setting a power level for a broadcast signal, e.g., a beacon signal, to be transmitted into the uplink frequency band. In some embodiments, the peer to peer interference management module 2426 determines to increase the power level of the transmitted broadcast signal into the uplink band when it desires to reduce levels of interference from peer to peer signaling, and decreases the power level of the transmitted broadcast signal into the uplink band when it desires to allow increased levels of interference from peer to peer signaling.

Cellular downlink module 2428 controls the generation and transmission of downlink signals directed to cellular devices 2450. Cellular uplink module 2430 controls the reception of uplink signals from cellular communications devices and the recovery of information from those signals obtaining received uplink signals from cellular devices 2448.

Data/information 2420 includes time/frequency structure information 2440, broadcast signal format information 2442, a generated broadcast signal to be transmitted into the uplink band 2444, a generated broadcast signal 2446 to be transmitted into the downlink band 2446, received uplink signals from cellular devices 2448, and downlink signals directed to cellular devices 2450. Time/frequency structure information 2440 includes recurring time structure information 2452, uplink frequency band information 2454 and downlink frequency band information 2456. Recurring time structure information 2452 includes information identifying time intervals for uplink signals 2458 and information identifying time intervals used for base station broadcast signals into the uplink band 2460. Information identifying time intervals for uplink signals 2458 includes, e.g., information identifying access intervals and information identifying intervals used for at least one of uplink control signaling and uplink traffic signaling. Information identifying time intervals for base station broadcast signals into the uplink band 2460 identifies intervals used for base station transmission of broadcast signals, e.g., beacon signals, into an uplink band, during which normal uplink cellular communication signaling is suspended. Thus the base station broadcast signal, e.g., beacon signal, into the uplink frequency band is not interfered with by cellular uplink signals directed to base station 2400, facilitating recovery of the broadcast signal by peer to peer wireless communications devices. In some embodiments, the ratio of allocation of time to base station broadcast into the uplink band and cellular uplink signaling into the uplink band is less than or equal to 2%.

Uplink frequency band information 2454 includes information identifying a set of frequencies, e.g., a set of contiguous OFDM tones, to be used as a cellular uplink FDD band by the base station 2400 and carrier frequency information corresponding to the band. The uplink frequency band is also to be utilized as a peer to peer communications band with at least some peer to peer communications using the same air link resources as uplink cellular communications. The base station 2400 also transmits a broadcast signal into the uplink communications band. Downlink frequency band information 2456 includes information identifying a set of frequencies, e.g., a set of contiguous OFDM tones, to be used as a cellular downlink FDD band by the base station 2400 and carrier frequency information corresponding to the band.

Broadcast signal format information 2442, e.g., information identifying the format of a beacon signal to be transmitted into an uplink frequency band, includes, e.g., information identifying a set of tones, e.g., 1 to 3 tones, to be used to represent the beacon signal. In some embodiments, a set of tones corresponding to a beacon signal, are hopped over time in accordance with a predetermined hopping sequence and such information is also included in information 2442.

Generated broadcast signal for uplink band 2444, e.g., a beacon signal, is an output of broadcast signal generation module 2424. For some embodiments, information 2444 is an output of uplink band beacon signal generation module 2432. Generated broadcast signal for downlink band 2444, e.g., a beacon signal, is an output of broadcast signal generation module 2424. For some embodiments, information 2446 is an output of downlink band beacon signal generation module 2434.

Figure 5:
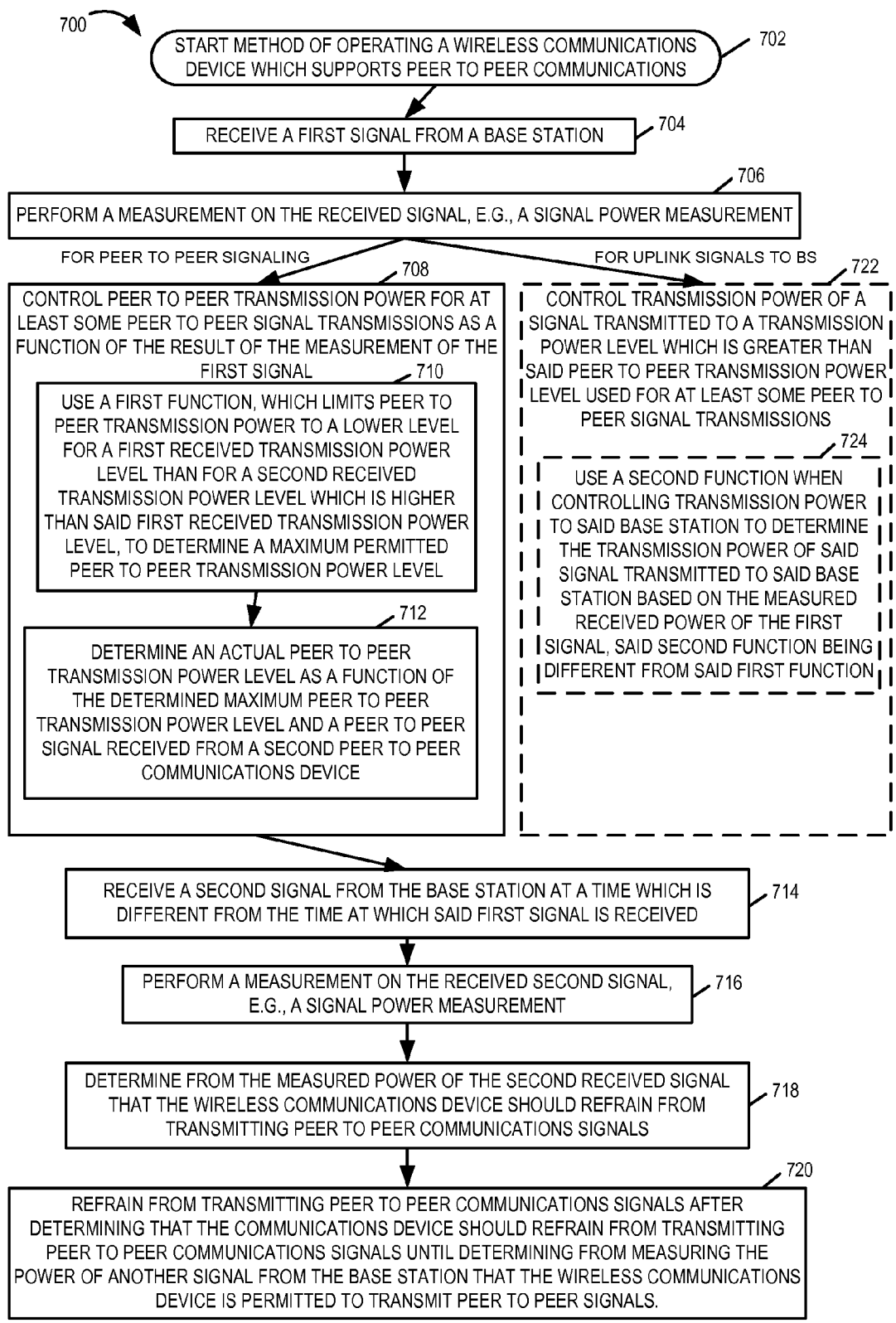
FIG. 5 is a flowchart of an exemplary method of operating a wireless communications device which supports peer to peer signaling in accordance with various embodiments.

FIG. 5 is a flowchart 700 of an exemplary method of operating a wireless communications device which supports peer to peer signaling in accordance with various embodiments. Operation starts in step 702, where the wireless communications device is powered on and initialized and proceeds to step 704, where the wireless communications device receives a first signal from a base station. In some embodiments, the first signal is received in an uplink frequency band used to transmit uplink signals to the base station. In some other embodiments, the first signal is received in a frequency band which is a downlink frequency band used by said base station and peer to peer signals are transmitted in another frequency band. In such an embodiment, the another frequency band used for peer to peer signaling may be, and sometimes is, an uplink frequency band used to transmit uplink signals to the base station. The approach of using the uplink frequency band to convey the first signal from the base station has the advantage that a peer to peer wireless communications device can remain on the same frequency band used for peer to peer signals and still be able to monitor for the first signal from the base station. This facilitates a simple design and/or low cost implementation for the peer to peer wireless communications device. However, there is additional complexity at the base station since it now transmits into a band it did not previously use for transmissions.

Alternatively, the approach of using the downlink band of the base station to convey the first signal is easier from the base station's perspective; however, the peer to peer wireless communications device requires additional complexity and/or cost since it needs to monitor two bands, e.g., involving multiple receivers and/or the complexity involved in switching between bands.

Operation proceeds from step 704 to step 706. In step 706, the wireless communications device performs a measurement on the received signal, e.g., a signal power measurement. Operation proceeds to one or more of steps 708 and 722. In some embodiments, the wireless communications device supports peer to peer signaling, but does not support uplink signaling to the base station, e.g., as part of a cellular network, and in such embodiments, step 722 is not an option. In some embodiments, the wireless communications device supports, at any given time one of a peer to peer mode and a cellular mode of operation, and for a given time, operation can proceed to one of step 708 and step 722. In some embodiments, the wireless communications device supports concurrent peer to peer signaling and cellular signaling and operation may proceed from step 706 to steps 708 and step 722.

Operation proceeds from step 706 to step 708 for peer to peer signaling, while operation proceeds from step 706 to step 722 for uplink signals to the base station. In step 708, the wireless communications device controls peer to peer transmission power for at least some peer to peer signal transmissions as a function of the result of the measurement of the first signal. Step 708 includes sub-steps 710 and 712. In sub-step 710, the wireless communications device uses a first function, which limits peer to peer transmission power to a lower level for a first received signal power level than for a second received signal power level which is higher than said first received signal power level, to determine a maximum transmission permitted peer to peer transmission power level. Then, in sub-step 712, the wireless communications device determines an actual peer to peer transmission power level as a function of the determined maximum peer to peer transmission power level and a peer to peer signal received from a second peer to peer communications device. The second peer to peer communications device is, e.g., the peer device with which the communications device performing the operations of flowchart 700 is having a peer to peer communications session. Thus, the peer to peer transmission power level, in some embodiments, is influenced by both a received base station signal and a peer to peer signal. The peer to peer signal, in some embodiments, communicates and/or is used to derive at least one of: peer to peer channel condition information, peer to peer data rate information, peer to peer data backlog information, peer to peer latency information, noise information, error rate information, service level information and peer to peer power control information. In some embodiments, the actual peer to peer transmission power is restricted to be equal to or below the determined maximum peer to peer transmission power level. In some embodiments, for at least some conditions, e.g., a high priority user or a certain service level, the actual peer to peer transmission level can sometimes exceed, e.g., override, the determined maximum peer to peer transmission power level which is based on the received base station signal. Operation proceeds from step 708 to step 714.

In step 714, the wireless communications device receives a second signal from the base station at a time which is different from the time at which said first signal is received. Then, in step 716, the wireless communications device performs a measurement of the received second signal, e.g., a power measurement of the received second signal. Operation proceeds from step 716 to step 718, in which the wireless communications devices determines from the measured power of the second received signal that the wireless communications device should refrain from transmitting peer to peer communications signals. Operation proceeds from step 718 to step 720. In step 720, the wireless communications device refrains from transmitting peer to peer communications signals after determining that the communications device should refrain from transmitting peer to peer communications signals until determining from measuring the power of another signal from the base station that the wireless communications device is permitted to transmit peer to peer signals.

Returning to step 722, in step 722, the wireless communications device controls transmission power of a signal transmitted to a transmission power level which is greater than said peer to peer transmission power level used for at least some peer to peer signal transmissions. Step 722 includes sub-step 724. In sub-step 724, the wireless communications device uses a second function when controlling transmission power to said base station to determined the transmission power of said signal transmitted to said base station based on the measured power of the received first signal, said second function being different from said first function. In some embodiments, the peer to peer transmission signal power level is at least 10 dBs below the transmission power level of the said signal transmitted to the base station.

Figure 6:
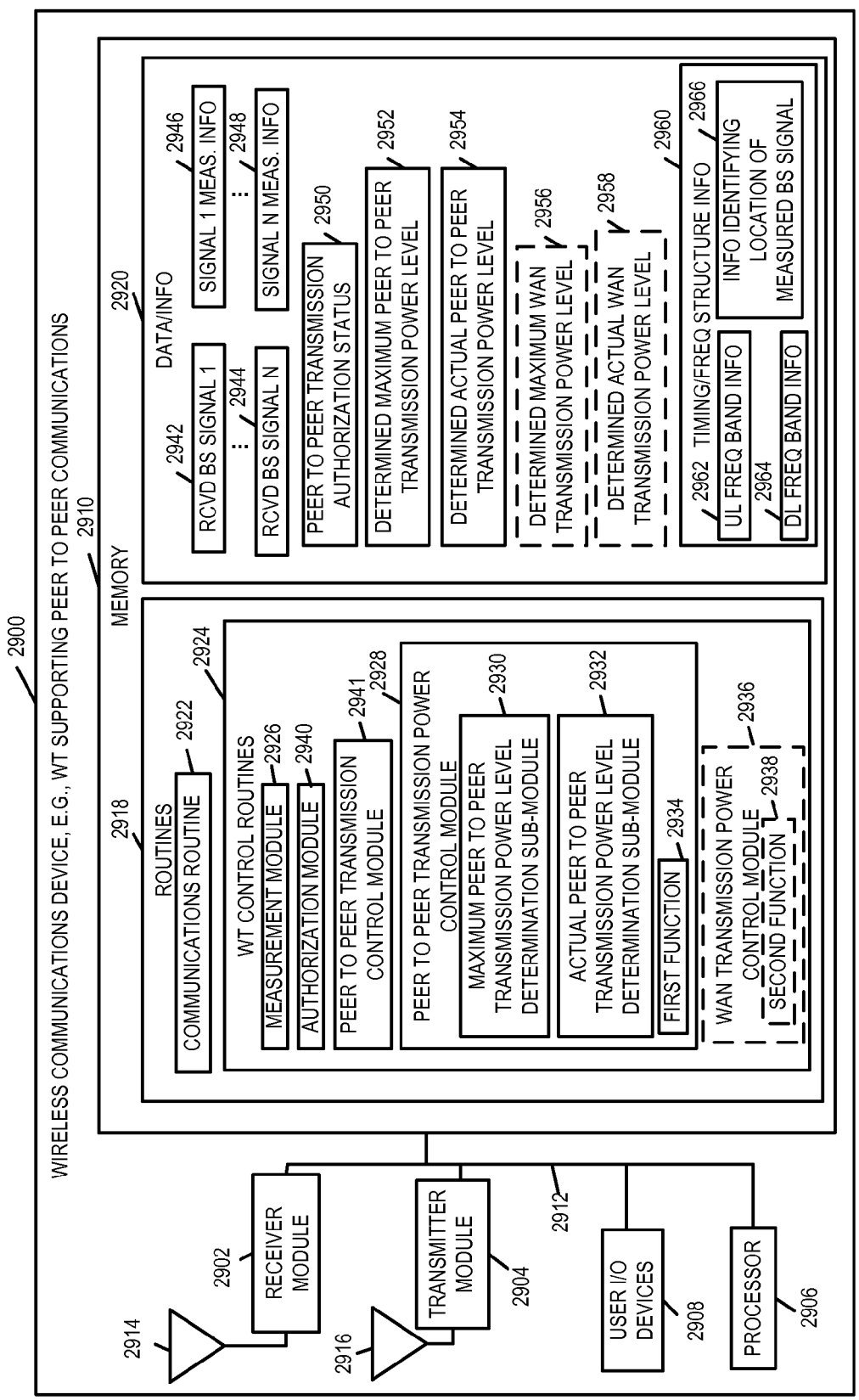
FIG. 6 is a drawing of an exemplary wireless communications device, e.g., a wireless terminal such as a mobile node, supporting peer to peer communications in accordance with various embodiments.

FIG. 6 is a drawing of an exemplary wireless communications device 2900, e.g., wireless terminal such as a mobile node, supporting peer to peer communications in accordance with various embodiments. Exemplary communications device 2900 can, and sometimes does, use a WAN uplink band in which to conduct peer to peer communications. Exemplary wireless communications device 2900 receives a signal from a base station which it utilizes in determining whether or not it is permitted to transmit peer to peer signals into the base station's uplink band and/or peer to peer transmission power level information, e.g., a maximum peer to peer transmission power level.

Wireless communications device 2900 includes a receiver module 2902, a transmitter module 2904, user I/O devices 2908, a processor 2906, and memory 2910 coupled together via a bus 2912 over which the various elements may interchange data and information. Memory 2910 includes routines 2918 and data/information 2920.

The processor 2906, e.g., a CPU, executes the routines 2918 and uses the data/information 2920 in memory 2910 to control the operation of the wireless communications device 2900 and implement methods.

Receiver module 2902, e.g., an OFDM receiver, is coupled to receive antenna 2914 via which the wireless communications device 2900 receives a signal from a base station, said received signal used in determining peer to peer transmission power level information. Receiver module 2902 also receives peer to peer communications signals. In some embodiments, during some times, receiver module 2902 receives downlink signals, e.g., assignment signals and traffic signals, from a base station that the wireless communications device is using as a point of attachment in a wide area network, with the communications device 2900 functioning as a cellular communications device.

Transmitter module 2904, e.g., an OFDM transmitter, is coupled to transmit antenna 2916, via which the wireless communications device 2900 transmits peer to peer signals to other wireless communications devices. In some embodiments, during some time intervals, the transmitter module 2904 transmits uplink signals to a base station, with the wireless communications device functioning in a WAN mode of operation, e.g., a cellular mode of operation.

User I/O devices 2908 include, e.g., microphone, keyboard, keypad, mouse, camera, switches, speaker, display, etc. User I/O devices 2908 allow a user of wireless communications device 2900 to input data/information, access output data/information, and control at least some functions of the wireless communications device 2900, e.g., attempt to initiate a peer to peer communications session.

Routines 2918 includes a communications routine 2922 and wireless terminal control routines 2924. The communications routine 2922 implements the various communications protocols used by the wireless communications device 2900. Wireless terminal control routines 2924 include a measurement module 2926, an authorization module 2940, peer to peer transmission control module 2941 and a peer to peer transmission power control module 2928. In some embodiments, e.g., an embodiment supporting both peer to peer communications and WAN communications, e.g., cellular communications, the wireless terminal control routines 2924 include a wide area network transmission power control module 2936.

Measurement module 2926 performs a measurement on a received signal from a base station. Signals (2942, 2944) represent inputs to measurement module 2926 while information (2946, 2948) represents outputs of measurement module 2926. In various embodiments, the measurement of measurement module 2926 is a signal power measurement.

Authorization module 2940 can, and sometimes does, determine from the measured power of a received base station signal that the wireless communications device 2900 should refrain from transmitting peer to peer signals. Authorization module 2940 can, and sometimes does, determine from the measured power of a received base station signal that the wireless communications device 2900 is permitted to transmit peer to peer signals. Peer to peer transmission authorization status 2950 is an output of authorization module 2940 and is used as an input by peer to peer transmission control module 2941.

Peer to peer transmission control module 2941 controls the wireless transmitter module 2904 to refrain from transmitting peer to peer communications signals after determining that the communications device 2900 should refrain from transmitting peer to peer signals until determining that the wireless communications device 2900 is permitted to transmit peer to peer signals. Thus peer to peer transmission control module 2941, using peer to peer transmission authorization status 2950, functions as a peer to peer transmit enable/disable controller.

Peer to peer transmission power control module 2928 controls peer to peer transmission power for at least some peer to peer signal transmissions as a function of the result of a measurement of a received base station signal. Peer to peer transmission power control module 2928 includes a maximum peer to peer transmission power level determination sub-module 2930, an actual peer to peer transmission power level determination sub-module 2932 and a first function 2934. The peer to peer transmission power control module 2928 uses the first function 2934 which limits peer to peer transmission power to a lower level for a first received signal power level than for a second received signal power level which is higher than said first received signal power level. In various embodiments, the peer to peer transmission power control module 2928 limits peer to peer transmission power to lower levels in response to greater measured received signal power levels.

Maximum peer to peer transmission power level sub-module 2930 uses the first function 2934 to determine a maximum peer to peer transmission power level. Actual peer to peer transmission power level sub-module 2932 determines an actual peer to peer signal transmission power level as a function of said maximum peer to peer transmission power level and a peer to peer signal received from a second peer to peer communications device. In various embodiments, sub-module 2932 controls the actual determined peer to peer transmission power level to be less than or equal to the maximum peer to peer transmission power level.

Wide area network transmission power control module 2936 controls transmission power of a signal transmitted to the base station to a transmission power level which is greater than said peer to peer transmission power level used for at least some peer to peer signal transmission. WAN transmission power control module 2936 includes a second function 2938 which is different from the first function 2934. The wide area network transmission power control module 2936 control of transmission power of a signal transmitted to said base station includes using the second function 2938 which is different from the first function 2934 to determine the transmission power level of a signal transmitted to the base station based on the measured received power level of a signal from the base station.

For example, received base station signal N 2944 is measured by measurement module 2926 obtaining signal N measurement information 2948 which is input to both peer to peer transmission power control module 2928 and WAN transmission power control module 2936. Peer to peer module 2928 uses first function 2934 to process input 2848 and obtains a determined maximum peer to peer transmission power level 2952, while WAN module 2936 processes the same input 2948 using the second function 2938 and obtains a determined maximum WAN transmission power level 2956 which is a higher level than the determined maximum peer to peer transmission power level 2952.

In various embodiments, the peer to peer transmission signal power level is at least 10 dBs below the transmission power level of the signal transmitted to the base station. For example, determined maximum peer to peer transmission power level 2952 is a least 10 dBs below determined maximum WAN transmission power level 2956 for the same value of measured base station signal. As another example, in some embodiments, if a wireless terminal is at a location and has determined peer to peer transmission power level information and WAN transmission power level information based on the same received base station signal measurement, the determined actual peer to peer transmission power level 2954 is at least 10 dBs below the determined actual WAN transmission power level 2958.

Data/information 2920 includes a plurality of received signals from a base station which are measured and utilized in determining transmission power level information (received base station signal 1 2942, . . . , received base station signal N 2944), a plurality of corresponding signal measurement information (signal 1 measurement information 2946, . . . , signal N measurement information 2948), respectively. Data/information 2920 also includes peer to peer transmission authorization status information 2950 which indicates whether or not the wireless communications device 2900 is currently allowed to transmit peer to peer signals. Data/information 2920 also includes a determined maximum peer to peer transmission power level 2952 which is the output of sub-module 2930 and a determined actual peer to peer transmission power level 2954 which is the output of sub-module 2932.

Timing/frequency structure information 2960, included as part of data/information 2920, includes uplink frequency band information 2962, e.g., WAN uplink bandwidth information, WAN uplink carrier information and uplink WAN tone set information, downlink frequency band information 2964, e.g., WAN downlink bandwidth information, WAN downlink carrier information and downlink WAN tone set information, and information identifying the location of the measured base station signals 2966. In this exemplary embodiment peer to peer communications signaling uses a WAN uplink frequency band being used by a base station with the peer to peer signals acting as interference to the WAN uplink signals directed to the base station. The signal, which is received by wireless communications device 2900, is measured, and the measurement is utilized to control wireless communications device peer to peer transmission power level; in some embodiments, the signal is communicated in the WAN uplink band, while in other embodiments, the signal is communicated in the WAN downlink band. Information 2966 identifies which WAN band carries this signal, and in some embodiments, identifies more specific information corresponding to the signal, e.g., a point in a recurring timing structure and/or specific tone information used to identify the signal.

In various embodiments in which the wireless communications device 2900 supports WAN communications, e.g., cellular communications, data/information 2920 also includes determined maximum WAN transmission power level information 2956 and determined actual WAN transmission power level information 2958, which are outputs of WAN transmission power control module 2936.

Figures 7, 7A:
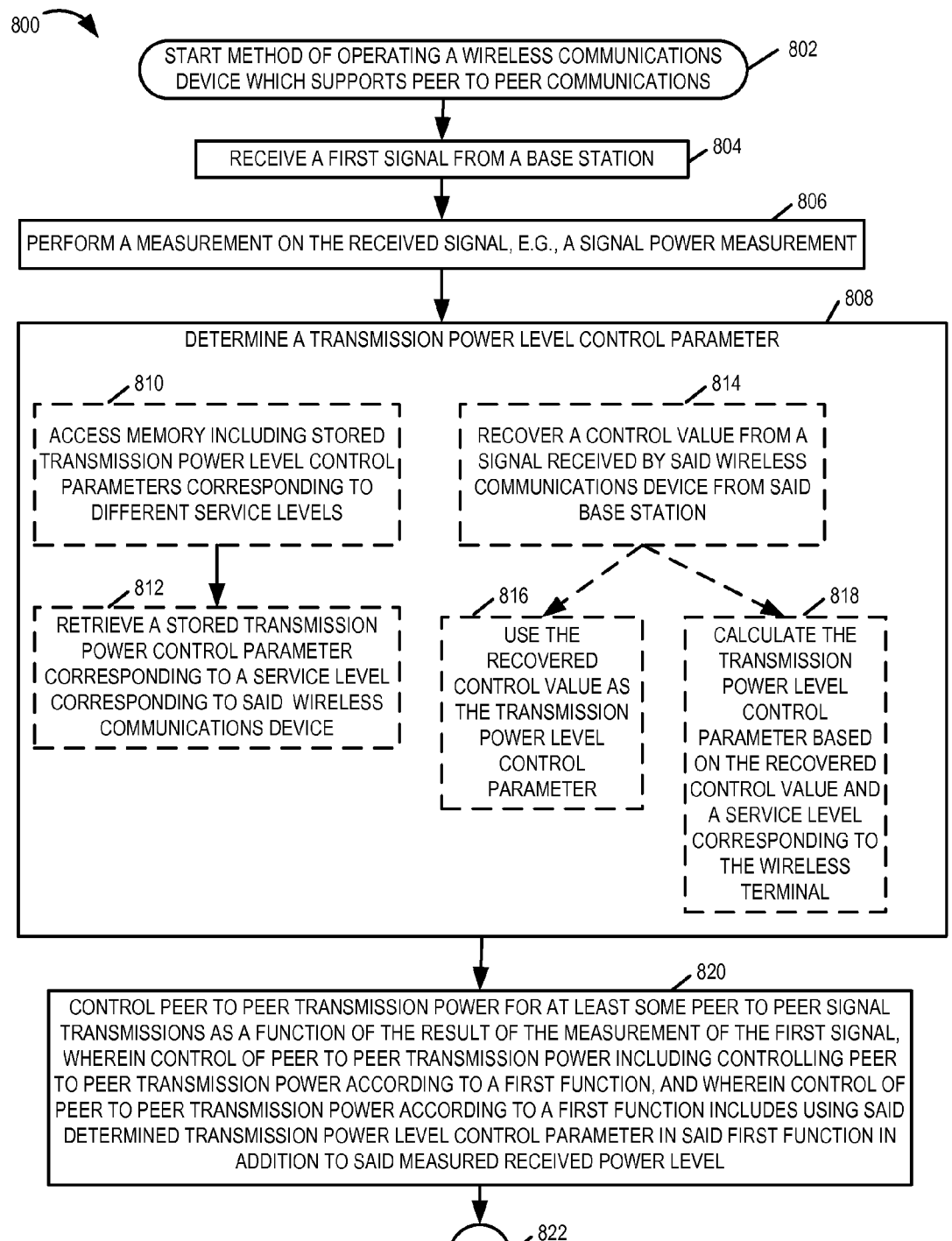
FIG. 7 comprising the combination of FIG. 7A
Figure 7B:
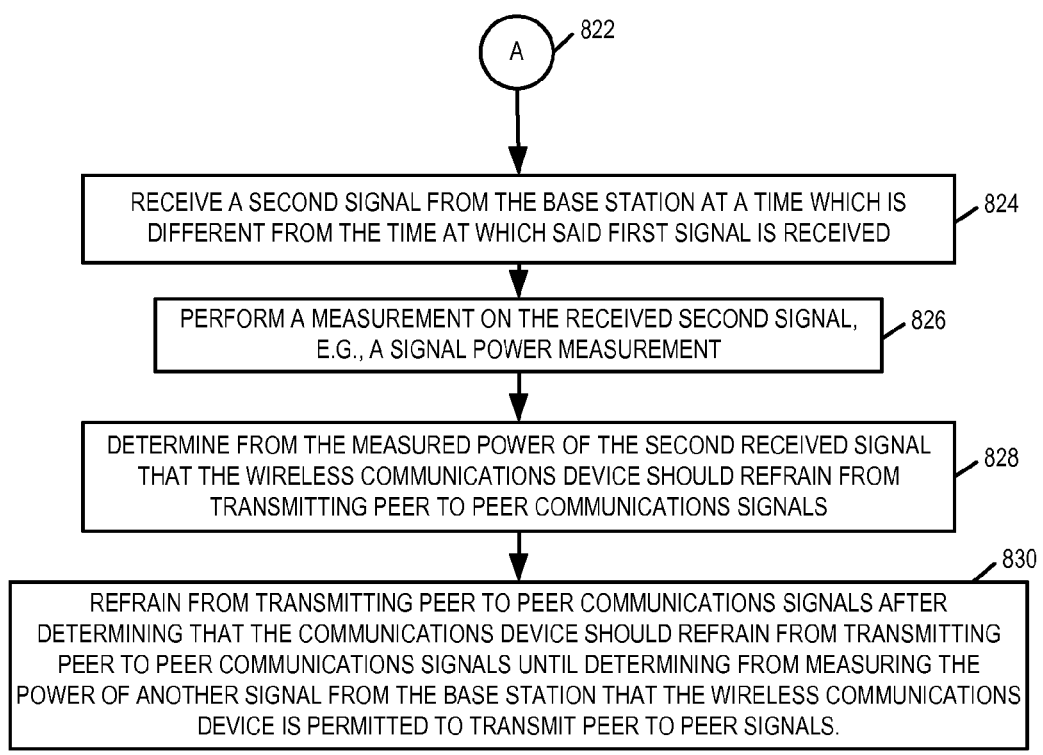
FIG. 7B is a flowchart of an exemplary method of operating a wireless communications device supporting peer to peer communications in accordance with various embodiments.

FIG. 7 comprising the combination of FIG. 7A and FIG. 7B is a flowchart 800 of an exemplary method of operating a wireless communications device supporting peer to peer communications in accordance with various embodiments. Operation starts in step 802, where the wireless communications device is powered on and initialized and proceeds to step 804, where the wireless communications device receives a first signal from a base station. In some embodiments, the first signal is received in an uplink frequency band used to transmit uplink signals to the base station. In some other embodiments, the first signal is received in a frequency band which is a downlink frequency band used by said base station and peer to peer signals are transmitted in another frequency band. In such an embodiment, the another frequency band used for peer to peer signaling may be, and sometimes is an uplink frequency band used to transmit uplink signals to the base station.

Operation proceeds from step 804 to step 806. In step 806, the wireless communications device performs a measurement on the received signal, e.g., a signal power measurement. Operation proceeds from step 806 to step 808.

In step 808 the wireless communications device determines a transmission power level control parameter. In one exemplary embodiment step 808 includes sub-steps 810 and 812. In another exemplary embodiment step 808 includes sub-step 814 and 816. In still another exemplary embodiment step 808 includes sub-steps 814 and 818.

In sub-step 810, the wireless communications device accesses memory, including stored transmission power level control parameters corresponding to different service levels, and then in sub-step 812 the wireless communications device retrieves a stored transmission power corresponding to a service level corresponding to said wireless communications device.

In sub-step 814, the wireless communications device recovers a control value from a signal received by said wireless communications device from said base station. In some embodiments, the signal from which the control value is recovered is the first signal which was received in step 804. Operation proceeds from sub-step 814 to one of sub-steps 816 and 818. In sub-step 816, the wireless communications device uses the recovered control value as the transmission power level control parameter. Alternatively, in sub-step 818, the wireless communications device calculates the transmission power level control parameter based on the recovered control value and a service level corresponding to the wireless terminal.

Operation proceeds from step 808 to step 820. In step 820, the wireless communications device controls peer to peer transmission power for at least some peer to peer transmissions as a function of the result of the measurement of the first signal, wherein control of peer to peer transmission power includes controlling peer to peer transmission power according to a first function, and wherein controlling peer to peer transmission power according to a first function includes using said determined transmission power level control parameter in said first function in addition to said measured received power level. Operation proceeds from step 820 via connecting node A 822 to step 824.

In step 824, the wireless communications device receives a second signal from the base station at a time which is different from the time at which said first signal is received. Then, in step 826, the wireless communications device performs a measurement of the received second signal, e.g., a power measurement of the received second signal. Operation, proceeds from step 826 to step 828, in which the wireless communications device determines from the measured power of the second received signal that the wireless communications device should refrain from transmitting peer to peer communications signals. Operation proceeds from step 828 to step 830. In step 830, the wireless communications device refrains from transmitting peer to peer communications signals after determining that the communications device should refrain from transmitting peer to peer communications signals until determining from measuring the power of another signal from the base station that the wireless communications device is permitted to transmit peer to peer signals.

Figure 8:
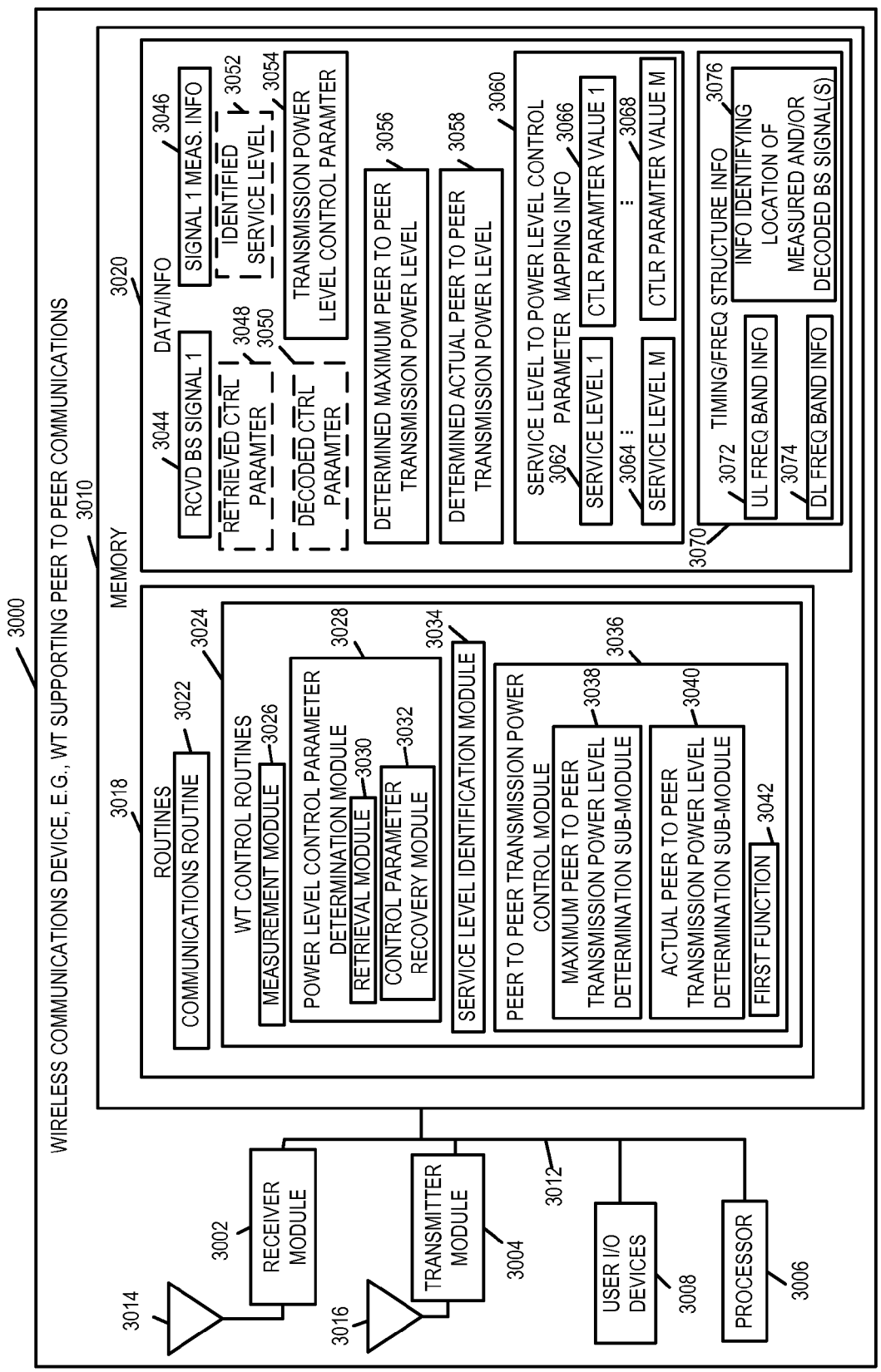
FIG. 8 is a drawing of an exemplary wireless communications device, e.g., wireless terminal such as a mobile node, supporting peer to peer communications in accordance with various embodiments.

FIG. 8 is a drawing of an exemplary wireless communications device 3000, e.g., wireless terminal such as a mobile node, supporting peer to peer communications in accordance with various embodiments. Exemplary communications device 3000 can, and sometimes does, use a WAN uplink band in which to conduct peer to peer communications. Exemplary wireless communications device 3000 receives a signal from a base station which it utilizes in determining whether or not it is permitted to transmit peer to peer signals into the base station's uplink band and/or in determining peer to peer transmission power level information, e.g., a maximum peer to peer transmission power level.

Wireless communications device 3000 includes a receiver module 3002, a transmitter module 3004, user I/O devices 3008, a processor 3006, and memory 3010 coupled together via a bus 3012 over which the various elements may interchange data and information. Memory 3010 includes routines 3018 and data/information 3020.

The processor 3006, e.g., a CPU, executes the routines 3018 and uses the data/information 3020 in memory 3010 to control the operation of the wireless communications device 3000 and implement methods, e.g., the method of flowchart 800 of FIG. 7.

Receiver module 3002, e.g., an OFDM receiver, is coupled to receive antenna 3014 via which the wireless communications device 3000 receives a signal from a base station, said received signal used in determining peer to peer transmission power level information. Receiver module 3002 also receives peer to peer communications signals. Transmitter module 3004, e.g., an OFDM transmitter, is coupled to transmit antenna 3016, via which the wireless communications device 3000 transmits peer to peer signals to other wireless communications devices.

User I/O devices 3008 include, e.g., microphone, keyboard, keypad, mouse, camera, switches, speaker, display, etc. User I/O devices 3008 allow a user of wireless communications device 3000 to input data/information, access output data/information, and control at least some functions of the wireless communications device 3000, e.g., attempt to initiate a peer to peer communications session.

Routines 3018 includes a communications routine 3022 and wireless terminal control routines 3024. The communications routine 3022 implements the various communications protocols used by the wireless communications device 3000. Wireless terminal control routines 3024 include a measurement module 3026, a power level control parameter determination module 3028, a service level identification module 3034 and a peer to peer transmission power control module 3036.

Measurement module 3026 performs a measurement on a received signal from a base station. Received base station signal 1 3044 represents an input to measurement module 3026 while signal 1 measurement information 3046 represents an output of measurement module 3026. In various embodiments, the measurement of measurement module 3026 is a signal power measurement.

Power level control parameter determination module 3028 determines a transmission power level control parameter. In some embodiments, the power level control parameter determination module 3028 sets the transmission power level control parameter to the retrieved control parameter 3048. In some embodiments, the power level control parameter determination module 3028 determines the transmission power level control parameter as a function of the retrieved control parameter 3048. In some embodiments, the power level control parameter determination module 3028 sets the transmission power level control parameter to the recovered control parameter, e.g., decoded control parameter 3050. In some embodiments, the power level control parameter determination module 3028 determines the transmission power level control parameter as a function of the recovered control parameter, e.g., decoded control parameter 3050. In some embodiments, the power level control parameter determination module 3028 determines the transmission power level control parameter as a function of the identified service level 3052. In some embodiments, the power level control parameter determination module 3028 determines the transmission power level control parameter as a function of the retrieved control parameter 3048 and the recovered control parameter, e.g., decoded control parameter 3050. In some embodiments, the power level control parameter determination module 3028 determines the transmission power level control parameter by operations including one of: i) using the recovered value as the transmission power level control parameter and ii) calculating the transmission power control parameter based on the recovered control value and a service level corresponding to the wireless terminal.

Service level identification module 3034 identifies a current service level corresponding to the wireless communications device 3000. For example, some different users of communications device 3000, in some embodiments, correspond to different service levels, e.g., emergency users, government associated users, service provider users, tier 1 corporate users, tier 2 corporate users, tier 1 private users, tier 2 private users, etc. In other examples, different service levels can correspond to different types of communications devices, different types of data to be communicated, different amounts of data to be communicated and/or different latency considerations. The identified current service level is specified in identified service level 3052.

Power level control parameter determination module 3028 includes a retrieval module 3030 and a control parameter recovery module 3032. Retrieval module 3030 retrieves a stored transmission power level control parameter corresponding to a service level corresponding to the wireless communications device 3000. Thus retrieval module 3030 uses identified service level 3052 as input, accesses service level to power level control parameter mapping information 3060 and obtains the control parameter associated with the input service level. Retrieved control parameter 3048 is an output of retrieval module 3030.

Control parameter recovery module 3032 recovers a control value from a signal received by the communications device 3000 from a base station. In some embodiments, the control value is recovered from the same signal which is measured by measurement module 3026, e.g., received base station signal 1 3044. Decoded control parameter 3050 is an output of control parameter recovery module 3032. In some embodiments, the recovered control value is an interference level indicator value.

Peer to peer transmission power control module 3036 controls peer to peer transmission power for at least some peer to peer signal transmissions as a function of the result of a measurement of a received base station signal. Peer to peer transmission power control module 3036 includes a maximum peer to peer transmission power level determination sub-module 3038, an actual peer to peer transmission power level determination sub-module 3040 and a first function 3042.

Maximum peer to peer transmission power level sub-module 3038 uses the first function 3042 to determine a maximum peer to peer transmission power level. Actual peer to peer transmission power level sub-module 3040 determines an actual peer to peer signal transmission power level as a function of said maximum peer to peer transmission power level and a peer to peer signal received from a second peer to peer communications device. In various embodiments, sub-module 3040 controls the actual determined peer to peer transmission power level to be less than or equal to the maximum peer to peer transmission power level.

Peer to peer transmission power level control module 3036 uses a determined transmission power level control parameter 3054 in addition to a measured received power level, e.g., from signal 1 measurement information 3046 in determining a peer to peer transmission power level, e.g., in determining determined maximum peer to peer transmission power level 3056. In some embodiments, some or all of the functions of the power level control parameter determination module 3028 are included as part of the peer to peer transmission power control module 3036.

Data/information 3020 includes a received signal from a base station, received base station signal 1 3044, which is measured by measurement module 3026 obtaining signal 1 measurement information 3046 which is utilized in determining transmission power level information. Data/information 3020 also includes a transmission power level control parameter 3054, a determined maximum peer to peer transmission power level 3056, a determined actual peer to peer transmission power level 3058, service level to power level control parameter mapping information 3060, and timing frequency structure information 3070. In some embodiments data/information 3020 includes one or more of identified service level 3052, retrieved control parameter 3048 and decoded control parameter 3050.

Retrieved control parameter 3048 is an output of retrieval module 3030 and corresponds to one of the control parameter values (control parameter value 1 3066, . . . , control parameter value M 3068) of service level to power control parameter mapping information 3060. Decoded control parameter 3050 is an output of control parameter recovery module 3032 and represents information recovered from a received base station signal. In some embodiments, the received base station signal from which the information is recovered is the same base station signal which is power measured, e.g., received base station signal 1 3044. In some embodiments, the recovered control value is an interference level indicator value.

Identified service level 3052 is an output of service level identification module 3034, and is used as input to retrieval module 3030. The identified service level 3052 is used to select a corresponding control parameter value. For example, if identified service level 3052 indicates service level M 3064, then retrieval module 3030 retrieves control parameter value M 3068 which is stored in retrieved control parameter 3048.

Transmission power level control parameter 3054 is an output of power level control parameter determination module 3028. Transmission power level control parameter 3054 is determined as a function of one or more of: identified service level 3052, a retrieved control parameter 3048 and a decoded control parameter 3050. Transmission power level control parameter 3054 is used as an input by peer to peer transmission power control module 3036.

Determined maximum peer to peer transmission power level 3056 is an output of maximum peer to peer transmission power level sub-module 3038, while determined actual peer to peer transmission power level 3058 is an output of actual peer to peer transmission power level determination sub-module 3040.

Service level to power level control parameter mapping information 3060 includes a plurality of service levels (service level 1 3062, . . . , service level M 3064) and a plurality of corresponding control parameter values (control parameter value 1 3066, . . . , control parameter value M 3068).

Timing/frequency structure information 3070, included as part of data/information 3020, includes uplink frequency band information 3072, e.g., WAN uplink bandwidth information, WAN uplink carrier information and uplink WAN tone set information, downlink frequency band information 3074, e.g., WAN downlink bandwidth information, WAN downlink carrier information and downlink WAN tone set information, and information identifying the location of the measured and/or decoded base station signals 3076. In this exemplary embodiment peer to peer communications signaling uses a WAN uplink frequency band being used by a base station with the peer to peer signals acting as interference to the WAN uplink signals directed to the base station. A signal which is received by wireless communications device 3000 is measured and the measurement utilized to control wireless communications device peer to peer transmission power level. This received base station signal in some embodiments, is communicated in the WAN uplink band, while in other embodiments, the signal is communicated in the WAN downlink band. In some embodiments a signal, which is received by wireless communications device 3000 and decoded recovering information, e.g., recovering an interference indicator value, is also utilized to control wireless communications device peer to peer transmission power level. In some embodiments the same base station signal utilized for power measurement is the decoded signal from which the information is recovered. In some other embodiments, there are two different received signals from the base station, one signal whose received power level is measured and utilized and another signal conveying encoded power control information, e.g., an encoded interference indicator value. The base station signal from which information is recovered, e.g., an interference level indicator value, in some embodiments, is communicated in the WAN uplink band, while in other embodiments the signal is communicated in the WAN downlink band. Information 3076 identifies which WAN band carries the measured base station signal and which WAN band carries the base station signal used for information recovery. In some embodiments, information 3076 identifies more specific information corresponding to the signal or signals, e.g., a point in a recurring timing structure and/or specific tone information used to identify the signal or signals.

Figure 9:
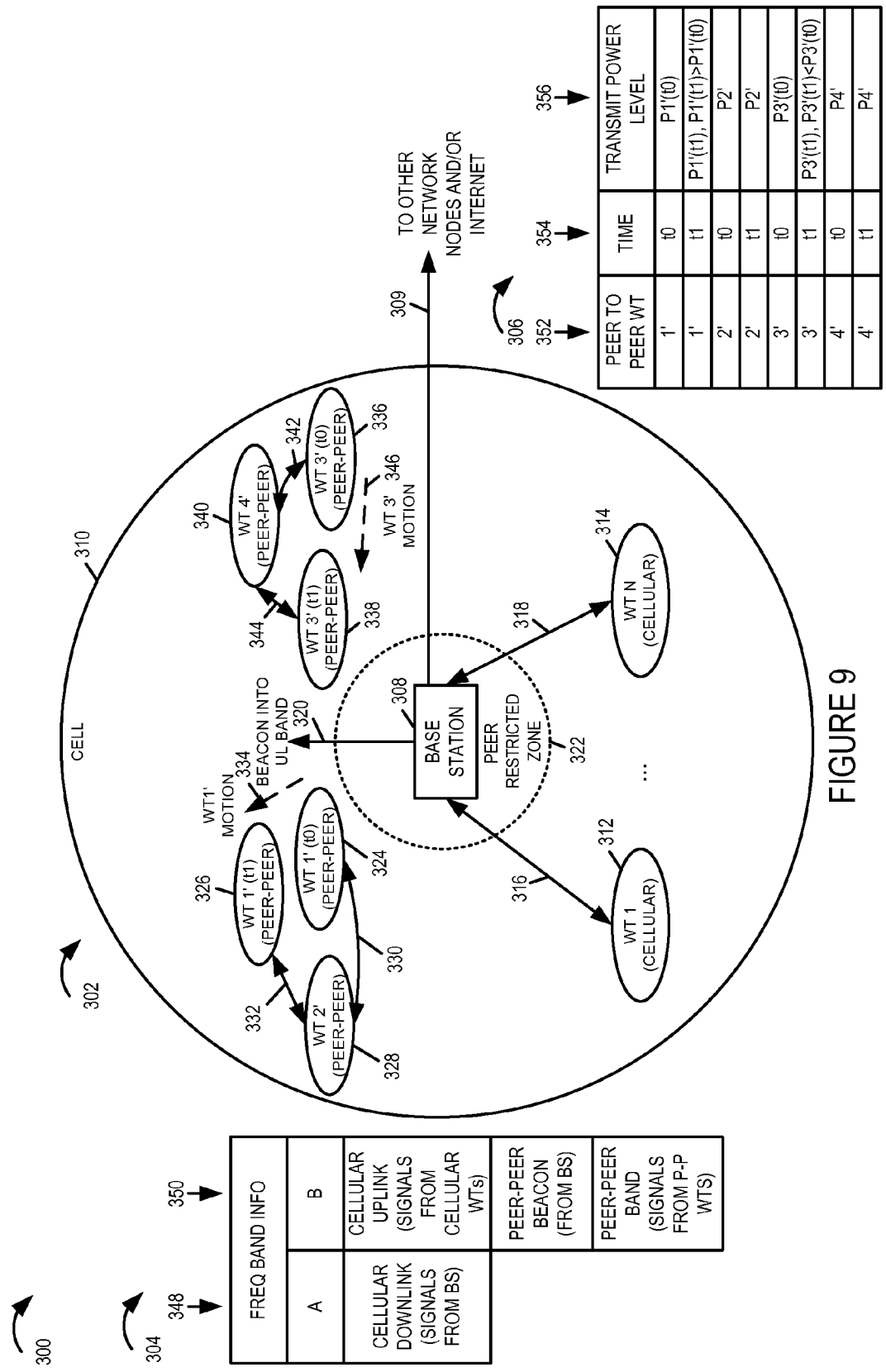
FIG. 9 is a drawing illustrating one exemplary embodiment including an exemplary communications system, a table describing frequency band usage information and a table illustrating exemplary peer to peer wireless terminal transmission power level information.

FIG. 9 is a drawing 300 illustrating one exemplary embodiment including a communications system 302, a table 304 describing frequency band usage information and a table 306 illustrating exemplary peer to peer wireless terminal transmission power level information. Exemplary communications system 302 includes a base station 308 with a corresponding cellular coverage area represented by cell 310. The base station 308 is coupled to other network nodes, e.g., other base stations, routers, AAA nodes, home agent nodes, control nodes, etc., and/or the Internet via network link 309, e.g., a fiber optic link. In communications system 302 there are also a plurality of wireless terminals supporting cellular communications (WT 1 312, . . . , WT N 314). Cellular WTs (312, 314) are coupled to base station 308 via wireless links (316, 318), respectively.

In communications system 302 there are also a plurality of wireless terminals supporting peer to peer communications (WT 1', WT 2' 328, WT 3', WT 4' 340). WT1' is shown at two points in time and is represented as element 324 at time t0 and as element 326 at time t1. WT 1' motion is indicated by arrow 334. WT3' is shown at two points in time and is represented as element 336 at time t0 and as element 338 at time t1. WT 3' motion is indicated by arrow 346. Peer to peer communications between WT1' and WT2' 328 are indicated by arrows 330 and 332. Peer to peer communications between WT3' and WT4' 340 are indicated by arrows 342 and 344.

The base station transmits a beacon signal 320 into the uplink band. The beacon signal is detected and measured by the peer to peer wireless terminals. A power measurement of the received beacon signal is used by a peer to peer wireless terminal to determine whether the wireless terminal is allowed to transmit peer to peer signals and to control the transmission power level, e.g., the maximum transmission power level, when transmission is permitted. Dotted arrow circle 322 around base station 308 indicates an exemplary peer to peer restricted region, where a peer to peer wireless terminal is restricted from transmitting signals. In the region close to the base station 308, transmissions from peer to peer wireless terminals at levels utilized in the peer to peer signaling can produce too much interference from the perspective of the base station receiver attempting to recover and decode uplink signals from wireless terminals operating in a cellular mode (312, . . . 314), and thus peer to peer wireless terminal transmissions are not permitted.

Frequency band information table 304 will now be described. First column 348 indicates that frequency band A is used as cellular downlink band for signals transmitted from the base station intended to be received by cellular wireless terminals. Second column 350 indicates that frequency band B is used as: (i) a cellular uplink band for signals transmitted from cellular wireless terminals intended to be received by the base stations; (ii) as a band to convey a peer to peer beacon signal transmitted by the base station and intended to be received and used by peer to peer wireless terminals; and (iii)

as a peer to peer band intended to be used for signals transmitted from and intended to be received by peer to peer wireless terminals.

Peer to peer wireless terminal power information table 306 will now be described. First column 352 identifies the exemplary peer to peer wireless terminals (WT 1', WT 2', WT 3', WT 4') being described. Second column 354 identifies points in time, either t0 or t1. Third column 356 identifies transmission power level information corresponding to the wireless terminal on the same row corresponding to the time indicated on the same row. The information of table 306 indicates that the transmission power level for WT1' increases from time t0 to time t1. It may be observed that WT1' moves away from the base station 308 during this time and that the measured power level of beacon signal 320 from WT1''s perspective can be expected to decrease during this time. It may also be observed that WT 1' remains outside the restricted zone 322 during this time. The information of table 306 also indicates that the transmission power level for WT3' decreases from time t1 to time t0. It may be observed that WT3' moves toward the base station 308 during this time and that the measured power level of beacon signal 320 from WT3''s perspective can be expected to increase during this time. It may also be observed that WT 3' remains outside the restricted zone 322 during this time. The power level described in table 306 can be a maximum allowable transmission power level for the wireless terminal. Alternatively, the power level described in table 306 can be an actual transmission power level.

In some embodiments, at least some wireless terminals support multiple modes of operation, e.g., a peer to peer and a cellular communications mode of operation.

Figure 10:
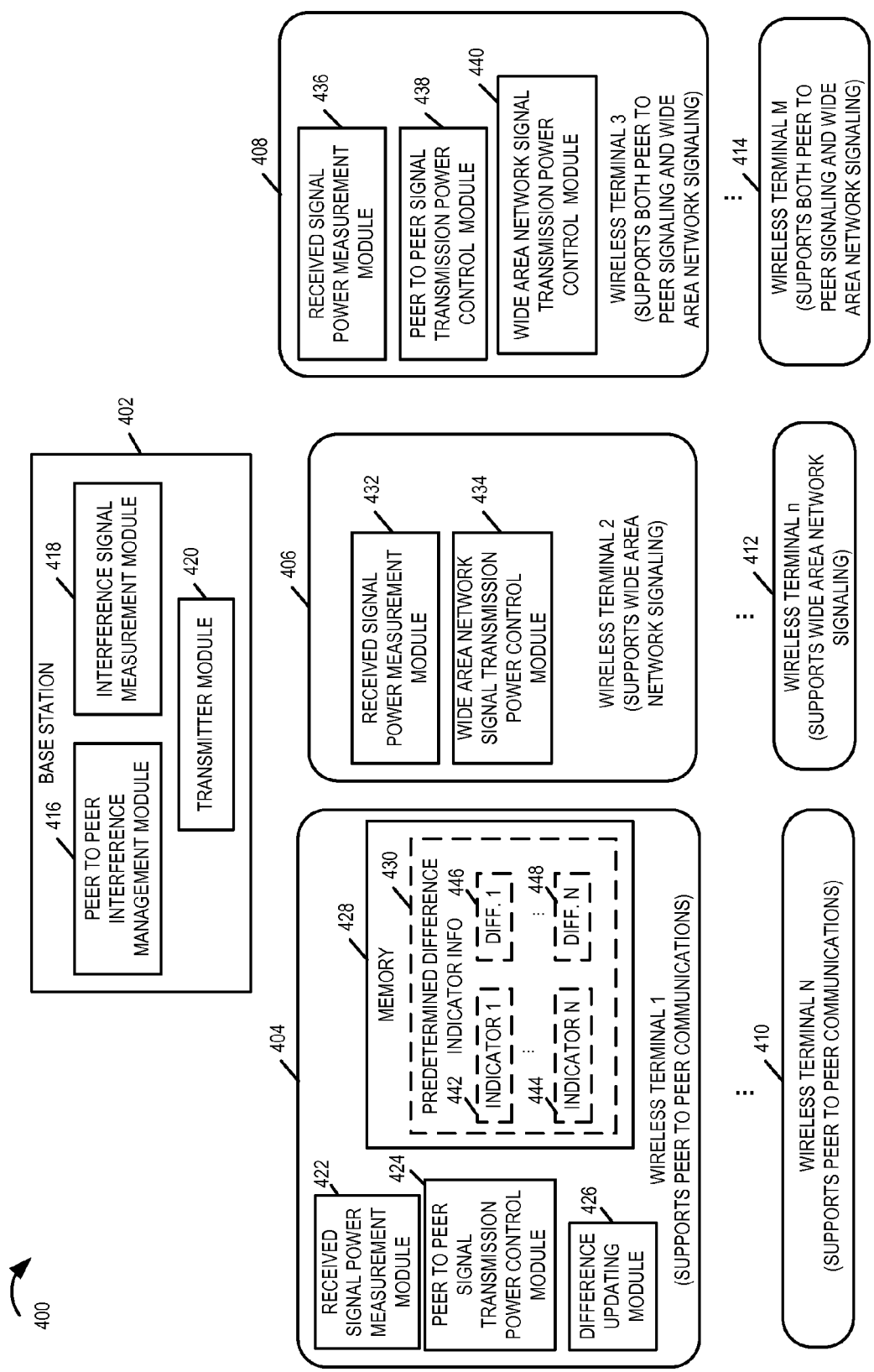
FIG. 10 is a drawing of an exemplary wireless communications system in accordance with various embodiments.

FIG. 10 is a drawing of an exemplary wireless communications system 400 in accordance with various embodiments. Exemplary wireless communications system 400 includes at least one base station 402, a plurality of wireless terminals supporting peer to peer communications (wireless terminal 1 404, . . . , wireless terminal N 410), a plurality of wireless terminals supporting wide area network signaling (wireless terminal 2 406, . . . , wireless terminal n 412), and a plurality of wireless terminals supporting both peer to peer signaling and wide area network signaling (wireless terminal 3 408, . . . , wireless terminal M 414).

Base station 402 includes a peer to peer interference management module 416, an interference signal measurement module 418, and a transmitter module 420. The peer to peer interference management module 416 determines a peer to peer transmission power level control value. Transmitter module 420 transmits the determined peer to peer transmission power level control value, e.g., as a communicated indicator value. Interference signal measurement module 418 measures signal interference during a null uplink transmission period and supplies the measured signal interference information to the peer to peer interference management module 416.

Wireless terminal 1 404 includes a received signal power measurement module 422, a peer to peer signal transmission power control module 424, a difference updating module 426 and memory 428. Memory 428, in some embodiments, includes stored predetermined difference indicator information 430. The stored predetermined difference indicator information 430 includes a plurality of indicators which can be signaled by a base station (indicator 1 442, . . . , indicator N 444) and corresponding difference values (difference 1 446, . . . , difference N 448), respectively.

Received signal power measurement module 422 measures the power of a signal received from a base station, e.g., from base station 402. Peer to peer signal transmission power control module 424 controls a peer to peer signal transmission power level as a function of the measured power of the signal from the base station in accordance with a first function. In various embodiments, the peer to peer signal transmission power level is a maximum permitted peer to peer signal transmission power level. Difference updating module 426 receives a difference indicator value from a base station, e.g., base station 402 and updates the first function based on the received indicator value. In some embodiments, the difference is a predetermined amount and memory 428, which stores indicators and corresponding predetermined differences, is accessed and the accessed value used by the first function.

Wireless terminal 2 406 includes a received signal power measurement module 432, and a wide area network signal transmission power control module 434. Received signal power measurement module 432 measures the power level of signals received from a base station, e.g., base station 402. Wide area network signal transmission power control module 434 controls wide area signal transmission power level with respect to wireless terminal 2 406 as a function of the measured power of a signal received from the base station in accordance with a second function, the second function being different than the first function. In some embodiments the wide area signal transmission power level is a maximum wide area signal transmission power level. In various embodiments, the second function determines a higher transmission power level than the first function for a given value of the measured received signal power. In some such embodiments, the difference in dBs between the transmission power determined by the first and second function for a given value of the measured received signal power is at least 10 dBs.

Wireless terminal 3 408 includes a received signal power measurement module 436, a peer to peer signal transmission power control module 438, and a wide area network signal transmission power control module 440. Received signal power measurement module 436 measures the power level of a signal received from a base station. Peer to peer signal transmission power control module 438 controls a peer to peer signal transmission power level as a function of the measured power of the signal from a base station in accordance with a first function. Wide area network signal transmission power control module 440 controls wide area signal transmission power level as a function of the measured power of a signal from the base station in accordance with a second function, said second function being different from said first function. In various embodiments, the second function used by module 440 determines a higher transmission power level than the first function used by module 438 for a given value of the measured received signal power. In some such embodiments, the difference in dBs between the transmission power determined by the first and second function for a given value of the measured received signal power is at least 10 dBs. In some embodiments, the first function used by module 438 of WT 3 408 is the same as the first function used by module 424 of WT 1 404. In some embodiments, the second function used by module 440 of WT 3 408 is the same as the second function used by module 434 of WT 2 406.

Figure 11:
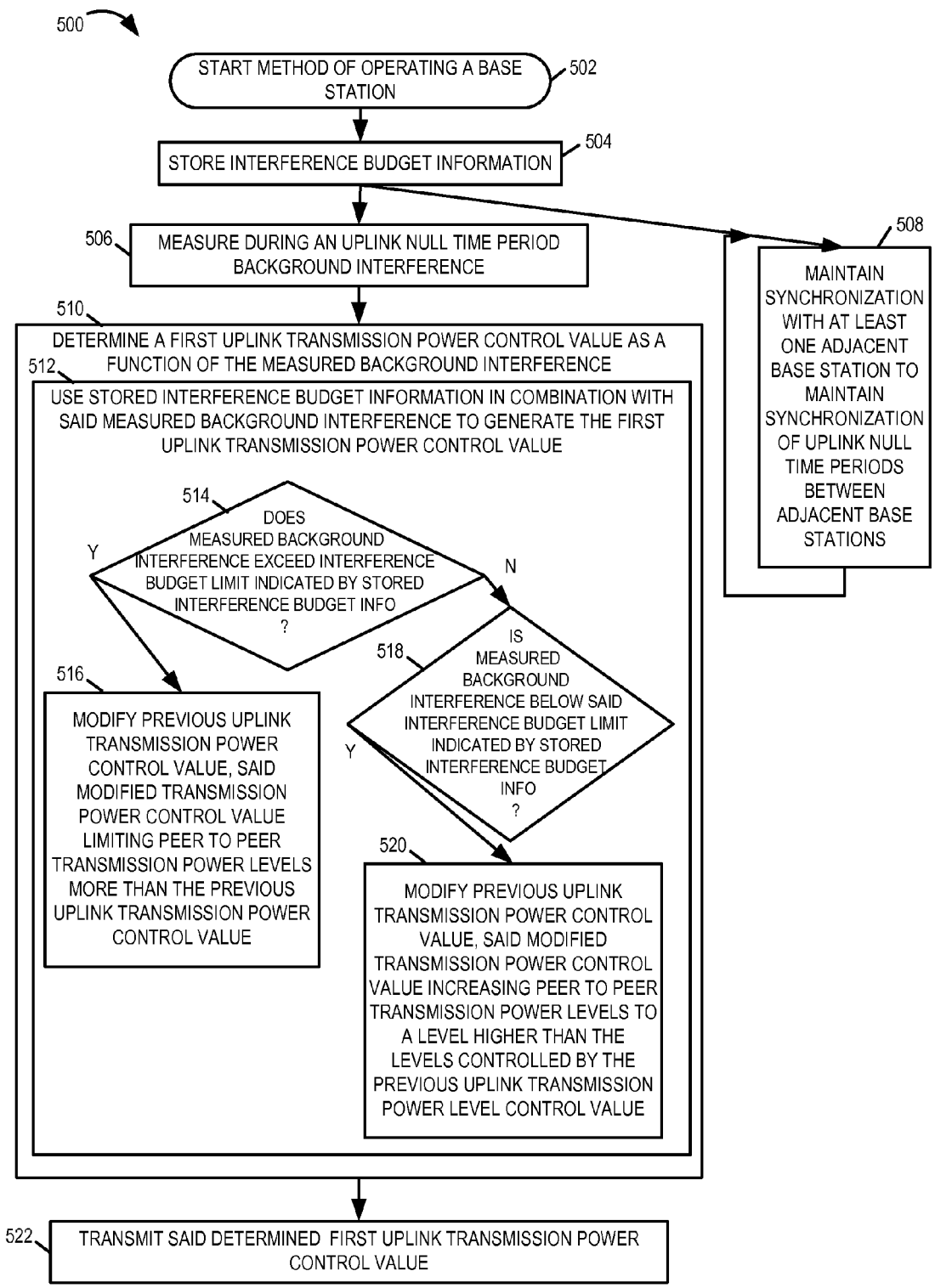
FIG. 11 is a flowchart of an exemplary method of operating a base station in accordance with various embodiments.

FIG. 11 is a flowchart 500 of an exemplary method of operating a base station in accordance with various embodiments. Operation of the exemplary method starts in step 502 and proceeds to step 504. In step 504, the base station stores interference budget information. Operation proceeds from step 504 to steps 506 and step 508.

In step 508, which is performed on an ongoing basis, the base station is operated to maintain synchronization with at least one adjacent base station to maintain synchronization of uplink null time periods between adjacent base stations. In various embodiments, an uplink null time period is a period of time in which at least a fraction of uplink bandwidth used by the base station is intentionally not used for transmitting uplink signals to the base station.

Returning to step 506, in step 506, the base station measures during an uplink null time period background interference. Then, in step 510, the base station determines a first uplink transmission power control value as a function of the measured background interference. Step 510 includes sub-step 512. In sub-step 512, the base station uses the stored interference budget information in combination with said measured background interference to generate the first uplink transmission power control value. Sub-step 512 includes sub-steps 514, 516, 518, and 520. In sub-step 514, the base station determines if the measured background interference exceeds an interference budget limit indicated by the stored interference budget information. If the budget limit is exceeded, then operation proceeds from sub-step 514 to sub-step 516; otherwise operation proceeds from sub-step 514 to sub-step 518.

In sub-step 516, the base station modifies a previous uplink transmission power control value, said modified transmission power control value limiting peer to peer transmission power levels more than the previous uplink transmission power control value. Returning to sub-step 518, in sub-step 518, the base station determines if the measured background interference is below said interference budget limit indicated by stored interference budget information, e.g., lower by at least a predetermined threshold value. If it is determined in sub-step 518, that the measured background interference is below the interference budget limit such as to satisfy the test criteria, then operation proceeds from sub-step 518 to sub-step 520. In sub-step 520, the base station modifies the previous uplink transmission power control value, said modified transmission power control value increasing peer to peer transmission power levels to a level higher than the levels controlled by the previous transmission power control value.

Operation proceeds from step 510 to step 522, in which the base station transmits said determined first uplink transmission power control value.

Figure 12:
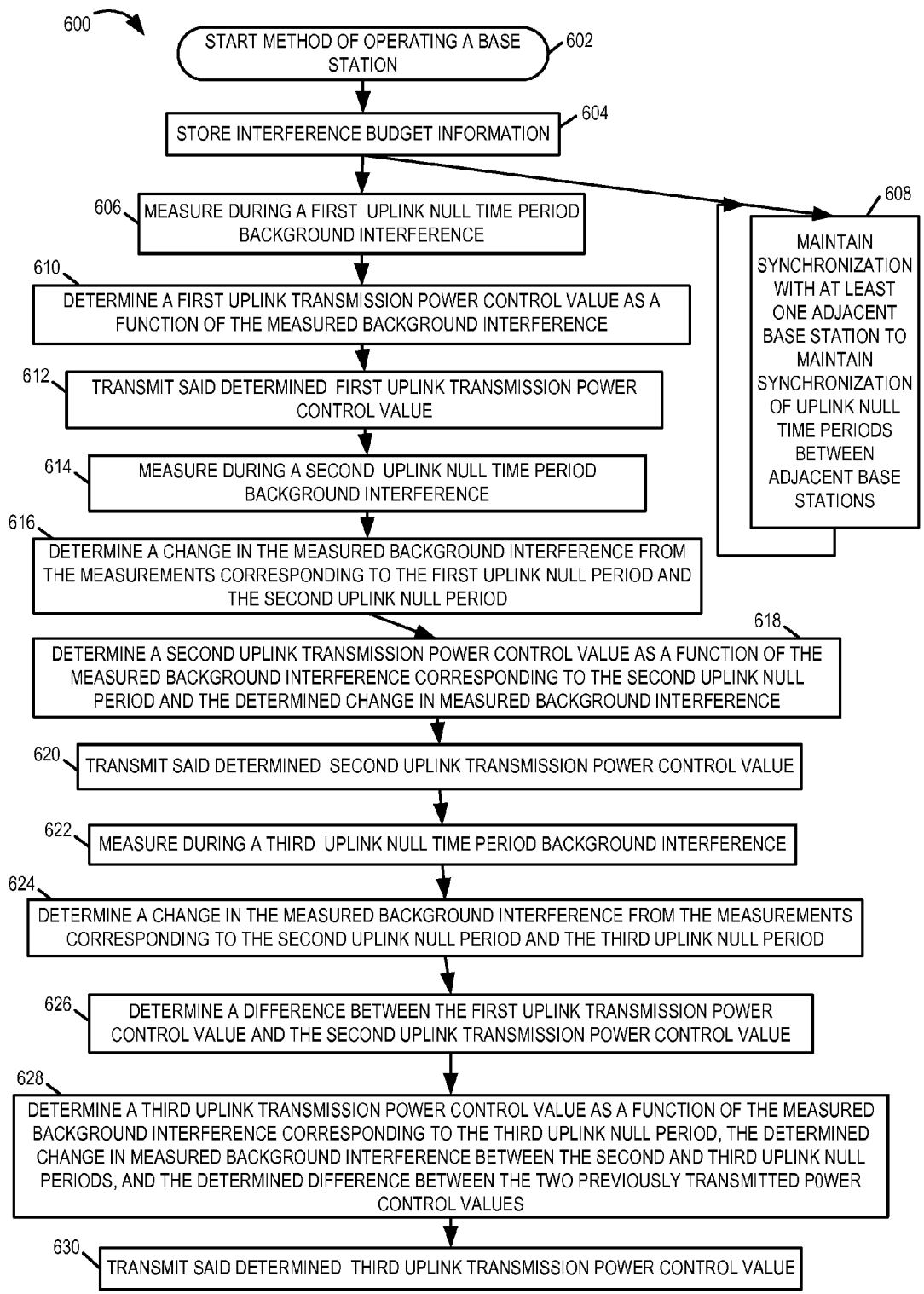
FIG. 12 is a flowchart of an exemplary method of operating a base station in accordance with various embodiments.

FIG. 12 is a flowchart 600 of an exemplary method of operating a base station in accordance with various embodiments. Operation of the exemplary method starts in step 602 and proceeds to step 604. In step 604, the base station stores interference budget information. Operation proceeds from step 604 to steps 606 and step 608.

In step 608, which is performed on an ongoing basis, the base station is operated to maintain synchronization with at least one adjacent base station to maintain synchronization of uplink null time periods between adjacent base stations. In various embodiments, an uplink null time period is a period of time in which at least a fraction of uplink bandwidth used by the base station is intentionally not used for transmitting uplink signals to the base station.

Returning to step 606, in step 606, the base station measures during a first uplink null time period of time background interference. Then, in step 610, the base station determines a first uplink transmission power control value as a function of the measured background interference. Operation proceeds from step 610 to step 612. In step 612, the base station transmits said determined first uplink transmission power control value. Operation proceeds from step 612 to step 614.

In step 614, the base station measures during a second uplink null time period background interference, and then in step 616, the base station determines a change in the measured background interference from the measurements corresponding to the first uplink null period and the second uplink null period. Operation proceeds from step 616 to step 618.

In step 618, the base station determines a second uplink transmission power control value as a function of the measured background interference corresponding to the second uplink null period and the determined change in measured background interference, and then in step 620, the base station transmits the determined second uplink transmission power control value. Operation proceeds from step 620 to step 622.

In step 622, the base station measures, during a third uplink null period, background interference, and in step 624 the base station determines a change in the measured background interference from the measurements corresponding to the second uplink null period and the third uplink null period. Operation proceeds from step 624 to step 626, in which the base station determines a difference between the first uplink transmission power control value and the second uplink transmission power control value. Operation proceeds from step 626 to step 628.

In step 628, the base station determines a third uplink transmission power control value as a function of the measured background interference corresponding to the third uplink null period, the determined change in measured background interference between the second and third uplink null periods, and the determined difference between the two previously transmitted power control values. Operation proceeds from step 628 to step 630, in which the base station transmits the determined third uplink transmission power control value.

Figure 13:
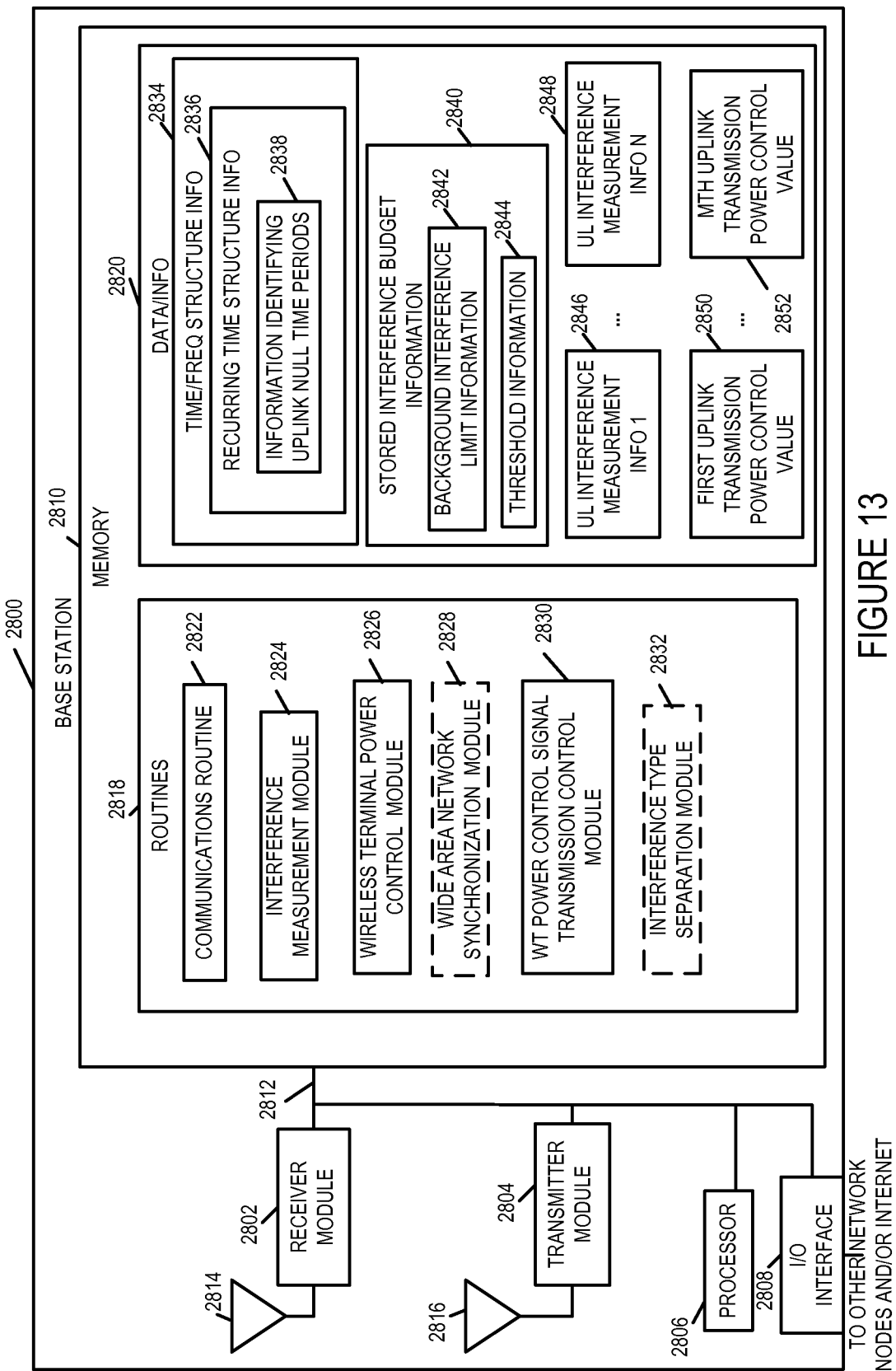
FIG. 13 is a drawing of an exemplary base station in accordance with various embodiments.

FIG. 13 is a drawing of an exemplary base station 2800 in accordance with various embodiments. Exemplary base station 2800 manages reception interference from peer to peer wireless terminals transmitting into the same air link resources used for its wide area network uplink communications. Exemplary base station 2800 determines and transmits an uplink power control signal utilized by peer to peer wireless terminals in determining their transmission power level. In some embodiments, the uplink power control signal transmitted by the base station 2800 is also utilized by wireless terminals, using the base station as a point of network attachment and transmitting uplink signals to the base station, to control transmission power levels.

Exemplary base station 2800 includes a receiver module 2802, a transmitter module 2804, a processor 2806, an I/O interface 2808, and a memory 2810 coupled together via a bus 2812 over which the various elements may interchange data and information.

Receiver module 2802, e.g., an OFDM receiver, is coupled to receive antenna 2814 via which the base station 2800 receives uplink signals from wireless terminals, e.g., wireless terminals functioning in a cellular mode and using the base station 2800 as a point of network attachment. Receiver module 2802 also receives interference from peer to peer communications devices operating in the local vicinity. In some embodiments, receiver module 2802 also receives interference from uplink signaling from cellular devices in adjacent cells.

Transmitter module 2804, e.g., an OFDM transmitter, is coupled to transmit antenna 2816, via which the base station 2800 transmits downlink signals to wireless terminals using base station 2800 as a point of network attachment. Transmitter module 2804 also transmits uplink transmission power control value signals to be used by peer to peer wireless terminals to control their transmission power level, the peer to peer wireless terminals using the base station's uplink band for peer to peer signaling and thus producing interference from the perspective of the base station receiver module 2802.

Memory 2810 includes routines 2818 and data/information 2820. The processor 2806, e.g., a CPU, executes the routines 2818 and uses the data/information 2820 in memory 2810 to control the operation of the base station 2800 and implement methods. Routines 2818 include a communications routine 2822, an interference measurement module 2824, a wireless terminal power control module 2826, and a wireless terminal power control signal transmission module 2830. In some embodiments, routines 2818 include one or more of wide area network synchronization module 2828 and interference type separation module 2832.

Communications routine 2822 implements various communications protocols used by the base station 2800. Interference measurement module 2824 measures during uplink null time periods background interference. Wireless terminal power control module 2826 determines uplink transmission power control values as a function of measured background interference. In various embodiments, the wireless terminal power control module 2826 determines an uplink power control value using stored interference budget information in combination with the measured background interference to generate the uplink transmission power control value. Wireless terminal power control signal transmission control module 2830 controls the transmitter module 2804 to transmit a generated uplink transmission power control signal, e.g., first uplink transmission power control value 2850. In some embodiments, the control module 2830 controls the transmitter module 2804 to transmit a generated uplink transmission power control value in accordance with a recurring schedule. In some embodiments, the control module 2830 controls transmission as a function of interference level information. In some embodiments, wireless terminal power control module 2826 determines an uplink transmission power control value as a function of the measured background interference and a change in the measured background interference from a previous measurement. In some embodiments, the wireless terminal power control module 2826 determines an uplink transmission power control value as a function of the difference between two previously transmitted power control values.

In some embodiments, the wireless terminal power control module 2826 determines an uplink transmission power control value by operations including modifying a previous uplink transmission power control value when the measured background interference exceeds an interference budget limit indicated by the stored interference budget information, the modified transmission power control value limiting peer to peer transmission power levels more than the previous uplink transmission power control value. In some embodiments, the wireless terminal power control module 2826 determines an uplink transmission power control value by operations including modifying a previous uplink transmission power control value when the measured background interference is below an interference budget limit indicated by the stored interference budget information, the modified transmission power control value increasing peer to peer transmission power levels more than the previous uplink transmission power control value. In various embodiments, the changing to a higher level is performed when said measured interference is below said interference budget limit by at least a predetermined threshold.

Thus the value of the uplink transmission power control value is used by base station 2800 to regulate the transmission power level of peer to peer communications, thereby impacting interference to uplink signals being directed to base station 2800.

Wide area network synchronization module 2828 is used for maintaining synchronization with at least one adjacent base station to maintain synchronization of uplink null time periods between adjacent base stations.

Interference type separation module 2832 is used to obtain an estimate of the amount of uplink interference contribution sourced from peer to peer communications. In some embodiments, the interference type separation module 2832 intentionally inputs a controlled change level in the uplink transmission power control value and calculates an observed effect in the interference measurement during a subsequent uplink null period as part of separating the peer to peer interference from other interference sources, e.g., cellular communications devices transmitting uplink signals in an adjacent cell which is not synchronized with respect to base station 2800.

Data/information 2820 includes time/frequency structure information 2834, stored interference budget information 2840, a plurality of sets of interference measurement information (uplink interference measurement information 1 2846, . . . , uplink interference measurement information N 2848), and a plurality of generated uplink transmission power control values (first uplink transmission power control value 2850, . . . , Mth uplink transmission power control value 2852).

Timing/frequency structure information 2834 includes recurring time structure information 2836. The recurring time structure information 2836 includes information identifying uplink null time periods 2838. In some embodiments, an uplink null time period corresponds to a period of time in which at least a fraction of uplink bandwidth used by said base station is intentionally not used for transmitting uplink signals to the base station. In some embodiments, an uplink null time period is a time period during which wireless terminals, e.g., cellular communications devices, using the base station 2800 attachment point intentionally refrain from sending uplink signals to the base station 2800. During this time period peer to peer wireless terminal signaling continues using the uplink frequency band. Thus, the base station 2800 can measure background interference during this period. If adjacent base stations are synchronized such that uplink null periods are concurrent, then the measured noise during these periods can be associated with peer to peer signaling. However, if adjacent base stations are not synchronized, and the same uplink band is used, then the measured interference during such an uplink null period includes interference from both peer to peer wireless terminals and cellular communications devices corresponding to adjacent base stations.

Stored interference budget information 2840 includes background interference limit information 2842 and threshold information 2844.

Figure 14:
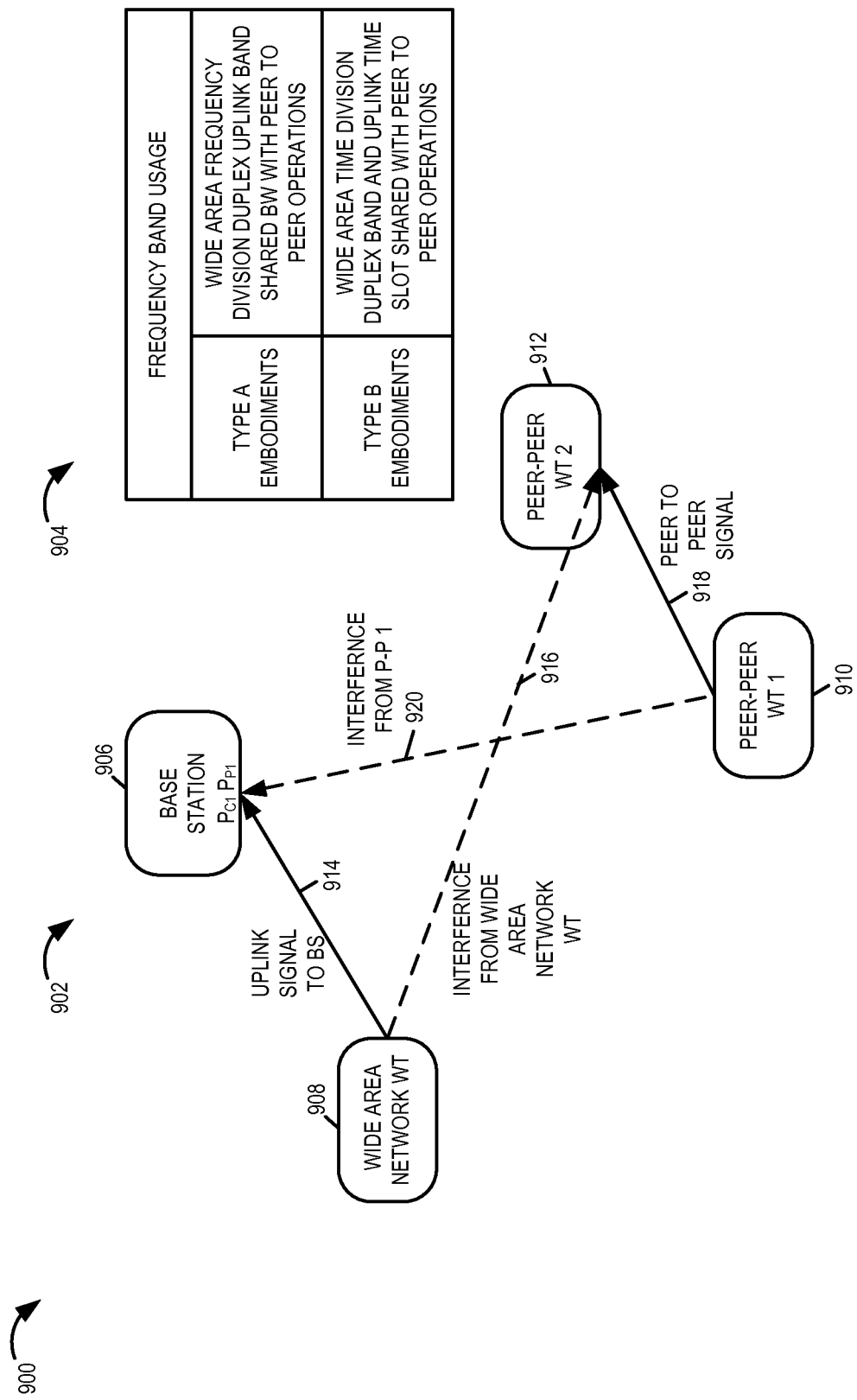
FIG. 14 is a drawing including an exemplary communications system and a frequency band usage table in accordance with various embodiments.

FIG. 14 is a drawing 900 including an exemplary communications system 902 and a frequency band usage table 904 in accordance with various embodiments. In the exemplary communications system 900 a wide area network shares bandwidth with peer to peer communications. In various embodiments, the wide area network corresponds to a deployed system and the peer to peer capabilities involve add on and/or upgrade features. In some embodiments, the exemplary communications system 902 is initially deployed including both WAN and peer to peer capabilities. Frequency band usage table 904 indicates two types of embodiments which can correspond to exemplary system 902. In the first type of embodiment, type A embodiments, the wide area network uses frequency division duplex (FDD) and the wide area frequency division duplex uplink band shares bandwidth with peer to peer communications activities. In the second type of embodiment, type B embodiments, the wide area network uses time division duplex (TDD) of the same band for uplink and downlink, and the wide area band shares an uplink time slot with peer to peer communications activities. Thus, in both types of embodiments, uplink signaling from the wide area network communications devices can interfere with reception of peer to peer communications signals by a peer to peer communications device, and the peer to peer communications signals directed between peer to peer communications devices can interfere with the reception of wide area network uplink signals at the base station.

Exemplary communications system 902 includes a base station 906, a wide area network wireless terminal 908, e.g., a cellular mobile node, a first peer to peer wireless terminal 910, and a second peer to peer wireless terminal 912. For the purposes of illustration consider that wide area network wireless terminal 908 transmits uplink signal 914 to base station 906. Base station 906 receives this signal and measures the received signal as $P_{C1}$. The signal 914 from the perspective of peer to peer wireless terminal 2 912 is viewed as interference 916 from the wide area network wireless terminal 908. Now consider that the first peer to peer wireless terminal 910 transmits peer to peer signal 918 to peer to peer wireless terminal 2 912. The signal 918 from the perspective of base station 906 is viewed as interference 920 from first peer to peer wireless terminal 910. Base station 906 receives this interference and measures the received signal as $P_{P1}$.

In accordance with various embodiments, priority is given to the wide area system, and interference is managed at the base station. For example, a power control value α is chosen to achieve a goal such as $(P_{P1}/P_{C1}) \leq \alpha$. In some such embodiments α is a value such as −10 dB, −20 dB, or −30 dBs. Although described in the example, with respect to one peer to peer wireless terminal causing interference with respect to base station reception corresponding to one wide area network's wireless terminal uplink signaling, it is to be understood that there may be, and sometimes are, a plurality of peer to peer wireless terminals transmitting and contributing to the interference, and there may be, and sometimes are, a plurality of wide area network wireless terminals transmitting uplink signals to the base station, which the base station is attempting to recover. Thus, the control factor α, determined by the base station to manage interference can be, and sometimes is, dependent upon multiple users. In some embodiments, the control factor α depends on the number of users, e.g., the number of active wide area network users and/or the number of active peer to peer users.

Figure 15:
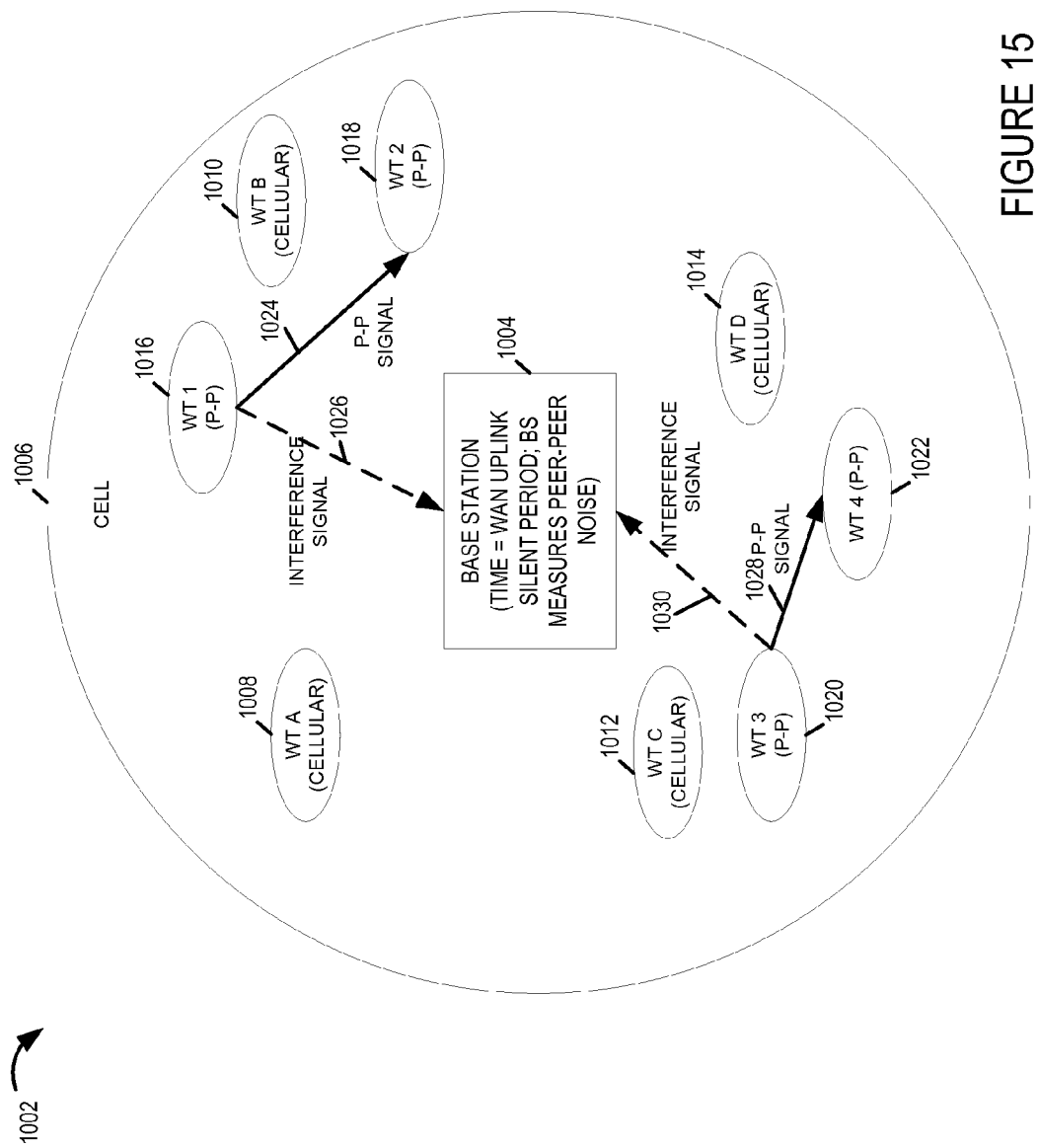
FIG. 15 is a drawing illustrating a feature of various embodiments, in which a wide area network has a silent period in which the base station monitors for and measures peer to peer noise.

FIG. 15 is a drawing 1002 illustrating a feature of various embodiments, in which a wide area network has a silent period in which the base station monitors for and measures peer to peer noise. Exemplary drawing 1002 includes a base station 1004 having a corresponding cellular coverage area 1006. In some embodiments the cellular coverage area has a radius of at least 1 kilometer. Within the cell, there is a plurality of wireless terminals functioning in a cellular mode of operation (WT A 1008, WT B 1010, WT C 1012, WT D 1014). These wireless terminals (1008, 1010, 1012, 1014) receive downlink signals from base station 1004 and transmit uplink signals to base station 1004. However, this point in time corresponds to an intentional wide area network uplink silent period where the wide area network wireless terminals (1008, 1010, 1012, 1014) do not transmit any uplink signals.

The cell 1006 also includes a plurality of wireless terminals functioning in the peer to peer mode of operation (WT 1 1016, WT 2 1018, WT 3 1020, WT 4 1022). Peer to peer communications are not restricted during this time period. Peer to peer WT 1 1016 happens to be transmitting a peer to peer signal 1024 to peer to peer wireless terminal 2 1018. This transmitted peer to peer signal 1024 is viewed as peer to peer noise interference signal 1026 from the perspective of the receiver in base station 1004. Peer to peer WT 3 1020 happens to be transmitting a peer to peer signal 1028 to peer to peer wireless terminal 4 1022. This transmitted peer to peer signal 1028 is viewed as peer to peer noise interference signal 1030 from the perspective of the receiver in base station 1004.

Figure 16:
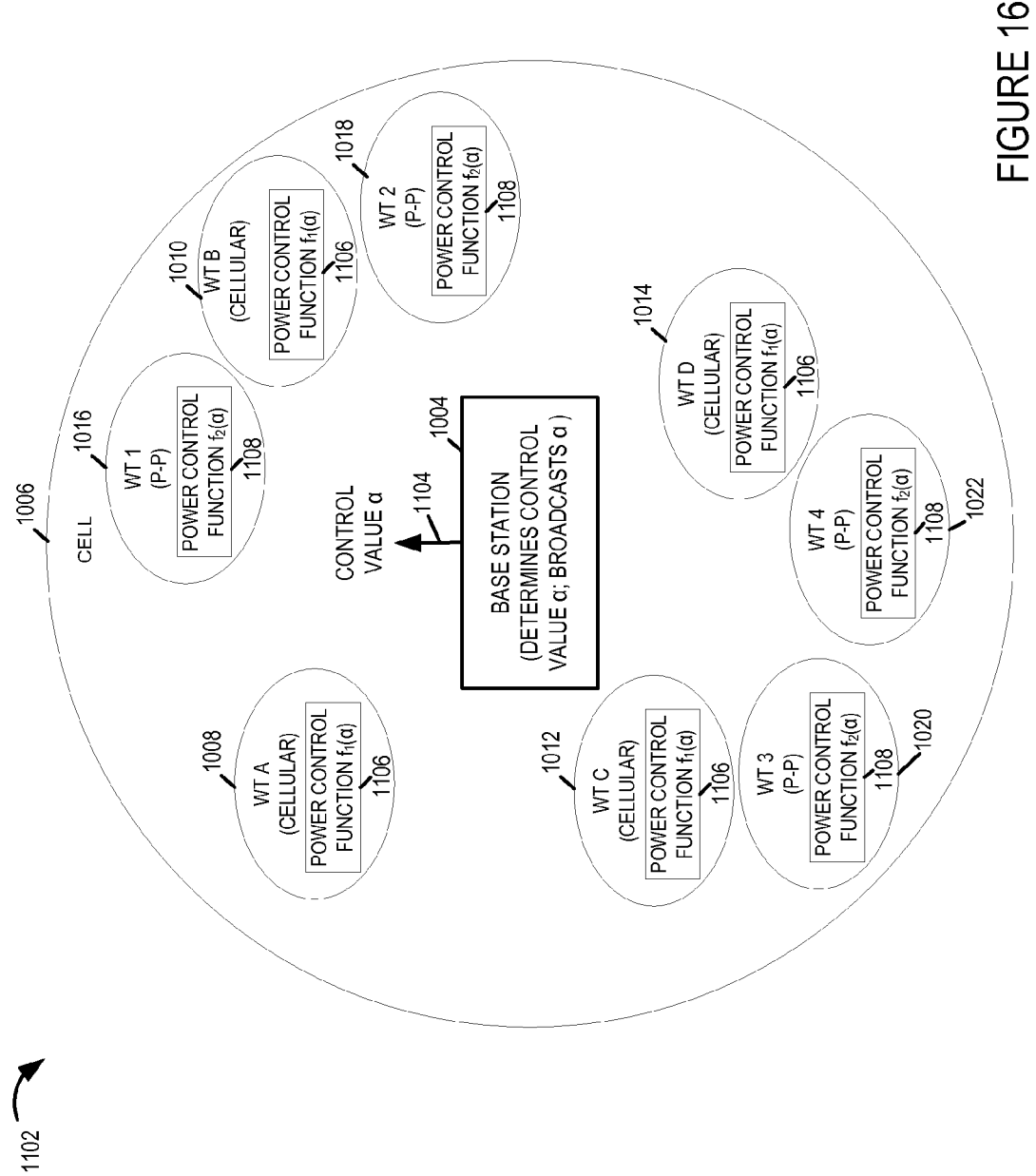
FIG. 16 is a drawing illustrating several features of various embodiments, and is a continuation of the example of FIG. 15.

FIG. 16 is a drawing 1102 illustrating several features of various embodiments, and is a continuation of the example of FIG. 15. The base station 1004 determines a power control value α as a function of the measured peer to peer interference. The base station then broadcasts this control value α via signal 1104 to be used by the wireless terminals. In this exemplary embodiment, the base station broadcasts a single value for control value α; however, the value can be, and sometimes is, used differently by the different wireless communications devices receiving the broadcast signal 1104. In this example, the set of wireless terminals operating in the cellular mode (WT A 1008, WT B 1010, WT C 1012, WT D 1014) uses a first power control function, $f_1(\alpha)$ 1106, to determine a transmission power level control parameter; while the set of wireless terminals operating in the peer to peer mode (WT 1 1016, WT 2 1018, WT 3 1020, WT 4 1022) use a second power control function, $f_2(\alpha)$ 1108, to determine a transmission power control parameter.

Figure 17:
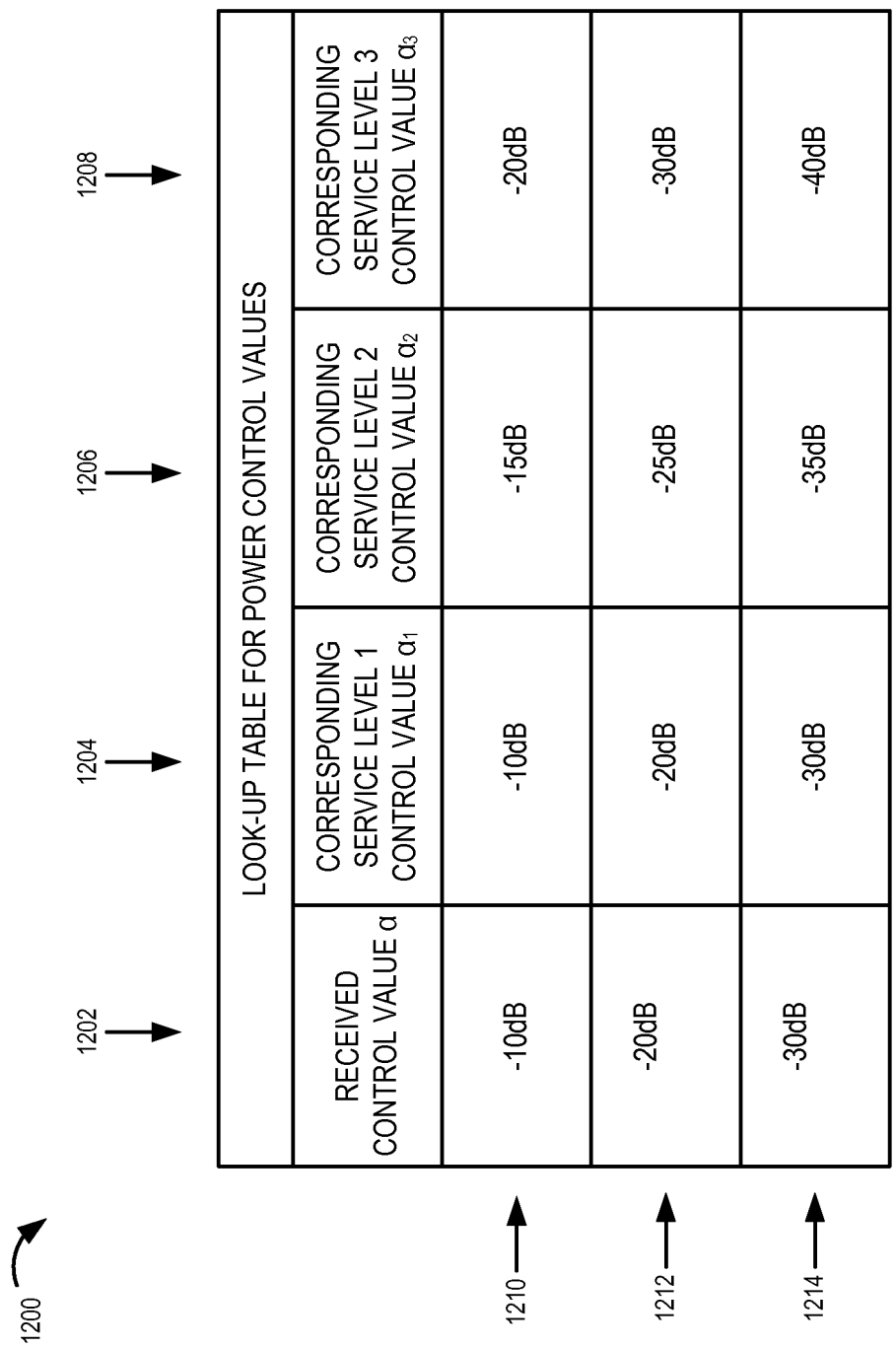
FIG. 17 is a drawing of an exemplary look-up table for control values illustrating a feature of various embodiments.

FIG. 17 is a drawing of an exemplary look-up table for control values 1200 illustrating a feature of various embodiments. In some embodiments, a wireless terminal receives a broadcast power control value from a base station and determines its own power control value to use as a function of the received value and a corresponding service level. Different service levels may, and sometimes do, correspond to different traffic types, different types of services, and/or to different users of the service, and map to different service levels. For example, exemplary different priorities, in some embodiments, are associated with different traffic types, e.g., voice, latency critical data, and best effort type data. Exemplary different types of service include, e.g., emergency communications services and ordinary communications. Different types of users include, e.g., high priority users such as police, fire, emergence services, medium priority users having subscribed to a high service level plan, and low priority users having subscribed to a low service level plan. Thus in some embodiments, a recovered power control value is modified as a function of priority level.

In exemplary table 1200, first column 1202 indicates exemplary received control values α, second column 1204 indicates exemplary corresponding service level 1 control values $\alpha_1$, third column 1206 indicates exemplary corresponding service level 2 control values $\alpha_2$, and fourth column 1208 indicates exemplary corresponding service level 3 control values $\alpha_3$. First row 1210 indicates that if a wireless terminal using look-up table 1200 receives a broadcast power control value from a base station which indicates −10 dB and its corresponding service level is (service level 1, service level 2, service level 3), then it uses (−10 dB, −15 dB, −20 dB), respectively, for its power control value. Second row 1212 indicates that if a wireless terminal using look-up table 1200 receives a broadcast power control value from a base station which indicates −20 dB and its corresponding service level is (service level 1, service level 2, service level 3), then it uses (−20 dB, −25 dB, −30 dB), respectively, for its power control value. Third row 1214 indicates that if a wireless terminal using look-up table 1200 receives a broadcast power control value from a base station which indicates −30 dB and its corresponding service level is (service level 1, service level 2, service level 3), then it uses (−30 dB, −35 dB, −40 dB), respectively, for its power control value.

Figure 18:
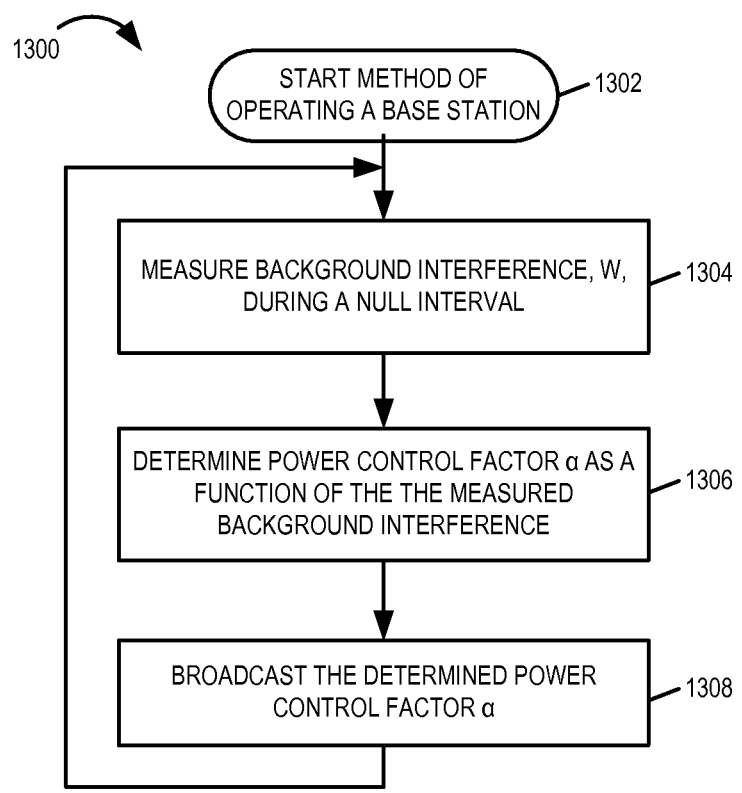
FIG. 18 is a flowchart of an exemplary method of operating a base station in accordance with various embodiments, e.g., a base station in which its uplink bandwidth is also utilized for peer to peer signaling.

FIG. 18 is a flowchart 1300 of an exemplary method of operating a base station in accordance with various embodiments, e.g., a base station in which its uplink bandwidth is also utilized for peer to peer signaling. The base station is, e.g., a base station, operating as part of a cellular communications system in which operations are synchronized between adjacent base stations. Synchronization between adjacent base stations facilitates the implementation of universal uplink null periods, in which wide area network wireless terminal cell uplink signaling can be controlled to universally stop. These null periods are utilized for the measurement of background interference. In such an embodiment, the background interference W can be approximated by W=thermal noise+peer to peer noise. The base station desires to control interference, and determines and broadcasts a power control factor α, to be received by the wireless terminals in its vicinity.

Operation starts in step 1302, where the base station is powered on and initialized. In some embodiments, the initialization includes the use of a default value for power control factor α, which is broadcast to the wireless terminals. Operation proceeds from start step 1302 to step 1304. In step 1304, the base station measures background interference, W, during a null interval, e.g., an uplink null interval in which WAN wireless terminals are controlled to refrain from signaling.

Operation proceeds from step 1304 to step 1306. In step 1306, the base station determines a power control factor α as a function of the measured background interference. In various embodiments, the function used is such that as W increases, α increases for at least some non-null range of W. In some embodiments, the determination of step 1306 includes a comparison with stored interference budget information. Operation proceeds from step 1306 to step 1308.

In step 1308, the base station broadcasts the determined power control factor α. Operation proceeds from step 1308 to step 1304, where another measurement of background interference is performed.

In some embodiments, multiple measurements of background interference are performed and used corresponding to multiple null intervals in generating a determined power control factor which is broadcast. Thus in some embodiments, the base station performs a set of background measurements, e.g., multiple iterations of step 1304, corresponding to a set of null intervals before broadcasting a determined power control factor in step 1308.

Figure 19:
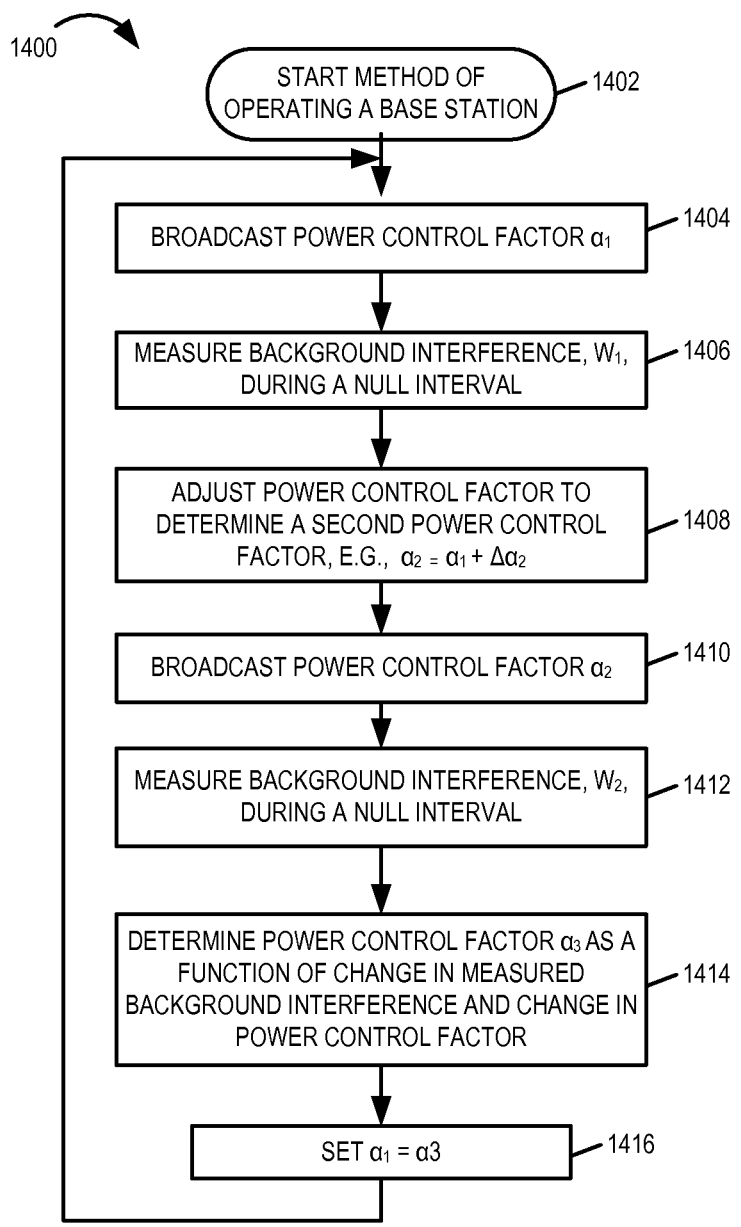
FIG. 19 is a flowchart of an exemplary method of operating a base station in accordance with various embodiments, e.g., a base station in which its uplink bandwidth is also utilized for peer to peer signaling.

FIG. 19 is a flowchart 1400 of an exemplary method of operating a base station in accordance with various embodiments, e.g., a base station in which its uplink bandwidth is also utilized for peer to peer signaling. The base station is, e.g., a base station, operating as part of a cellular communications system in which operations are not synchronized between adjacent base stations. In the uplink timing structure used by the base station uplink null periods are utilized by the base station to measure background interference. However, since operations in neighboring cells are not synchronized, the interference levels from the neighboring cells may vary over time making it more difficult to extract the peer to peer component of background interference, than would be case if the adjacent base stations were synchronized and were also controlled to have intentional uplink nulls occurring concurrently. The base station desires to control interference, and determines and broadcasts a power control factor α, to be received by the wireless terminals in its vicinity. In accordance with a feature of this embodiment, the base station intentionally varies the broadcast power control factor which it broadcasts, as a controlled input, in order to measure response.

Operation starts in step 1402, where the base station is powered on and initialized, and proceeds to step 1404. In step 1404, the base station broadcasts a power control factor $\alpha_1$. At this point $\alpha_1$ is a default value obtained from initialization. Then, in step 1406, the base station measures background interference $W_1$ during a null interval, e.g., an uplink WAN null interval in which wireless communications devices using the base station are intentionally restricted from transmitting uplink signals. Operation proceeds from step 1406 to step 1408.

In step 1408, the base station adjusts the power control factor to determine a second power control factor $\alpha_z$. For example, $\alpha_z = \alpha_1 + \Delta\alpha$, where $\Delta\alpha$ is a non-zero value and can be positive or negative. Typically $\Delta\alpha$ has a magnitude which is a small fraction of the magnitude $\alpha_1$, e.g., less than or equal to 25% of $\alpha_1$. Operation proceeds from step 1408 to step 1410, in which the base station transmits the new power control factor $\alpha_2$. Operation proceeds from step 1410 to step 1412.

In step 1412, the base station measures background interference $W_2$ during a null interval. Operation proceeds from step 1412 to step 1414. In step 1414, the base station determines power control factor $\alpha_3$ as a function of the change in the measured background interference and the change in the power control factors which were transmitted. For example $\alpha_3$ is determined as a function of $\Delta W$ and $\Delta\alpha$, where $\Delta W = W_2 - W_1$. In one exemplary embodiment, $\alpha_3$ is one of: $\alpha_3 = \alpha_z + \Delta\alpha$ and $\alpha_3 = \alpha_1 - \Delta\alpha$. Operation proceeds from step 1414 to step 1416, where the base station sets $\alpha_1 = \alpha_3$. Then operation proceeds to step 1404, where the base station broadcasts the power control factor $\alpha_1$.

Figure 20:
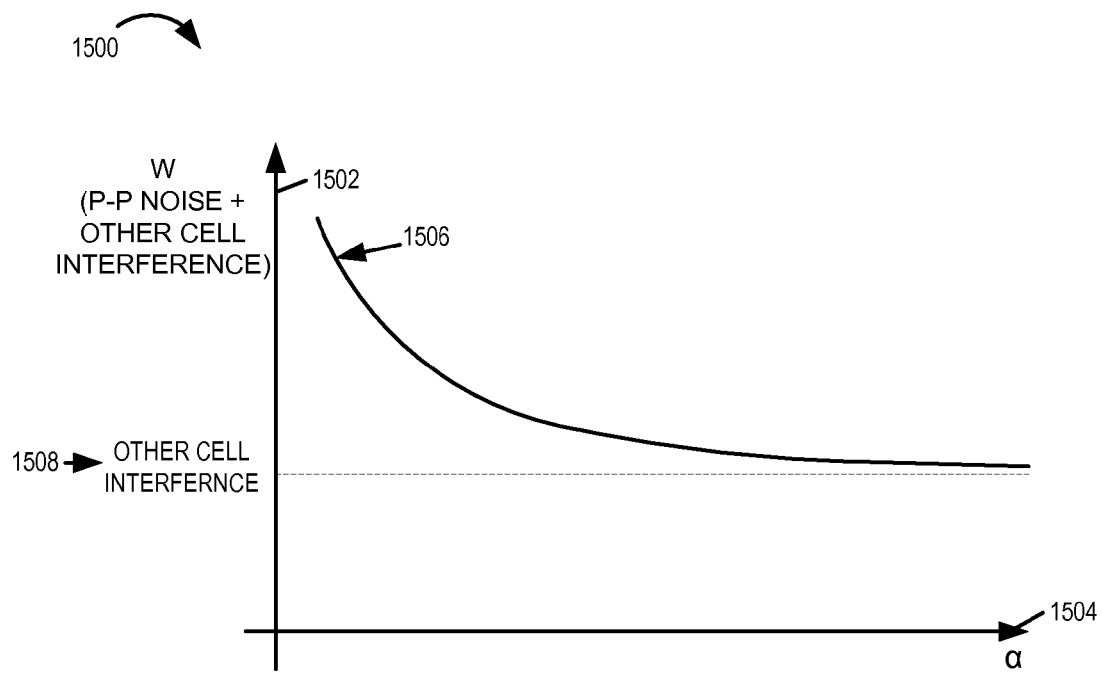
FIG. 20 is a drawing of a plot of noise W on the vertical axis vs control factor α on the horizontal axis.

FIG. 20 is a drawing of a plot 1500 of noise W on vertical axis 1502 vs α on horizontal axis 1504. Noise W, which represents receive noise at a base station attempting to recover uplink signals, includes peer to peer noise and other cell interference. The variable α is a power control factor. Curve 1506 is a characteristic curve of W vs α corresponding to other cell interference level 1508. During an intentional uplink null time interval corresponding to a first base station, the first base station intentionally controls wireless terminals using it as a point of network attachment to refrain from uplink signaling. During this intentional uplink null time interval, peer to peer activity within the cell is allowed to continue. Thus the peer to peer activity is treated by the first base station receiver as noise and contributes to the measured noise W.

Now consider that an adjacent base station is operating asynchronously with respect to the first base station. Since the adjacent base station is asynchronous with respect to the first base station, intentional uplink null time intervals of the adjacent base station do not necessary overlap intentional null time intervals of the first base station. Thus uplink signaling of the adjacent base station also contributes to the measured noise W measured by the first base station during intentional uplink null periods of the first base station.

Characteristic W vs α curve 1506 corresponds to a given level of other cell interference 1508, which represents a minimum level of interference. If operating on a point of the curve 1506 near saturation, then increases in α do not give significant improvement in reduction in noise W. An increase in α corresponds to a limiting of transmission power for peer to peer signaling. Thus, under such conditions, additionally restricting peer to peer transmission power levels does not significantly improve reception of the uplink signals from cellular wireless terminals. However, if operating on a point of curve 1506 having a high value for slope, a small increase in α can give a significant change decrease in the level of noise W. Under such conditions, at times, it may be beneficial to decrease α such as to improve recovery of the uplink signals from cell based wireless terminals. For example, a small throttling back of peer to peer transmission power levels, can, under such conditions, result in a significant improvement in uplink signaling recovery and/or throughput.

Figure 21:
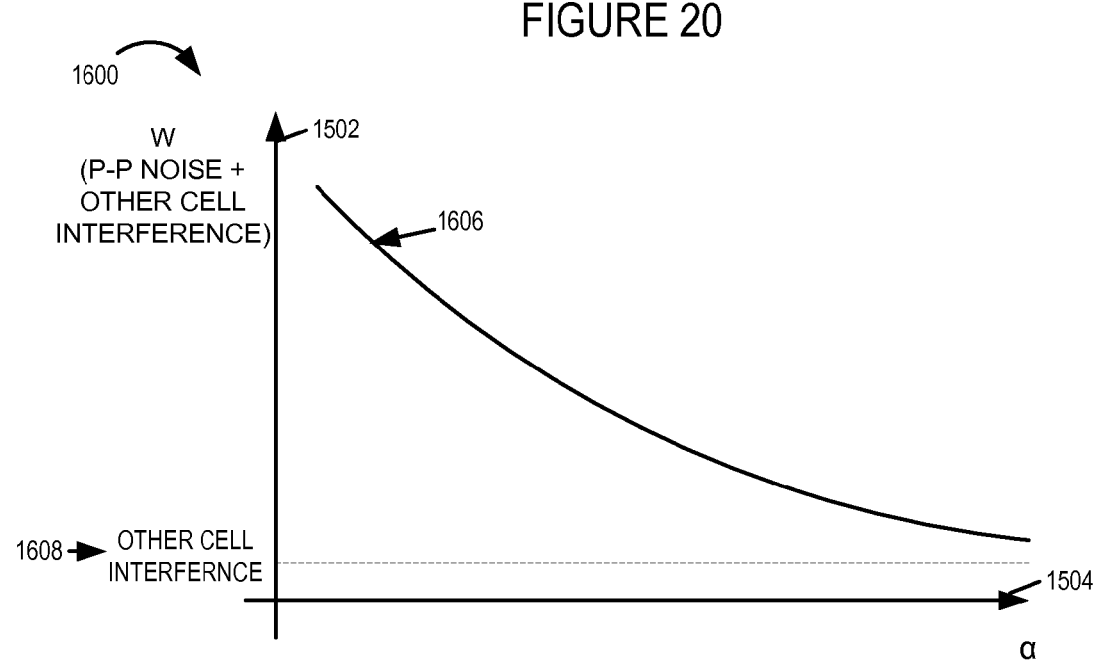
FIG. 21 is a drawing of a plot of noise W on the vertical axis vs control factor α on the horizontal axis, which illustrates a different level of other cell interference and a different characteristic curve as compared to FIG. 15.

In general, in various embodiments, good wide area, e.g., cellular, based communications reception is given priority to the peer to peer signaling. However, it is desirable, that the peer to peer communications throughput be maximized given a particular level of desired cell based uplink reception quality. It may be observed that W vs α characteristic curve will change as a function of the other cell interference. The other cell interference may, and sometimes does, change independently of the first cell operation. For example, due to: conditions, the number of cellular based wireless terminal users in the adjacent cell, adjacent cell uplink traffic load, etc., the other cell interference experienced by the first base station may change to a different level. Plot 1600 of FIG. 21 illustrates a different level of other cell interference 1608 as compared to other cell interference level 1508 of FIG. 20. In addition FIG. 21 illustrates a different characteristic curve 1606 as compared to characteristic curve 1506.

Figure 22:
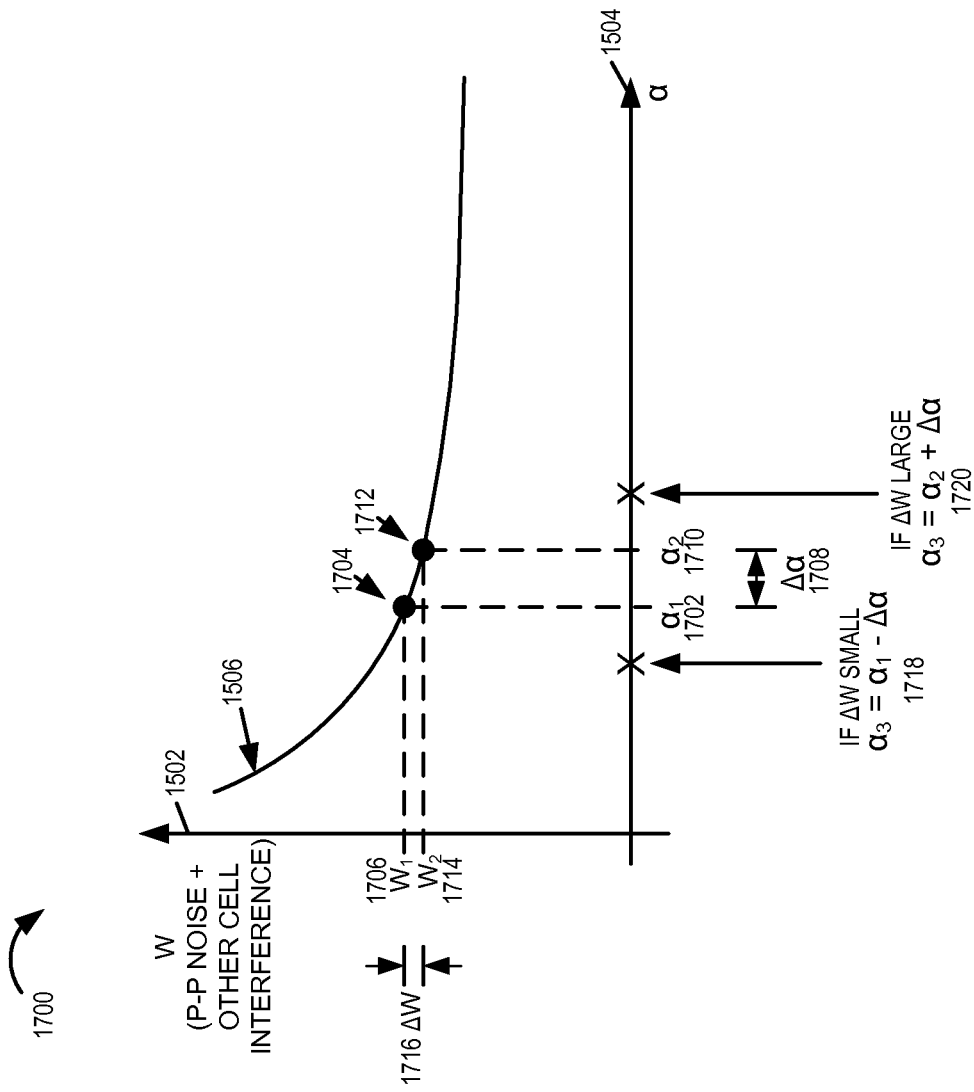
FIG. 22 illustrates an exemplary method of adjusting the selection of power control factor α used in various embodiments.

FIG. 22 illustrates an exemplary method of adjusting the selection of power control factor α used in various embodiments in response to noise measurements. FIG. 22 is a plot 1700 of noise W on vertical axis 1502 vs α on horizontal axis 1504 corresponding to characteristic curve 1506. At the time of operation, the first base station may be unaware that the first base station is operating on characteristic curve 1506 corresponding to other cell interference level 1508 of FIG. 20, with curve 1506 being one of a family of curves including curve 1506 and curve 1606 of FIG. 21.

The first base station sets α to an initial value $\alpha_1$ 1702, which is broadcast. The value $\alpha_1$ 1702 is used by the peer to peer wireless terminals in the first base station's cell to control their peer to peer transmission power. During an intentional uplink null period of the first base station, the first base station measures the receive noise level W as $W_1$ 1706. Then, the first base station intentionally changes the value of $\alpha_1$ by an amount Δα 1708, to obtain $\alpha_2$ 1710. This represents a controlled input used to intentionally drive the receive noise level to a different point (from 1704 to 1712) on the characteristic curve 1506. The first base station broadcasts the parameter $\alpha_2$ 1710. The value $\alpha_2$ 1720 is used by the peer to peer wireless terminals in the first base station's cell to control their peer to peer transmission power. During an intentional uplink null period of the first base station, the first base station measures the receive noise level W as $W_2$ 1714. The first base station measures the change in W, ΔW 1716. The first base station then decides upon a new value for α as a function of the input driving value Δα, the measured response ΔW, and some stored interference budget information. In some embodiments, the first base station decides upon the new value for α as a function of at least one noise measurement point, e.g., $W_1$ or $W_2$. In this example, the first base station sets the new value for α, $\alpha_3$ to $\alpha_3 = \alpha_1 - \Delta\alpha$ if ΔW is small as indicated by point 1718; while, the first base station sets the new value for α, $\alpha_3$ to $\alpha_3 = \alpha_2 + \Delta\alpha$ if ΔW is large as indicated by point 1720, e.g., with the small and large determination being with respect to predetermined stored interference budget information. The power control factor $\alpha_3$ is then broadcast by the first base station to be used by the peer to peer wireless terminals in the cell to control their transmission power levels.

FIG. 23 is a drawing 1800 illustrating exemplary bandwidth usage in some embodiments utilizing a time division duplex (TDD) for the wide area network, e.g., for the cellular communications. With respect to the wide area network, e.g., corresponding to a base station, the same frequency band is shared, e.g., in an alternating pattern between uplink and downlink. For example, the TDD band used for the wide area, e.g., cellular communications, is used for (uplink, downlink, uplink, downlink) as indicated by blocks (1804, 1806, 1808, 1810), respectively, along time line 1802. In addition to typical cellular based activities, the base station transmits a peer to peer broadcast signal(s), e.g., a beacon signal and/or other broadcast signals, during an interval typically reserved for wide area uplink signaling. This is represented by signals (1812, 1814) corresponding to time intervals for blocks (1804, 1808), respectively. In addition, time intervals designated to be used for wide area network, e.g., cellular uplink, are also used for peer to peer signaling, with the same TDD band being used, as indicated by cellular uplink blocks (1804, 1808) being concurrent with peer to peer blocks (1816, 1818), respectively.

FIG. 24 is a drawing 1900 illustrating exemplary bandwidth usage in some embodiments utilizing a frequency division duplex (FDD) for the wide area network, e.g., for the cellular communications. With respect to the wide area network, e.g., corresponding to a base station, different frequency bands are used by the uplink and downlink. In this exemplary embodiment, the FDD wide area uplink band is represented by block 1904 and the FDD wide area downlink band is represented by block 1906 along frequency axis 1902. In some embodiments, the uplink and downlink bands are adjacent. In some embodiments, the uplink and/or downlink bands include non-contiguous portions. In some embodiments, at least a portion of one of the uplink and downlink bands is included between two different portions of the other one of the uplink and downlink bands.

In addition to the typical cellular based uplink signaling in the FDD wide area uplink band, the band is used for other activities related to peer to peer signaling. In FIG. 24, the FDD wide area uplink band 1904 is also used by the base station to transmit peer-peer broadcast signal(s) 1908, e.g., a beacon signal and/or other broadcast signals are transmitted by the base station to be used by peer to peer wireless terminals. Peer to peer wireless terminals also use the same band for peer to peer signaling as indicated by block 1910 located on frequency axis 1902 corresponding to FDD wide area uplink band 1904.

Figure 25:
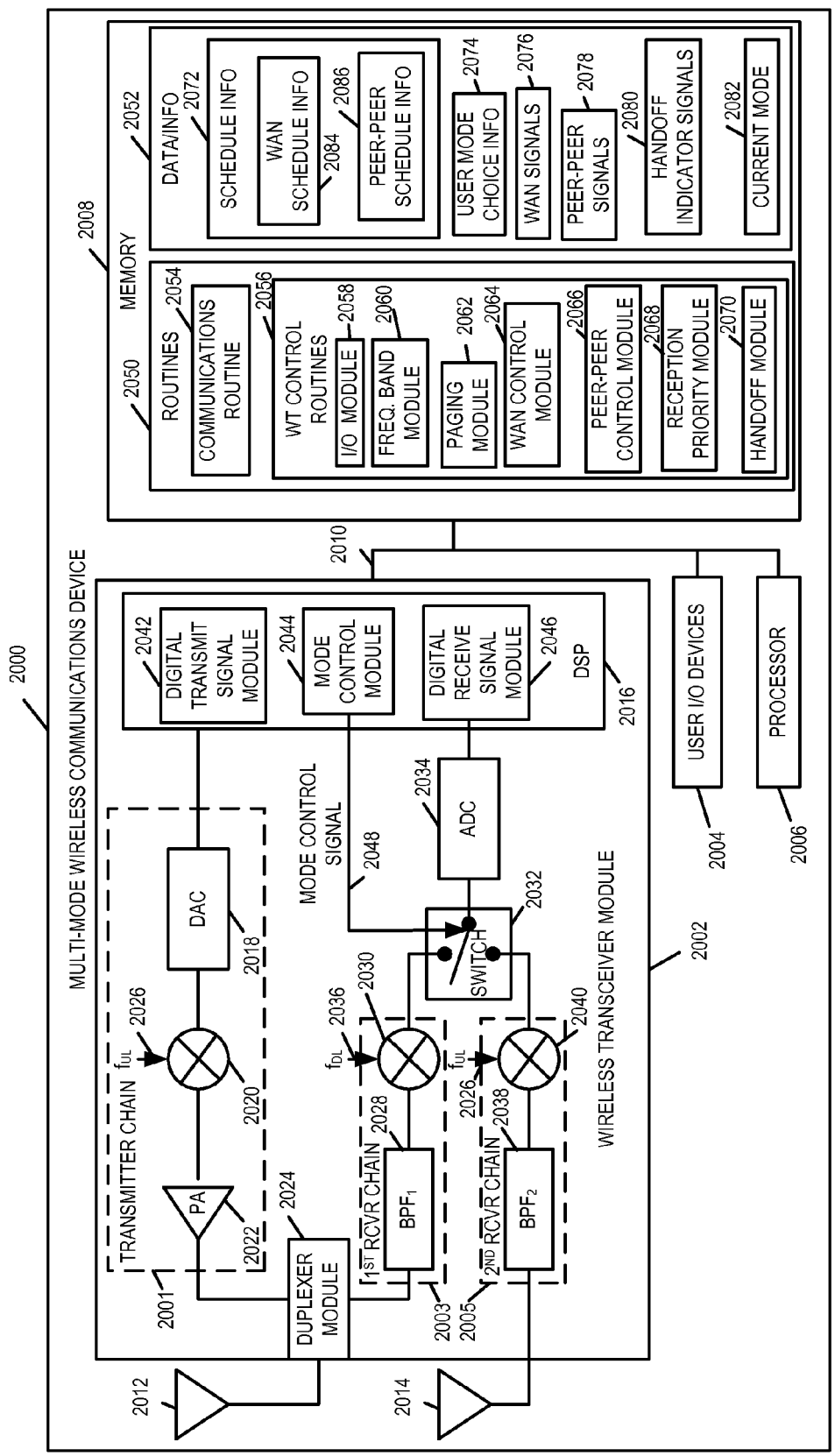
FIG. 25 is a drawing of an exemplary multi-mode wireless communications device implemented in accordance with various embodiments.

FIG. 25 is a drawing of an exemplary multi-mode wireless communications device 2000 implemented in accordance with various embodiments. Multi-mode wireless communications device 2000 supports both wide area network communications and peer to peer communications. In some embodiments, the communications device 2000 uses frequency division duplex for the wide area network communications and time division duplex for the peer to peer communications. In some such embodiments, the frequency band used for the peer to peer communications is the same frequency band as used for the uplink WAN communications. Wireless communications device 2000 includes a wireless transceiver module 2002, user I/O devices 2004, a processor 2006, and memory 2008 coupled together via a bus 2010 over which the various elements may exchange data and information.

User I/O devices 2004 include, e.g., microphone, keyboard, keypad, camera, switches, mouse, speaker, display. User I/O devices 2004 allow a user of wireless communications device 2000 to input data/information, access output data/information, and control at least some functions of the communications device 2000, e.g., set the communications device in a WAN mode of operation, set the communications device in a peer to peer mode of operation, set the communications device in a mode of operation allowing both WAN communications and peer to peer communications, etc. In some embodiments, in which the user chooses peer to peer communications, the communications device automatically switches on a recurring basis into a WAN mode of operation to be able to monitor for WAN paging signals being communicated. In some embodiments in which the uses sets the communications device in a mode of operation supporting both WAN signaling and peer to peer signaling, the communications device automatically switches between modes as a function of at least one of reception priority considerations and handoff considerations.

Memory 2008 includes routines 2050 and data/information 2052. The processor 2006, e.g., a CPU, executes the routines 2050 and uses the data/information 2052 in memory 2008 to control the operation of the wireless communications device 2000 and implement methods.

Wireless transceiver module 2002 includes a duplexer module 2024, a transmitter chain 2001, a $1^{st}$ receiver chain 2003, a $2^{nd}$ receiver chain 2005, a switch 2032, an analog to digital converter (ADC) 2034 and a digital signal processor (DSP) 2016. DSP 2016 includes a digital transmit signal module 2042, a mode control module 2044, and a digital receive signal module 2046. Transmitter chain 2001 is used for generating transmission signals having a first RF frequency, e.g., the frequency represented by $f_{UL}$. First receiver chain 2003 is for processing received signals having a second RF frequency, e.g., the frequency represented by $f_{DL}$. Second receiver chain 2005 is for processing received signals having the first RF frequency, e.g., the frequency represent by $f_{UL}$ 2026.

Transmitter chain 2001 includes a digital to analog converter (DAC) 2018, a mixer 2020, and a power amplifier (PA) 2022. The digital transmit signal module 2042 outputs a digital signal to DAC 2018 which converts the digital signal to an analog signal. The analog signal is input to mixer 2020 which also has input 2026 which is the uplink frequency ($f_{UL}$), e.g., the wide area network uplink communications band carrier frequency. The output of the mixer 2020 is input to power amplifier 2022, which amplifies the received signal and outputs the amplified signal to duplexer module 2024. The duplexer module 2024 couples the received amplified signal to be transmitted to antenna 2012, via which the communications device 2000 transmits signals. Transmitted signals include uplink signals when the wireless communications device 2000 is operating in a WAN mode of operation and include peer to peer signals when the communications device is operating in a peer to peer mode of operation.

The first receiver chain 2003 includes a first bandpass filter (BPF$_1$ 2028) and a mixer 2030; the second receiver chain 2005 includes a second bandpass filter (BPF$_2$ 2038) and a mixer 2040. When the wireless communications device 2000 is to be operated to receive WAN signals, mode control module 2044 controls switch 2032 to couple the output of the $1^{st}$ receiver chain 2030 to the ADC 2034. Alternatively, when the wireless communications device is to be operated to receive peer to peer signals, mode control module 2044 controls switch 2032 to couple the output of the $2^{nd}$ receiver chain 2005 to the ADC 2034.

Assume that the switch 2032 has been controlled by mode control module 2044 to couple the $1^{st}$ receiver chain 2003 to ADC 2034. Downlink signals from a base station are received via antenna 2012 and coupled, via duplexer module 2024, to BPF$_1$ 2028. The output of the band pass filter 1 2028 is input to mixer 2030. Another input to mixer 2030 is downlink frequency ($f_{DL}$) 2036, e.g., the wide area network downlink communications band carrier frequency. The mixer module 2030 removes the carrier frequency, e.g., obtaining an analog baseband signal. The output signal, e.g., the analog baseband signal is fed to the ADC converter 2034 via switch 2032. The ADC converter 2034 processes the input signal obtaining a digital signal representation, which is fed to the digital receive signal module 2046.

Now assume that the switch 2032 has been controlled by mode control module 2044 to couple the $2^{nd}$ receiver chain 2003 to ADC 2034. Peer to peer signals from a wireless communications device operating in a peer to peer mode are received via antenna 2014 and coupled to BPF$_2$ 2038. The output of the band pass filter 2 2038 is input to mixer 2040. Another input to mixer 2040 is uplink frequency ($f_{UL}$) 2026, e.g., the wide area network uplink communications band carrier frequency which is also being utilized for peer to peer signaling. The mixer module 2040 removes the carrier frequency, e.g., obtaining an analog baseband signal. The output signal, e.g., the analog baseband signal is fed to the ADC converter 2034 via switch 2032. The ADC converter 2034 processes the input signal obtaining a digital signal representation, which is fed to the digital receive signal module 2046.

Mode control module 2044 switches between use of first and second receiver chains (2003, 2005) as a function of which one of a first and second mode of operation the mode control module 2044 selects to be used at a given time. In various embodiments, the first mode of operation is a frequency division duplex mode of operation, e.g., a wide area network FDD mode of operation, and the second mode of operation is a peer to peer communications mode of operation, e.g., a time division duplex (TDD) peer to peer mode of operation.

In some embodiments, the mode control module 2044 automatically controls switching as a function of a wide area network reception schedule implemented by the communications device 2000. In some such embodiments, the scheduling information indicates when wide area network paging messages may be received by the multi-mode communications device 2000, said mode control module 2044 controlling said device 2000 to operate in the first mode of operation, e.g., the WAN mode of operation, during time periods in which the wide area network paging messages may be received by the multi-mode communications device 2000. In some embodiments, the mode control module 2044 causes the device 2000 to switch modes in response to a received user input selection. In some embodiments, mode control module 2044 causes the device 2000 to switch modes in response to reception priority information. In various embodiments, the mode control module 2044 causes the device 2000 to switch modes in response to a handoff indicator signal. In some embodiments, the mode control module 2044 causes the device 2000 to switch modes in response to schedule information, e.g., peer to peer communications are restricted during certain times of anticipated high WAN signaling to reduce interference. In some embodiments, the mode control module 2044 causes the device 2000 to switch modes in response to location information, e.g., some locations may be located outside a cellular coverage area or other locations may be too close to a base station to permit peer to peer signaling in the uplink frequency band due to interference considerations at the base station receiver or a service provider does not have authorization to use one of WAN signaling or peer to peer signaling in a particular region. In some embodiments, the mode control module 2044 causes the device 2000 to switch modes in response to detected channel quality changes on a link being maintained.

Routines 2050 include a communications routine 2054 and wireless terminal control routines 2056. The communications routine 2054 implements various communications protocols used by the wireless communications device 2000. Wireless terminal control routines 2056 include an I/O module 2058, a frequency band module 2060, a paging module 2062, a wide area network control module 2064, a peer to peer control module 2066, a reception priority module 2068, and a handoff module 2070. Data/information 2052 includes schedule information 2072, user mode choice information 2074, wide area network signals 2076, peer to peer signals 2078, handoff indicator signals 2080, and information identifying the current mode 2082.

I/O module 2058 controls operation of user I/O devices 2004 and receives user mode choice information 2074, e.g., a user choice to use WAN signaling, a user choice to enable peer to peer signaling, a user choice to place the device in a mode which automatically switches between WAN and peer to peer operations as a function of reception priority information and/or handoff information.

Frequency band module 2060 selects and sets the frequency input signals $f_{UL}$ 2026 used by transmitter chain 2001 and $2^{nd}$ receiver chain 2005 and sets $f_{DL}$ 2036 used by $1^{st}$ receiver chain 2003.

Paging module 2062 controls operations related to paging. In some embodiments, when peer to peer operations are enabled and the wireless communications device 2000 is operating primarily using peer to peer signaling, the communications device 2000 is switched to receive WAN paging signals during WAN paging intervals in a recurring schedule.

WAN control module 2064 controls operations when in the WAN mode, e.g., controlling digital transmit signal module 2042 to generate uplink signals to be communicated to a base station serving as a point of network attachment and controlling digital receive signal module 2046 to process received downlink signals from a base station.

Peer to peer control module 2066 controls operations when in the peer to peer mode, e.g., controlling the digital transmit signal module to generate peer to peer signals to be transmitted to other wireless terminals operating in a peer to peer mode and controlling the digital receive signal module 2046 to process received peer to peer signals from other wireless terminals operating in a peer to peer mode of operation.

Reception priority module 2068 determines whether WAN network communications are to have priority or whether peer to peer signaling is to have priority at a given time. Determinations by module 2068 are used by mode control module 2044, which controls switching between alternate receiver chains (2003, 2005) to implement WAN communications or peer to peer communications, respectively. Thus mode control module 2044, switches between a WAN mode and a peer to peer mode as a function of reception priority information. For example, in some embodiments, priority is usually given to WAN signaling over peer to peer signaling; however, for at least some types of users and/or some types of signaling priority is given to peer to peer signaling over wide area network signaling, e.g., users and/or signals corresponding to emergency services. As another example, priority is given based on evaluating competing latency considerations and/or service levels.

Handoff module 2070 determines whether peer to peer signaling or WAN signaling is to be used for a portion of a handoff. Handoff module 2070 generates handoff indicator signals 2080, which mode control module 2044 is responsive to, causing mode switches. Some handoff control signals 2080 indicate a handoff from a peer to peer communications link to a wide area network communications link to cause a switch from a peer to peer mode of operation to a wide area network mode of operation. Other handoff control signals 2080 indicate a handoff from a wide area network communications link to a peer to peer communications link to cause a switch from a wide area network mode of operation to a peer to peer mode of operation.

Schedule information 2072 includes WAN schedule information 2084 and peer to peer schedule information 2086. WAN schedule information 2084 includes information defining an uplink timing/frequency structure and information defining a downlink timing/frequency structure. The WAN scheduling information 2084 includes information identifying WAN paging intervals. In some embodiments, peer to peer operations are suspended during at least some WAN paging intervals to support WAN paging access of wireless communications devices. Peer to peer schedule information 2086 includes information identifying different peer to peer intervals in a recurring peer to peer timing structure, e.g., peer discovery intervals, peer to peer paging intervals, and traffic intervals.

User mode choice information 2074 includes information from I/O module 2058 identifying a user commanded or requested mode preference, e.g., a wide area network mode, a peer to peer mode, or a mode which allows the communications device 2000 to automatically alternate between WAN mode and peer to peer mode, e.g., as a function of signal quality, priority, loading and/or handoff information.

WAN signals include received downlink signals and uplink signals to be transmitted. Received downlink signals from a base station include, e.g., beacon signals, pilot channel signals, synchronization signals, power control signals, timing control signals, paging signals, assignment signals, and traffic channel signals. Uplink signals include, e.g., access signals, timing control signals, dedicated control channel signals including air link resource request signals and channel condition reports, page request signals and uplink traffic channel signals.

Peer to peer signals include peer to peer transmit signals and peer to peer receive signals. Exemplary peer to peer transmit signals include, e.g., a user beacon signal identifying communications device 2000, a peer to peer paging signal, a peer to peer traffic request signal, and a peer to peer traffic signal. Exemplary peer to peer receive signals include, e.g., user beacons from other wireless communications devices in the local vicinity, peer to peer paging signals, peer to peer traffic request signals, and peer to peer traffic signals.

Handoff indicator signals 2080 are output from handoff module 2070 and used by mode control module 2044. Current mode information 2082 indicates the current mode set by mode control module 2044 corresponding to mode control signal 2048.

In some embodiments, the same antenna is used irrespective of whether first receiver chain 2003 or second receiver chain 2005 is being used. In some embodiments, an additional switch is used to couple one of first receiver chain 2003 and second receiver chain 2005 to duplexer module 2024, the operation of the additional switch being coordinated with the operation of switch 2032.

In various embodiments, duplexer module 2024 is not used and a separate antenna is used for the transmitter and the receiver. In some embodiments, an additional switch is used to couple one of first receiver chain 2003 and second receiver chain 2005 to the receive antenna, the operation of the additional switch being coordinated with the operation of switch 2032.

In some embodiments, the first and second band pass filters are different hardware devices. In some embodiments, the first and second band pass filters are programmable and are programmed to implement different filters.

In another embodiment, a single mixer is used in place of mixers (2030, 2040) with the frequency input being controllably switched between $f_{DL}$ and $f_{UL}$ as a function of the mode control signal and the band pass filter being switched as a function of the mode control signal.

In some embodiments, various elements included in DSP 2016, e.g., mode control module 2044, are included in routines 2050. In some embodiments, various elements included in memory 2008, are included in wireless transceiver module 2002. In some embodiments, an individual wireless transmitter module and an individual wireless receiver module are implemented in place of wireless transceiver module 2002.

Figure 26:
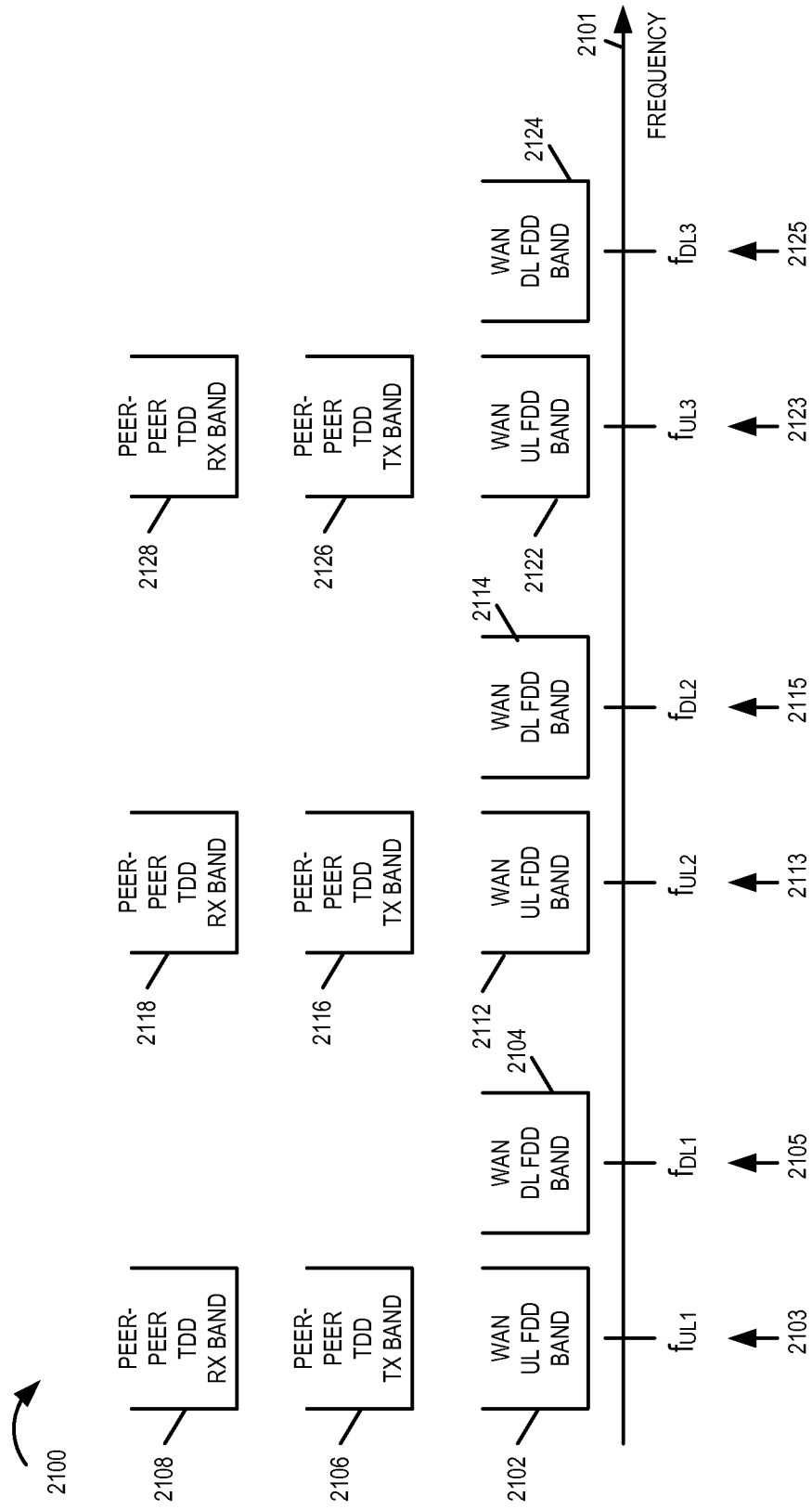
FIG. 26 is a drawing illustrating exemplary frequency bands and shared frequency band usage between wide area network communications usage and peer to peer communications usage in accordance with various embodiments.

FIG. 26 is a drawing 2100 illustrating exemplary frequency bands and shared frequency band usage between wide area network communications usage and peer to peer communications usage in accordance with various embodiments. A band used as a wide area network communications band is also allocated for usage as a peer to peer TDD receiver band and as a peer to peer TDD transmitter band. As an example, the bands presented in FIG. 26 may be utilized by the multi-mode wireless communications device 2000 of FIG. 25, e.g., with a different pair of WAN uplink and downlink communications bands being available and/or used at different locations and/or at different times.

Horizontal axis 2101 represents frequency. Corresponding to frequency $f_{UL1}$ 2103 there is a wide area network uplink frequency division duplex band 2102, a peer to peer time division duplex transmit band 2106 and a peer to peer time division duplex receive band 2108. Wide area network uplink frequency division duplex band 2102 is paired with wide area network downlink frequency division duplex band 2104. Corresponding to frequency $f_{DL1}$ 2105 there is wide area network downlink frequency division duplex band 2104.

Similarly, corresponding to frequency $f_{UL2}$ 2113 there is a wide area network uplink frequency division duplex band 2112, a peer to peer time division duplex transmit band 2116 and a peer to peer time division duplex receive band 2118. Wide area network uplink frequency division duplex band 2112 is paired with wide area network downlink frequency division duplex band 2114. Corresponding to frequency $f_{DL2}$ 2115 there is wide area network downlink frequency division duplex band 2114.

Similarly, corresponding to frequency $f_{UL3}$ 2123 there is a wide area network uplink frequency division duplex band 2122, a peer to peer time division duplex transmit band 2126 and a peer to peer time division duplex receive band 2128. Wide area network uplink frequency division duplex band 2122 is paired with wide area network downlink frequency division duplex band 2124. Corresponding to frequency $f_{DL3}$ 2125 there is wide area network downlink frequency division duplex band 2124.

Consider exemplary device 2000 of FIG. 25. The communications device decides to use one of the 3 WAN frequency pairs in FIG. 26. For example, consider that the second pair is chosen. The transmitter chain 2001, which is used for both WAN and peer to peer transmit signaling, and the second receiver chain 2005, which is used for peer to peer signal reception, are tuned to $f_{UL2}$. The first receiver chain 2003, which is used to receive WAN signals, is tuned to $f_{DL2}$.

Figure 27:
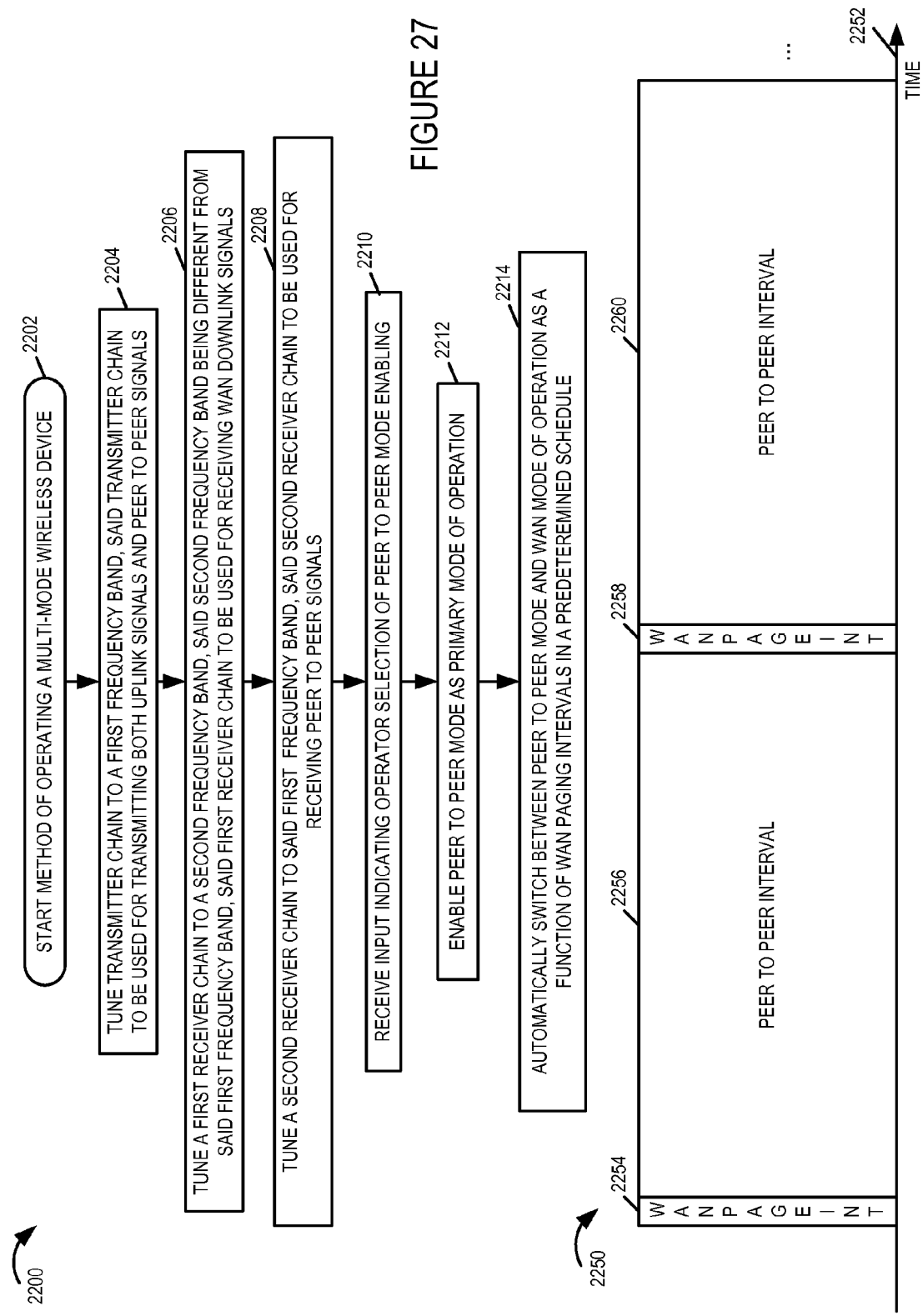
FIG. 27 includes a flowchart of an exemplary method of operating a multi-mode wireless communications device and exemplary timing structure information in accordance with various embodiments.

FIG. 27 includes a flowchart 2200 of an exemplary method of operating a multi-mode wireless communications device and exemplary timing structure 2250 information in accordance with various embodiments. Operation of the exemplary method starts in step 2202, where the multi-mode wireless communications device is powered on and initialized. The multi-mode wireless communications device is, e.g., device 2000 of FIG. 25. Operation proceeds from start step 2202 to step 2204. In step 2204, the wireless device tunes its transmitter chain to a first frequency band, said transmitter chain to be used for transmitting both uplink signals and peer to peer signals. In step 2206, the wireless device tunes its first receiver chain to a second frequency band, said second frequency band being different from said first frequency band, said first receiver chain to be used for receiving WAN downlink signals. In step 2208, the wireless device tunes its second receiver chain to the first frequency band, said second receiver chain to be used for receiving peer to peer signals. Operation proceeds from step 2208 to step 2210.

In step 2210, the wireless device receives input indicating operator selection of peer to peer mode enabling. Then, in step 2212, the wireless communications device enables peer to peer mode as the primary mode of operation to be used. Operation proceeds from step 2212 to step 2214. In step 2214, the wireless device automatically switches between peer to peer mode and WAN mode of operation as a function of WAN paging intervals in a predetermined schedule. For example, consider multi-mode wireless communications device 2000 of FIG. 25, when the schedule indicates that a paging interval is occurring the mode control module 2044 controls the switch 2032 to couple the $1^{st}$ receiver chain 2003 to the ADC 2034; however when the schedule indicates that a paging interval is not occurring the mode control module 2044 controls the switch 2032 to couple the $2^{nd}$ receiver chain 2005 to the ADC 2034.

Drawing 2250 of FIG. 27 indicates exemplary timing structure information which identifies exemplary WAN paging intervals (2254, 2258) and exemplary peer to peer intervals (2256, 2260), along time axis 2252 in an exemplary recurring timing structure.

Figure 28:
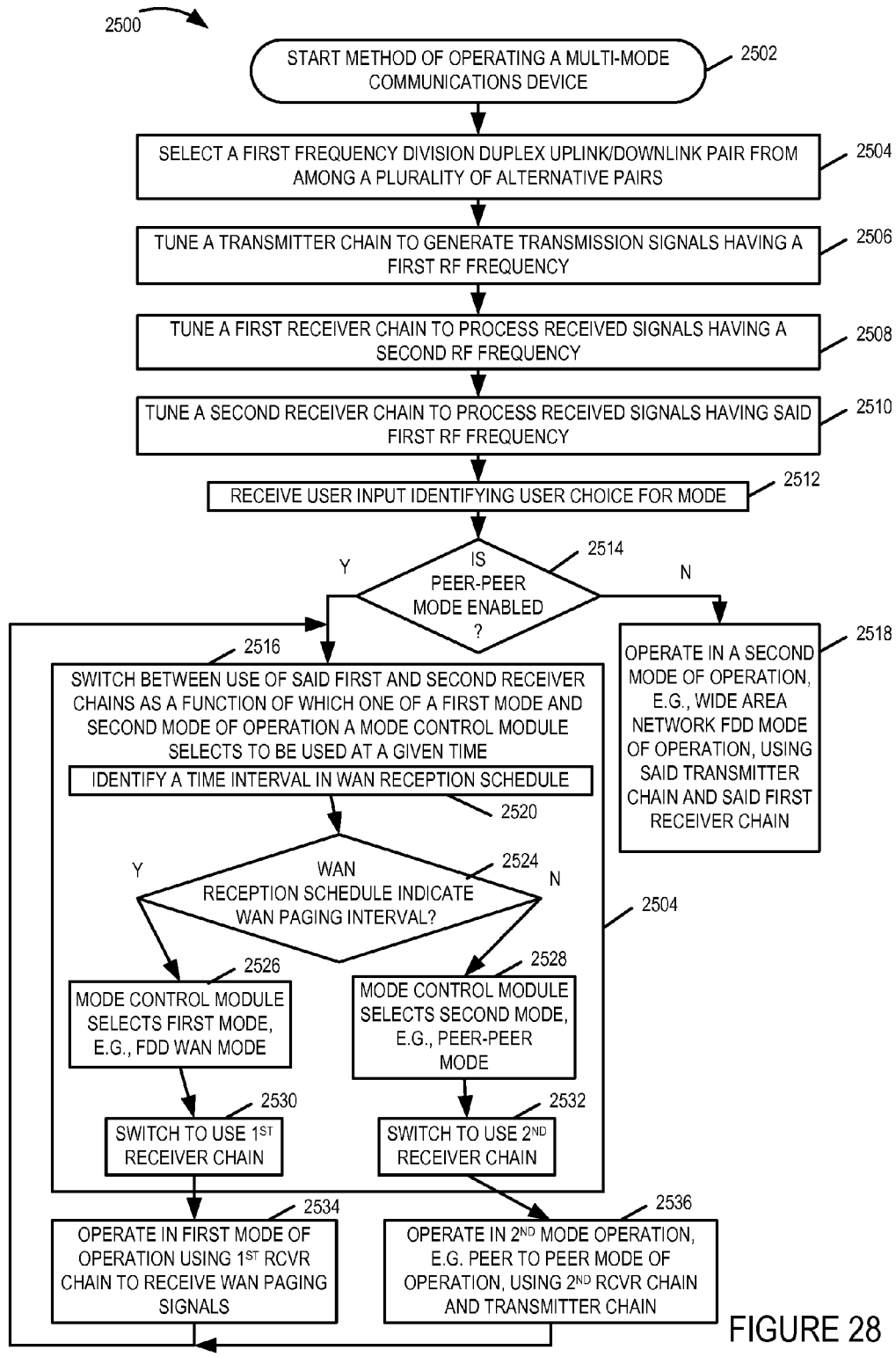
FIG. 28 is a flowchart of an exemplary method of operating a multi-mode wireless communications device in accordance with various embodiments.

FIG. 28 is a flowchart 2500 of an exemplary method of operating a multi-mode wireless communications device in accordance with various embodiments. The multi-mode wireless communications device is, e.g., device 2000 of FIG. 25. Operation starts in step 2502, where the multi-mode communications device is powered on and initialized and proceeds to step 2504. In step 2504, the wireless terminal selects a first frequency division duplex uplink/downlink pair, e.g., a pair of FDD frequency bands with associated tuner frequency settings, from among a plurality of alternative pairs. Drawing 2100 of FIG. 26 illustrates three exemplary FDD uplink/downlink pairs.

Operation proceeds from step 2504 to step 2506, where the communications device tunes a first transmitter chain to generate transmission signals having a first RF frequency, and in step 2508, the communications device tunes a first receiver chain to process received signals having a second RF frequency. Operation proceeds from step 2508 to step 2510 in which the communications device tunes a second receiver chain to process received signals having the said first RF frequency. In some embodiments, one or more of steps 2506, 2508 and 2510 are performed in parallel. In various embodiments, the first RF frequency corresponds to the FDD uplink of the FDD pair selected in step 2504, and the second RF frequency corresponds to the FDD downlink of the FDD pair selected in step 2504.

Operation proceeds from step 2510 to step 2512. In step 2512, the communications device receives user input identifying a user choice for mode, e.g., peer to peer communications mode or wide area network communications mode. Operation proceeds from step 2512 to step 2514. In step 2514 the communications device proceeds along different paths depending upon whether or not peer to peer mode has been enabled by the user choice of step 2512.

If peer to peer mode is enabled, then operation proceeds from step 2514 to step 2516. If peer to peer mode is not enabled, then operation proceeds from step 2514 to step 2518, where the communications device operates in a second mode of operation, e.g., a wide area network FDD mode of operation, using said transmitter chain and said first receiver chain.

Returning to step 2516, in step 2516, the communications device switches between use of said first and second receiver chains as a function of which one of a first mode and a second mode of operation a mode control module selects to be used at a given time. The switching is, in various embodiments, performed in an automatic or semi-automatic manner without user intervention. Step 2516 includes sub-steps 2520, 2524, 2526, 2528, 2530 and 2532. In sub-step 2520, the communications device identifies a time interval in a WAN reception schedule implemented by the communications device, and then in sub-step 2524, the communications device determines whether or not the identified time interval in the WAN reception schedule indicates a WAN paging interval. If a paging interval is indicated, then operation proceeds from sub-step 2524 to sub-step 2526; otherwise operation proceeds from sub-step 2524 to sub-step 2528.

Returning to sub-step 2526, in sub-step 2526, the mode control module of the communications device selects the first mode, e.g., the FDD WAN mode of operation, and in sub-step 2530, the communications devices switches to use the $1^{st}$ receiver chain. Returning to sub-step 2528, in sub-step 2528, the mode control module of the communications device selects the second mode, e.g., the peer to peer communications mode of operation, and in sub-step 2532, the communications devices switches to use the $2^{nd}$ receiver chain.

If operation had proceeded through sub-step 2530, then operation proceeds to step 2534; while if operation had proceeded through sub-step 2532, then operation proceeds to step 2536. In step 2534, the communications device is operated in the first mode of operation, e.g., the FDD WAN mode, using the $1^{st}$ receiver chain to receive WAN paging signals. In step 2536, the communications device is operated in the second mode of operation, e.g., the peer to peer mode of operation, using the $2^{nd}$ receiver chain and the transmitter chain. In various embodiments, when a user enables peer to peer operation, the communications device operates predominately in the $2^{nd}$ mode using the $2^{nd}$ receiver chain; however, during at least some paging intervals of the WAN timing structure, the communications device operates in the first mode using the $1^{st}$ receiver chain. Operation proceeds from one of step 2534 and step 2536 to step 2516 to identify and consider mode and switching pertaining to another time interval.

Figure 29:
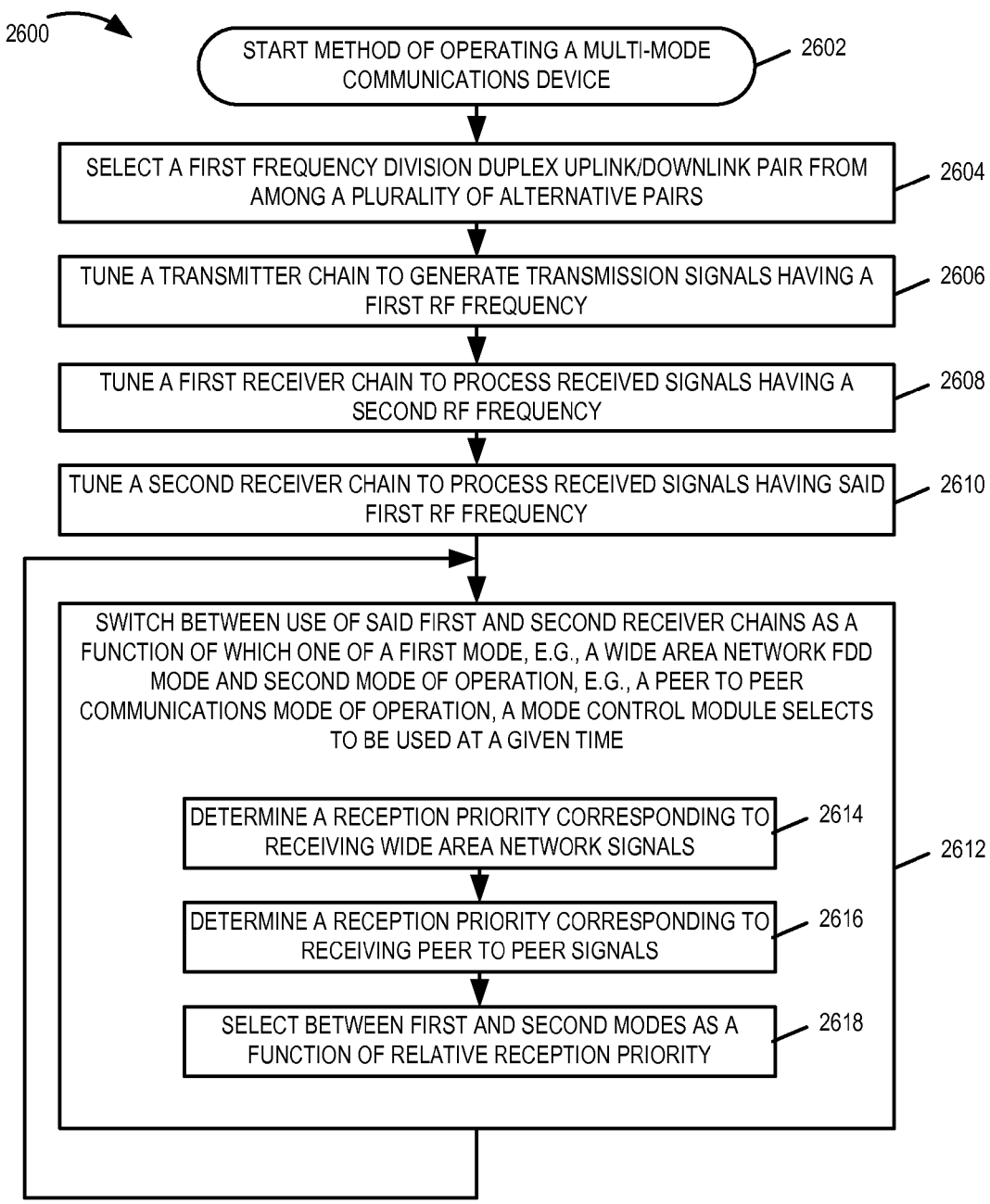
FIG. 29 is a flowchart of an exemplary method of operating a multi-mode wireless communications device in accordance with various embodiments.

FIG. 29 is a flowchart 2600 of an exemplary method of operating a multi-mode wireless communications device in accordance with various embodiments. The multi-mode wireless communications device is, e.g., device 2000 of FIG. 25. Operation starts in step 2602, where the multi-mode communications device is powered on and initialized and proceeds to step 2604. In step 2604, the wireless terminal selects a first frequency division duplex uplink/downlink pair, e.g., a pair of FDD frequency bands with associated tuner frequency settings, from among a plurality of alternative pairs. Drawing 2100 of FIG. 26 illustrates three exemplary FDD uplink/downlink pairs.

Operation proceeds from step 2604 to step 2606, where the communications device tunes a first transmitter chain to generate transmission signals having a first RF frequency, and in step 2608, the communications device tunes a first receiver chain to process received signals having a second RF frequency. Operation proceeds from step 2608 to step 2610 in which the communications device tunes a second receiver chain to process received signals having the said first RF frequency. In some embodiments, one or more of steps 2606, 2608 and 2610 are performed in parallel. In various embodiments, the first RF frequency corresponds to the FDD uplink of the FDD pair selected in step 2604, and the second RF frequency corresponds to the FDD downlink of the FDD pair selected in step 2604.

Operation proceeds from step 2610 to step 2612. In step 2612, the communications device switches between use of the first and second receiver chains as a function of which one of a first mode, e.g., a wide area network FDD mode and a second mode, e.g., a peer to peer mode of operation, a mode control module selects to be used at a given point in time. For example, the multi-mode communications device uses the transmitter irrespective of whether the communications device is in the wide area network FDD mode or in the peer to peer mode. However, with respect to reception, the multi-mode communications device uses the first receiver chain when in the WAN FDD mode and uses the second receiver chain when in the peer to peer mode of operation. Thus the WAN communications are FDD, and the peer to peer communications are TDD with the peer to peer communications sharing the WAN FDD uplink band.

Step 2612 includes sub-steps 2614, 2616 and 2618. In sub-step 2614, the communications device determines a reception priority corresponding to receiving wide area network signals, and in sub-step 2616, the communications device determines a reception priority corresponding to receiving peer to peer signals. Then, in sub-step 2618, the communications device selects between first and second modes as a function of relative reception priority.

Operation proceeds from the output of step 2612 to the input of step 2612. Over time reception priorities may, and sometimes do change, e.g., due to a particular user of the communications device, service level information, type of data to be communicated, amounts of data to be communicated, latency considerations, etc.

Figure 30:
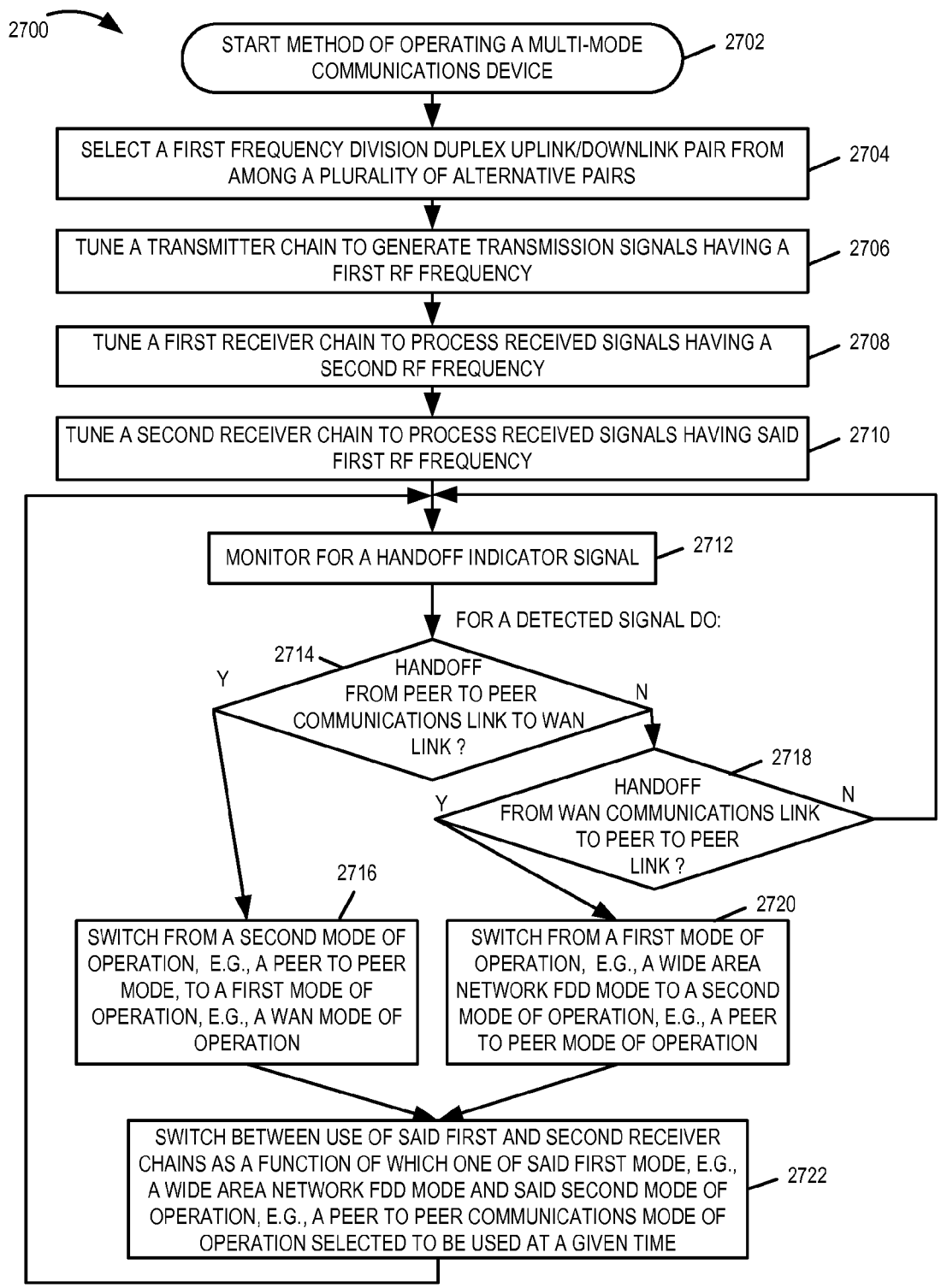
FIG. 30 is a flowchart of an exemplary method of operating a multi-mode wireless communications device in accordance with various embodiments.

FIG. 30 is a flowchart 2700 of an exemplary method of operating a multi-mode wireless communications device in accordance with various embodiments. The multi-mode wireless communications device is, e.g., device 2000 of FIG. 25. Operation starts in step 2702, where the multi-mode communications device is powered on and initialized and proceeds to step 2704. In step 2704, the wireless terminal selects a first frequency division duplex uplink/downlink pair, e.g., a pair of FDD frequency bands with associated tuner frequency settings, from among a plurality of alternative pairs. Drawing 2100 of FIG. 26 illustrates three exemplary FDD uplink/downlink pairs.

Operation proceeds from step 2704 to step 2706, where the communications device tunes a first transmitter chain to generate transmission signals having a first RF frequency, and in step 2708, the communications device tunes a first receiver chain to process received signals having a second RF frequency. Operation proceeds from step 2708 to step 2710 in which the communications device tunes a second receiver chain to process received signals having the said first RF frequency. In some embodiments, one or more of steps 2706, 2708 and 2710 are performed in parallel. In various embodiments, the first RF frequency corresponds to the FDD uplink of the FDD pair selected in step 2704, and the second RF frequency corresponds to the FDD downlink of the FDD pair selected in step 2704.

Operation proceeds from step 2710 to step 2712. In step 2712, the communications device monitors for a handoff indicator signal. For a detected handoff indicator signal, operation proceeds from step 2712 to step 2714.

In step 2714, the communications device determines whether or not the handoff is from a peer to peer communications link to a WAN communications link. If the handoff is determined to be from a peer to peer communications link to a WAN link, then operation proceeds from step 2714 to step 2716; otherwise operation proceeds from step 2714 to step 2718.

In step 2718, the communications device determines whether or not the handoff is from a WAN communications link to a peer to peer communications link. If the handoff is determined to be from a WAN communications link to a peer to peer link, then operation proceeds from step 2718 to step 2720; otherwise operation proceeds from step 2718 to step 2712 since the type of link has not changed, e.g., a handoff is occurring between different base stations or different base station sectors within the WAN network, and switching between receivers is not performed.

Returning to step 2716, in step 2716 the communications device switches from a second mode of operation, e.g., a peer to peer mode of operation, to a first mode of operation, e.g., a WAN mode of operation. Returning to step 2720, in step 2720 the communications device switches from a first mode of operation, e.g., a WAN mode of operation, to a second mode of operation, e.g., a peer to peer mode of operation. Operation proceeds from one of steps 2716 and 2720 to step 2722.

In step 2722, the communications device switches between use of said first and second receiver chains as a function of which one of said first mode, e.g., a wide area network FDD mode, and said second mode of operation, e.g., a peer to peer communication mode of operation is selected to be used at a given time. For example, if operation proceeded along step 2716, then switching occurs such that the receiver chain usage transitions from the second receiver chain to the first receiver chain. Continuing with the example, if operation had proceeded along step 2720, then, switching occurs such that the receiver chain usage transitions from the first receiver chain to the second receiver chain. Operation proceeds from step 2722 to step 2712 to monitor for additional handoff indicator signals.

In various embodiments, the same transmitter chain is used in both the WAN FDD mode of operation, e.g., a cellular mode of operation, and in the peer to peer mode of operation, e.g., a TDD peer to peer mode of operation. However, a different receiver chain is utilized when in the WAN mode of operation as compared to when in the peer to peer mode of operation. In various embodiments the TDD peer to peer mode of operation uses the same frequency band for both transmission and reception as is used in the WAN for uplink signaling.

In some embodiments, a cellular based communications system using at least one of TDD and FDD accommodates peer to peer signaling with at least some of the peer to peer signaling sharing air link resources also used for uplink wide area network, e.g., cell based, uplink signaling. In some embodiments, a typical cellular based communications system using at least one of TDD and FDD is modified to accommodate peer to peer signaling with at least some of the peer to peer signaling sharing air link resources typically reserved for uplink wide area network, e.g., cell based, uplink signaling. In some embodiments, many legacy communications devices supporting cell based signaling, but not peer to peer signaling, can continue to be used in the communications system. In various embodiments, a communications system supports a mixture of communications devices with at least some of the communications devices supporting peer to peer communications, but not supporting cell based communications. In some embodiments, a communications system supports a mixture of communications devices with at least some of the communications devices supporting both peer to peer communications and cell based communications.

While described primarily in the context of an OFDM system, the methods and apparatus of various embodiments are applicable to a wide range of communications systems including many non-OFDM and/or non-cellular systems. Some exemplary systems include a mixture of technologies utilized in the peer to peer signaling, e.g., some OFDM type signals and some CDMA type signals.

In various embodiments nodes described herein are implemented using one or more modules to perform the steps corresponding to one or more methods, for example, scanning an uplink bandwidth, evaluating a base station signal, determining a transmission power level control parameter, controlling peer to peer transmission power, measuring interference, determining a transmission power control value, transmitting a transmission power control parameter etc. In some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium including machine executable instructions for causing a machine, e.g., processor and associated hardware, to perform one or more of the steps of the above-described method(s).

Numerous additional variations on the methods and apparatus described above will be apparent to those skilled in the art in view of the above descriptions. Such variations are to be considered within scope. The methods and apparatus of various embodiments may be, and in various embodiments are, used with CDMA, orthogonal frequency division multiplexing (OFDM), and/or various other types of communications techniques which may be used to provide wireless communications links between access nodes and mobile nodes. In some embodiments the access nodes are implemented as base stations which establish communications links with mobile nodes using OFDM and/or CDMA. In various embodiments the mobile nodes are implemented as notebook computers, personal data assistants (PDAs), or other portable devices including receiver/transmitter circuits and logic and/or routines, for implementing the methods of various embodiments.

What is claimed is:

1. A method of operating a base station, comprising:
measuring during an uplink null time period uplink background interference;
determining a change in the measured background interference;
determining a first transmission power control value as a function of the measured background interference and the determined change in the measured background interference; and
transmitting the first transmission power control value to one or more wireless terminals.

2. The method of claim 1, further comprising:
storing interference budget information.

3. The method of claim 2, wherein determining said first transmission power control value includes using said stored interference budget information in combination with the measured background interference to generate said first transmission power control value.

4. The method of claim 3, wherein determining said first transmission power control value includes modifying a previous transmission power control value when said measured background interference exceeds an interference budget limit indicated by said stored interference budget information, the modified transmission power control value limiting peer to peer transmission power levels more than the previous transmission power control value.

5. The method of claim 4, wherein determining said first transmission power control value includes modifying the previous transmission power control value when said measured background interference is below said interference budget limit, the modified transmission power control value increasing peer to peer transmission power levels to a level higher than the levels controlled by the previous transmission power control value.

6. The method of claim 5, wherein said changing to a higher level is performed when said measured interference is below said interference budget limit by at least a predetermined threshold.

7. The method of claim 2, wherein said uplink null time period corresponds to a period of time in which at least a fraction of uplink bandwidth used by said base station is intentionally not used for transmitting uplink signals to the base station.

8. The method of claim 1, further comprising:
maintaining synchronization with at least one adjacent base station to maintain synchronization of uplink null time periods between adjacent base stations.

9. The method of claim 1, wherein determining said first transmission power control value is also a function of a difference between two previously transmitted transmission power control values.

10. The method of claim 9, wherein said previous measurement of background interference followed transmission of a second previous transmission power control value in said two previously transmitted transmission power control values.

11. A base station, comprising:
an interference measurement module for measuring during an uplink null time period uplink background interference;
a wireless terminal power control module for:
determining a change in the measured background interference;
determining a first transmission power control value as a function of the measured background interference and the determined change in the measured background interference; and
a transmitter module for transmitting the first transmission power control value to one or more wireless terminals.

12. The base station of claim 11, further comprising:
memory including stored interference budget information.

13. The base station of claim 12, wherein said wireless terminal power control module determines said first transmission power control value using said stored interference budget information in combination with the measured background interference to generate said first transmission power control value.

14. The base station of claim 13, wherein said wireless terminal power control module determines said first transmission power control value by operations including modifying a previous transmission power control value when said measured background interference exceeds an interference budget limit indicated by said stored interference budget information, the modified transmission power control value limiting peer to peer transmission power levels more than the previous transmission power control value.

15. The base station of claim 14, wherein said wireless terminal power control module determines said first transmission power control value by operations including modifying the previous transmission power control value when said measured background interference is below said interference budget limit, the modified transmission power control value increasing peer to peer transmission power levels to a level higher than the levels controlled by the previous transmission power control value.

16. The base station of claim 15, wherein said changing to a higher level is performed when said measured interference is below said interference budget limit by at least a predetermined threshold.

17. The base station of claim 12, wherein said uplink null time period corresponds to a period of time in which at least a fraction of uplink bandwidth used by said base station is intentionally not used for transmitting uplink signals to the base station, the memory further comprising:
stored timing structure information identifying said uplink null periods.

18. The base station of claim 11, further comprising:
a wide area network synchronization module for maintaining synchronization with at least one adjacent base station to maintain synchronization of uplink null time periods between adjacent base stations.

19. The base station of claim 11, wherein said wireless terminal power control module determines said first transmission power control value as a function of a difference between two previously transmitted transmission power control values.

20. The base station of claim 11, further comprising:
an interference type separation module for identifying a contribution of measured uplink interference associated with peer to peer signaling.

21. A base station, comprising:
interference measurement means for measuring during an uplink null time period uplink background interference;
means for determining a change in the measured background interference;
means for determining a first transmission power control value as a function of the measured background interference and the determined change in the measured background interference; and
means for transmitting the first transmission power control value to one or more wireless terminals.

22. The base station of claim 21, further comprising:
storage means containing interference budget information.

23. The base station of claim 21, further comprising:
means for maintaining synchronization with at least one adjacent base station to maintain synchronization of uplink null time periods between adjacent base stations.

24. The base station of claim 22, further comprising:
means for identifying a contribution of measured uplink interference associated with peer to peer signaling.

25. A non-transitory computer readable medium embodying machine executable instructions for controlling a base station to implement a method, the method comprising:
measuring during an uplink null time period uplink background interference;
determining a change in the measured background interference;

determining a first transmission power control value as a function of the measured background interference and the determined change in the measured background interference; and transmitting the first transmission power control value to one or more wireless terminals.

26. The non-transitory computer readable medium of claim 25, further embodying machine executable instructions for:
storing interference budget information.

27. The non-transitory computer readable medium of claim 26, wherein determining said first transmission power control value includes using said stored interference budget information in combination with the measured background interference to generate said first transmission power control value.

28. The non-transitory computer readable medium of claim 25, further embodying machine executable instructions for:
maintaining synchronization with at least one adjacent base station to maintain synchronization of uplink null time periods between adjacent base stations.

29. An apparatus comprising:
a processor configured to:
measure during an uplink null time period uplink background interference;
determine a change in the measured background interference;
determine a first transmission power control value as a function of the measured background interference and the determined change in the measured background interference from a previous measurement;
transmit the first transmission power control value in a signal to one or more wireless terminals.

30. The apparatus of claim 29, wherein said processor is further configured to:
store interference budget information.

31. The apparatus of claim 30, wherein said processor configuration to determine said first transmission power control value further includes being configured to use said stored interference budget information in combination with the measured background interference to generate said first transmission power control value.

32. The apparatus of claim 29, wherein said processor is further configured to:
maintain synchronization with at least one adjacent base station to maintain synchronization of uplink null time periods between adjacent base stations.

* * * * *